(12) United States Patent
Archer et al.

(10) Patent No.: US 12,084,556 B2
(45) Date of Patent: *Sep. 10, 2024

(54) FOOTWEAR COMPONENT MANUFACTURING METHODS

(71) Applicant: NIKE, Inc., Beaverton, OR (US)

(72) Inventors: Paul Irving Archer, Portland, OR (US); Hossein Allen Baghdadi, Portland, OR (US); Jay Constantinou, Portland, OR (US); Gregory Paul Dufour, Portland, OR (US); Sami Mohamad Fakhouri, Portland, OR (US); Floyd Whitney Miles, Beaverton, OR (US); Joseph Thomas Muth, North Plains, OR (US); Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,309

(22) Filed: May 30, 2023

(65) Prior Publication Data

US 2023/0303796 A1  Sep. 28, 2023

Related U.S. Application Data

(62) Division of application No. 17/195,086, filed on Mar. 8, 2021, now Pat. No. 11,702,526.
(Continued)

(51) Int. Cl.
*C08J 9/12* (2006.01)
*A43B 1/14* (2006.01)
(Continued)

(52) U.S. Cl.
CPC .................. *C08J 9/12* (2013.01); *A43B 1/14* (2013.01); *A43D 119/00* (2013.01);
(Continued)

(58) Field of Classification Search
CPC ................ B25J 15/0066; B25J 15/0052; B25J 15/0019; B25J 15/00; B29C 44/105;
(Continued)

(56) References Cited

U.S. PATENT DOCUMENTS 3,447,251 A   6/1969  Drexler
3,682,579 A   8/1972  Hujik
(Continued)

FOREIGN PATENT DOCUMENTS

CA   2462150 A1   4/1999
CN   102167840 A   8/2011
(Continued)

OTHER PUBLICATIONS

Notice of Allowance received for U.S. Appl. No. 17/195,067, mailed on Sep. 15, 2023, 10 pages.
(Continued)

*Primary Examiner* — Stella K Yi
(74) *Attorney, Agent, or Firm* — Shook, Hardy & Bacon L.L.P.

(57) ABSTRACT

Physical foaming a footwear component with a single-phase solution of a polymeric composition and a supercritical fluid is provided. The method include temperature conditioning a mold and then engaging the mold with a robot that conveys the mold to a press. At the press a gas counter pressure is applied to a cavity of the mold before injecting a single-phase solution of a polymeric composition and a supercritical fluid into the cavity of the mold. The process continues with releasing the gas counter pressure from the cavity of the mold and then removing the footwear component from the cavity of the mold. The parameters of the method are configured for the formation of the footwear component in an automated manner.

20 Claims, 34 Drawing Sheets

Related U.S. Application Data

(60) Provisional application No. 62/987,648, filed on Mar. 10, 2020, provisional application No. 62/987,329, filed on Mar. 9, 2020, provisional application No. 62/987,227, filed on Mar. 9, 2020, provisional application No. 63/137,872, filed on Jan. 15, 2021, provisional application No. 62/987,224, filed on Mar. 9, 2020, provisional application No. 63/042,324, filed on Jun. 22, 2020, provisional application No. 63/071,393, filed on Aug. 28, 2020.

(51) Int. Cl.
| | |
|---|---|
| *A43D 119/00* | (2006.01) |
| *B25J 15/00* | (2006.01) |
| *B29C 44/10* | (2006.01) |
| *B29C 44/58* | (2006.01) |
| *B29C 44/60* | (2006.01) |
| *B29C 45/00* | (2006.01) |
| *B29C 45/04* | (2006.01) |
| *B29C 45/78* | (2006.01) |
| *B29D 35/00* | (2010.01) |
| *B29D 35/08* | (2010.01) |
| *B29D 35/12* | (2010.01) |
| *B29D 35/14* | (2010.01) |
| *B29K 21/00* | (2006.01) |
| *B29K 67/00* | (2006.01) |
| *B29K 105/04* | (2006.01) |
| *B29L 31/50* | (2006.01) |
| *G06K 19/04* | (2006.01) |

(52) U.S. Cl.
CPC ......... *B25J 15/0019* (2013.01); *B29C 44/105* (2013.01); *B29C 44/58* (2013.01); *B29C 44/60* (2013.01); *B29C 45/0001* (2013.01); *B29C 45/04* (2013.01); *B29C 45/78* (2013.01); *B29D 35/0036* (2013.01); *B29D 35/0045* (2013.01); *B29D 35/081* (2013.01); *B29D 35/122* (2013.01); *B29D 35/128* (2013.01); *B29D 35/148* (2013.01); *G06K 19/045* (2013.01); *B29C 2945/76531* (2013.01); *B29C 2945/76752* (2013.01); *B29K 2021/003* (2013.01); *B29K 2067/00* (2013.01); *B29K 2105/04* (2013.01); *B29L 2031/50* (2013.01); *B29L 2031/504* (2013.01); *C08J 2367/00* (2013.01); *C08J 2467/00* (2013.01)

(58) Field of Classification Search
CPC ......... B29C 44/10; B29C 45/78; B29C 45/04; B29C 45/0001; B29C 44/60; B29C 44/58; B29D 35/061; B29D 35/02; B29D 35/0009; B29D 35/00
See application file for complete search history.

(56) References Cited

U.S. PATENT DOCUMENTS

| | | |
|---|---|---|
| 3,871,806 A | 3/1975 | Leunig |
| 3,891,362 A | 6/1975 | Devita |
| 3,988,403 A | 10/1976 | Angell, Jr. et al. |
| 4,372,525 A | 2/1983 | Uhlig |
| 4,462,783 A | 7/1984 | Hehl |
| 4,555,228 A | 11/1985 | Nishiike et al. |
| 5,288,451 A | 2/1994 | Schad |
| 6,007,748 A | 12/1999 | Krajcir |
| 6,146,423 A | 11/2000 | Cohen et al. |
| 6,266,897 B1 | 7/2001 | Seydel et al. |
| 6,599,597 B1 | 7/2003 | Bonk et al. |
| 6,688,956 B1 | 2/2004 | Yokley et al. |
| 8,869,430 B2 | 10/2014 | Chao et al. |
| 9,021,720 B2 | 5/2015 | Hazenberg et al. |
| 9,956,732 B2 | 5/2018 | Murphy et al. |
| 10,383,396 B1 | 8/2019 | Malinowski et al. |
| 10,448,704 B2 | 10/2019 | Dupre et al. |
| 2001/0023510 A1 | 9/2001 | Masubuchi |
| 2003/0071386 A1 | 4/2003 | Lilienthal et al. |
| 2005/0037104 A1 | 2/2005 | Kao et al. |
| 2006/0046004 A1 | 3/2006 | Ekart et al. |
| 2006/0082009 A1 | 4/2006 | Quail et al. |
| 2006/0082010 A1 | 4/2006 | Quail |
| 2007/0098839 A1 | 5/2007 | Dieno et al. |
| 2008/0175942 A1 | 7/2008 | Chi-jin |
| 2008/0193585 A1 | 8/2008 | Glaesener et al. |
| 2010/0242312 A1 | 9/2010 | Lim et al. |
| 2012/0052143 A1 | 3/2012 | Chen et al. |
| 2012/0137449 A1 | 6/2012 | Ransom et al. |
| 2012/0196115 A1 | 8/2012 | Choe et al. |
| 2014/0179818 A1 | 6/2014 | Takashima et al. |
| 2014/0259801 A1 | 9/2014 | Grondin |
| 2014/0265016 A1 | 9/2014 | Nguyen et al. |
| 2015/0047775 A1 | 2/2015 | Ginns et al. |
| 2015/0174803 A1 | 6/2015 | Newman et al. |
| 2015/0208755 A1 | 7/2015 | Rustam et al. |
| 2015/0298413 A1 | 10/2015 | Yang |
| 2016/0039162 A1 | 2/2016 | Murphy et al. |
| 2016/0144546 A1 | 5/2016 | Song et al. |
| 2016/0318267 A1 | 11/2016 | Koiso et al. |
| 2017/0203529 A1 | 7/2017 | Wu |
| 2018/0065287 A1 | 3/2018 | Park et al. |
| 2018/0133943 A1 | 5/2018 | Aiba et al. |
| 2018/0147752 A1 | 5/2018 | NUrnberg et al. |
| 2018/0213886 A1 | 8/2018 | Connell et al. |
| 2019/0073709 A1 | 3/2019 | Hayes et al. |
| 2019/0118440 A1 | 4/2019 | Moriya et al. |
| 2019/0276626 A1 | 9/2019 | Baghdadi |
| 2019/0351592 A1 | 11/2019 | Falken |
| 2019/0366590 A1 | 12/2019 | Farris et al. |
| 2021/0008773 A1 | 1/2021 | Karlsson |
| 2021/0031474 A1 | 2/2021 | Tsai et al. |
| 2021/0276293 A1 | 9/2021 | Baghdadi et al. |
| 2021/0276294 A1 | 9/2021 | Baghdadi |
| 2021/0277199 A1 | 9/2021 | Archer et al. |
| 2021/0354345 A1 | 11/2021 | Archer et al. |
| 2021/0354349 A1 | 11/2021 | Archer et al. |

FOREIGN PATENT DOCUMENTS

| | | |
|---|---|---|
| CN | 106182664 A | 12/2016 |
| CN | 107415131 A | 12/2017 |
| CN | 108115946 A | 6/2018 |
| CN | 106696198 B | 10/2018 |
| DE | 3145346 A1 | 5/1983 |
| DE | 3319967 A1 | 12/1984 |
| DE | 3723830 A1 | 1/1989 |
| DE | 4022778 A1 | 1/1992 |
| EP | 1166991 A2 | 1/2002 |
| EP | 1266928 A1 | 12/2002 |
| EP | 3025844 A1 | 6/2016 |
| EP | 3326774 A1 | 5/2018 |
| IT | 201700072079 A1 | 12/2018 |
| JP | 5-104583 A | 4/1993 |
| JP | 8-207188 A | 8/1996 |
| JP | 2002-355872 A | 12/2002 |
| JP | 2004-314625 A | 11/2004 |
| JP | 2009-190251 A | 8/2009 |
| KR | 10-0757966 B1 | 9/2007 |
| TW | I256961 B | 6/2006 |
| TW | 200922769 A | 6/2009 |
| TW | 201512262 A | 4/2015 |
| TW | 201902666 A | 1/2019 |
| WO | 02/38674 A2 | 5/2002 |
| WO | 2016/022829 A1 | 2/2016 |
| WO | 2016/077820 A1 | 5/2016 |
| WO | 2017/202840 A1 | 11/2017 |
| WO | 2018/222714 A1 | 12/2018 |
| WO | 2018/222968 A1 | 12/2018 |

(56) References Cited

FOREIGN PATENT DOCUMENTS

WO 2019/101375 A1 5/2019
WO 2019/236500 A1 12/2019

OTHER PUBLICATIONS

Rodriguez-Perez et al., "Mechanical Behaviour at Low Strains of LDPE Foams with Cell Sizes in the Microcellular Range: Advantages of Using These Materials in Structural Elements", Cellular Polymers, vol. 27 No. 6, Available online at: <https://www.researchgate.net/publication/43945663>, Nov. 2008, pp. 347-362.
Extended European Search Report received for European Patent Application No. 23172527.6, mailed on Aug. 30, 2023, 5 pages.
Extended European Search Report received for European Patent Application No. 23178056.0, mailed on Aug. 30, 2023, 8 pages.
Extended European Search Report received for European Patent Application No. 23179009.8, mailed on Aug. 31, 2023, 7 pages.
Notice of Allowance received for U.S. Appl. No. 17/194,812, mailed on Aug. 23, 2023, 7 pages.
Notice of Allowance received for U.S. Appl. No. 17/194,815, mailed on Aug. 23, 2023, 8 pages.
Office Action received for European Application No. 21715711.4, mailed on Dec. 14, 2023, 5 pages.
Office Action received for European Application No. 22196248.3, mailed on Dec. 21, 2023, 4 pages.
Notice of Allowance received for U.S. Appl. No. 18/203,289, mailed on Feb. 7, 2024, 13 pages.
Intention to Grant received for European Patent Application No. 21715396.4, mailed on Dec. 6, 2023, 7 pages.
Office Action received for European Patent Application No. 21714773.5, mailed on Nov. 6, 2023, 6 pages.
Office Action received for European Patent Application No. 21715087.9, mailed on Dec. 5, 2023, 5 pages.
Office Action received for European Patent Application No. 21715095.2, mailed on Nov. 6, 2023, 5 pages.
Notice of Allowance received for U.S. Appl. No. 18/203,289, mailed on Feb. 26, 2024, 9 pages.
Non-Final Office Action received for U.S. Appl. No. 18/511,419, mailed on Jun. 6, 2024, 17 pages.
Non-Final Office Action received for U.S. Appl. No. 18/511,567, mailed on Jul. 2, 2024, 14 pages.

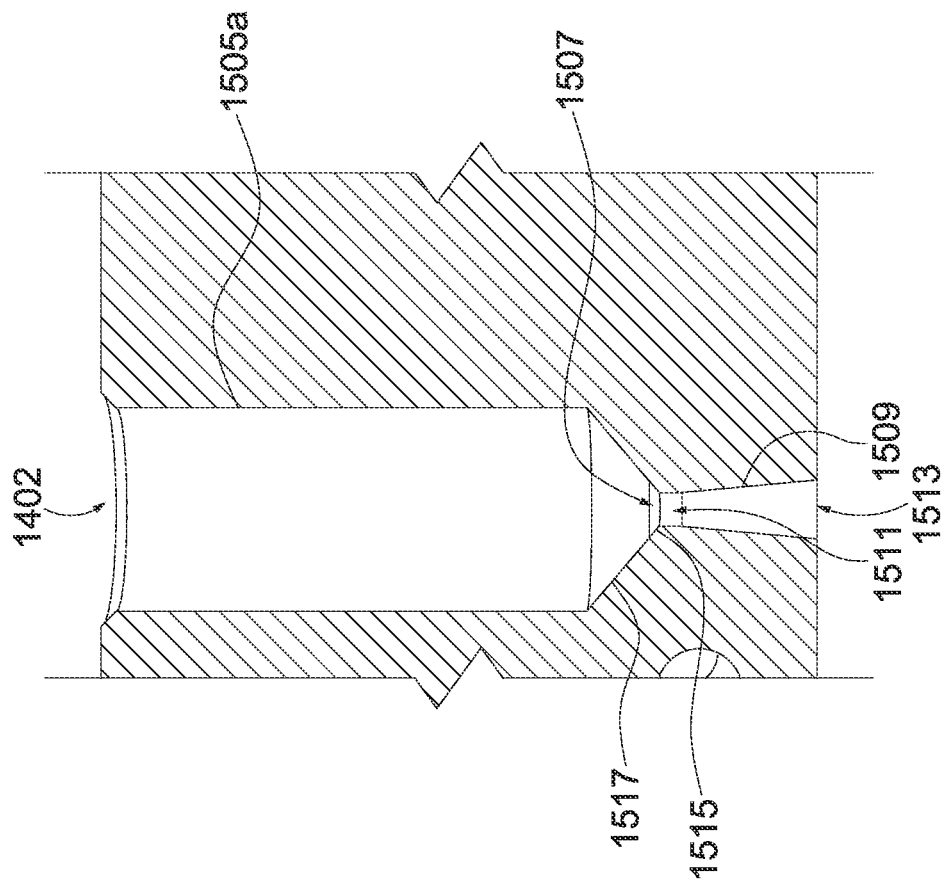

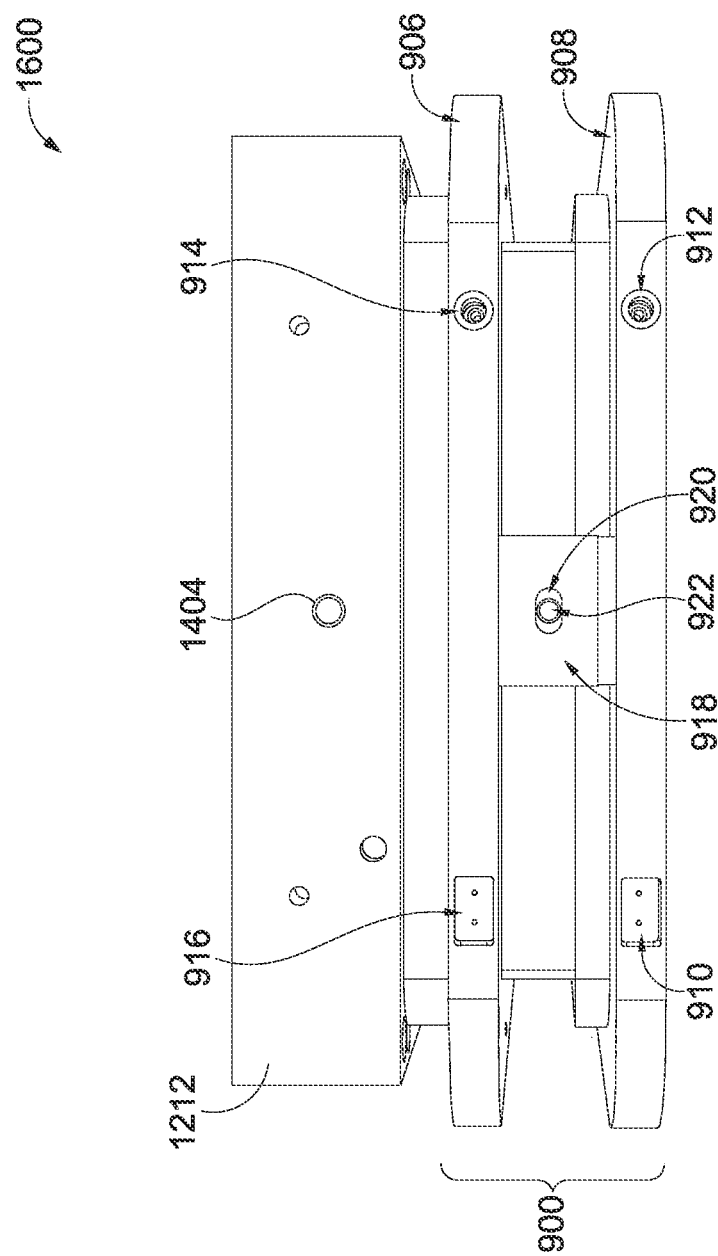

FOOTWEAR COMPONENT MANUFACTURING METHODS

CROSS-REFERENCE TO RELATED APPLICATIONS

This application, titled "Footwear Component Manufacturing Methods," is a divisional of co-pending U.S. Non-Provisional patent application Ser. No. 17/195,086, filed Mar. 8, 2021 and titled "Footwear Component Manufacturing Methods," which claims priority to U.S. Provisional Patent Application No. 62/987,329, filed Mar. 9, 2020, and titled "Foam Article with Enhanced Properties" and to U.S. Provisional Patent Application No. 62/987,648, filed Mar. 10, 2020, and titled "Foam Article with Enhanced Properties" and to U.S. Provisional Patent Application No. 62/987,227, filed Mar. 9, 2020, and titled "Injection Molding System and Tooling" and to U.S. Provisional Patent Application No. 63/137,872, filed Jan. 15, 2021, and titled "Injection Molding System and Tooling" and to U.S. Provisional Patent Application No. 62/987,224, filed Mar. 9, 2020, and titled "Footwear Component Manufacturing System and Methods" and to U.S. Provisional Patent Application No. 63/042,324, filed Jun. 22, 2020, and titled "Manufacturing Processes and Systems for Forming Footwear Soles Using Recycled Thermoplastic Copolyester Recyclate" and to U.S. Provisional Patent Application No. 63/071,393, filed Aug. 28, 2020, and titled "Manufacturing Processes and Systems for Forming Footwear Soles Using Recycled Thermoplastic Copolyester Recyclate." These applications are assigned to the same entity as the present application, and are incorporated herein by reference in the entirety.

TECHNICAL FIELD

Aspects hereof relate to systems and methods for forming a physically foamed footwear or other apparel or equipment component.

BACKGROUND

Injection molding is used to manufacture various components of a footwear article, such as a footwear sole, a footwear upper, and parts of a footwear sole or a footwear upper (e.g., cushioning elements, trim, etc.). For example, an injection molding system is used, in some situations, to distribute a polymer melt into a cavity of a mold, after which the polymer melt solidifies into a polymer product having the shape of the mold cavity. In some instances, it may be advantageous for the polymer product to include a foamed material, such as when manufacturing a footwear sole (e.g., all of, or a portion of, a footwear midsole). Systems configured to mold foam polymer products may include some components that are different from systems configured to mold non-foam polymer products. For example, some injection molding systems both foam and mold the polymeric composition.

SUMMARY

This Summary is provided to introduce a selection of concepts in a simplified form that are further described below in the Detailed Description. This Summary is not intended to identify key features or essential elements of the claimed subject matter, nor is it intended to be used as an aid in determining the scope of the claimed subject matter. The present invention is defined by the claims. At a high level, the present disclosure is directed to systems and methods for physically foaming with an injection molding system configured to mold various articles.

DESCRIPTION OF THE DRAWINGS

Some subject matter described in this disclosure includes systems, tooling, and methods of an injection-molding system for molding a physically foamed component. This subject matter is described in detail below with reference to the drawing figures, which are submitted together with this Specification and are incorporated herein by reference:

FIG. 15C depicts a cross-sectional view from line 15C-15C in FIG. 15B, in accordance with aspects hereof;

FIG. 16 depicts a side view of the mold and hot-runner plate of FIG. 14A, in accordance with aspects hereof;

DETAILED DESCRIPTION

Figure 1:
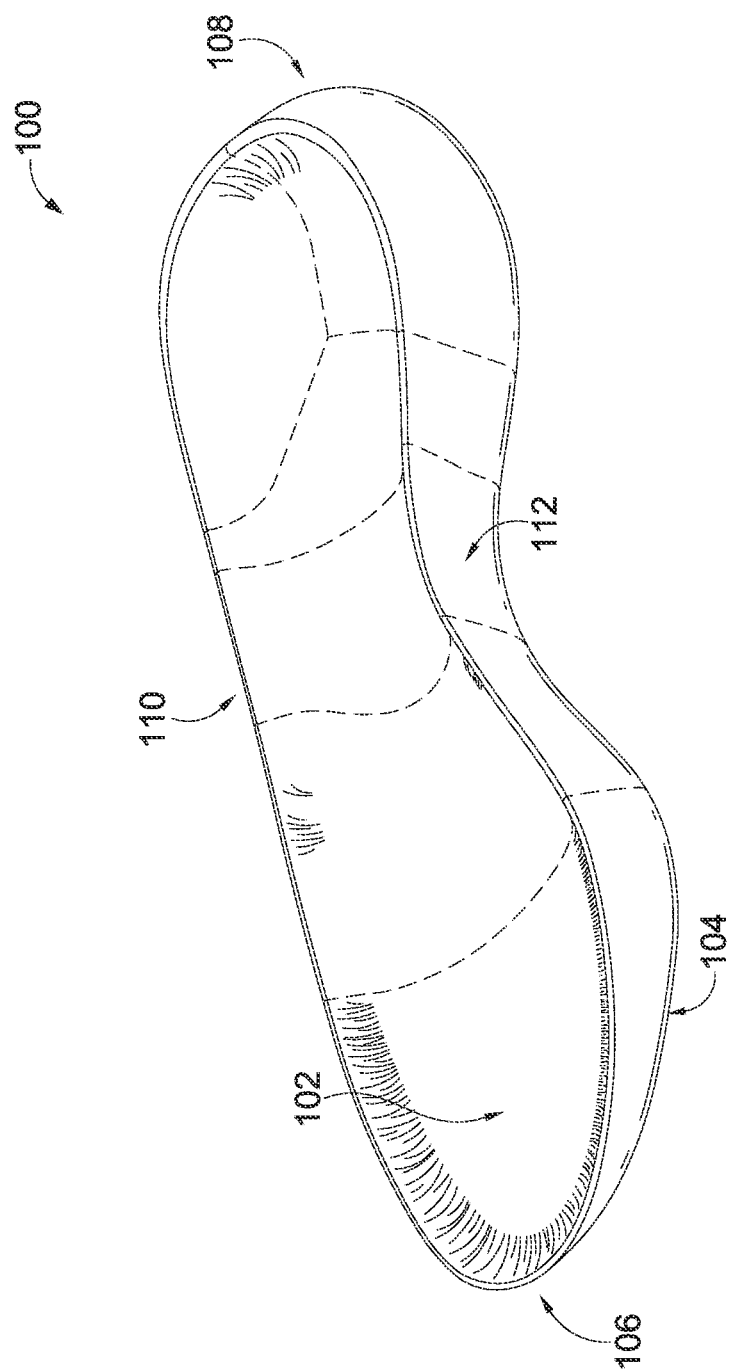
FIG. 1 depicts an article of footwear component, in accordance with aspects hereof.

An article of footwear may include a variety of components formed from a foamed polymeric composition. For example, a sole, which may include an insole, a midsole, and/or an outsole, may be formed from a foamed polymeric composition. Other components, such as inserts, padding, uppers, and the like are also contemplated components of an article of footwear that may be formed from a foamed polymeric composition. Depending on the polymeric composition, how the polymeric composition is foamed, and other process variables, the foam components may pose a challenge to recycle or otherwise sustainably handle at the end of useful life or when scrapped during manufacturing. The systems and methods provided herein may form foamed polymeric composition components that are more suitable for recycling, reuse, and/or reforming than traditionally formed foamed polymeric compositions.

However, it is challenging to develop systems and methods that produce foamed polymeric composition components that are suitable for use in articles of footwear while still providing improved sustainability. The systems and methods that are disclosed herein provide a foamed polymeric composition that may be recycled into the manufacturing stream and/or other recycle streams (e.g., post-consumer recycle streams) to potentially limit the environmental impact caused by the foamed polymeric component. This is accomplished through manipulation of the system's components, the parameters at which the system components operate, the polymeric composition that is foamed, and the foaming process used to foam the polymeric composition. In combination, two or more of the variables provide solutions, as will be illustrated in detail below, to form a foamed polymeric composition that provides enhanced environmental sustainability results.

For example, the system and methods provided herein contemplate physically foaming a thermoplastic elastomer composition, including thermoplastic polyester compositions (i.e., polymeric compositions comprising one or more thermoplastic polyester elastomer), in a temperature conditioned mold. However, the process of physically foaming a thermoplastic elastomer composition is sensitive to manufacturing variables, such as time, pressure, and temperature. As such, identification of specific variables at various manufacturing processes and components that result in acceptable physically foamed components has developed from a continued investment of time, trials, and resources. The resulting tooling, components, processes, and manufacturing controls are provided hereinafter.

Physical foaming is a process of foaming a polymeric composition with a physical blowing agent as opposed to a chemical blowing agent. Inert compositions, such as nitrogen or carbon dioxide ($CO_2$), are examples of a physical blowing agent contemplated herein. Unlike a chemical blowing agent that is effective to foam a polymeric composition through an off gassing effect, such as raising the temperature of the chemical blowing agent above a degradation temperature of the chemical blowing agent, a physical blowing agent is effective to foam a polymeric composition by initiating a pressure change of the physical blowing agent, in an example. The physical blowing agent may be in a gas state, a liquid state, and/or a supercritical fluid state in some examples. For example, the physical blowing agent may be a supercritical fluid, that when exposed to a reduced pressure (e.g., a pressure below a critical pressure for the physical blowing agent), the physical blowing agent is released out of solution causing a foaming action to occur.

A supercritical fluid is a fluid in a supercritical fluid phase that is at a temperature and pressure above the critical point for the composition. For example, the critical point for nitrogen is −147 degrees Celsius and 34.0 bar and the critical point for carbon dioxide is 31.2 degrees Celsius and 73.8 bar. As will be discussed below, a single-phase solution comprising a supercritical fluid (e.g., carbon dioxide or nitrogen) dissolved in a molten polymeric composition (e.g., thermoplastic elastomer composition) may be injected into a mold as a single-phase solution. The pressure experienced by the injected material may be reduced once inside of the mold, which causes the supercritical fluid to experience a phase change from the supercritical fluid state to a gas state as the pressure is reduced below the critical pressure. The phase change of the physical blowing agent causes the physical blowing agent to release out of solution with the polymeric composition. This creates a cellular structure in the polymeric composition that results in a foamed polymeric component. Other phase changes and/or pressure differentials are also contemplated in connection with physical blowing agents to foam a polymeric composition.

Aspects herein include a physical foaming injection molding system for a footwear component. A single-phase solution comprising a polymeric composition and a supercritical fluid is contemplated as being foamed by the system. Included in the system is an injector and a press paired with the injector. To achieve efficiencies in the manufacturing process in an automated manner, the system also includes a robot comprising an end effector adapted to reversible engage with a mold. The mold is configured to engage with the injector and the press in a manner that allows the robot to position relative to the press to reversible engage the end effector with the mold.

Aspects herein also include a physical foaming injection molding system for a footwear component that includes a temperature control unit and a temperature conditioning rack effectively coupled with the temperature control unit. The temperature conditioning rack is adapted to condition a temperature of a mold maintained at the temperature conditioning rack. The injector includes a physical foaming agent port and a physical foaming agent supply fluidly coupled with the injector physical foaming agent port. The system also includes a press paired with the injector. The system further includes an unloader that has a frame, an unloader plate, and a pair of unloader arms that move in a first direction in agreement and move in a second direction in disagreement. The system also includes a robot that has an end effector adapted to reversible engage with the mold. The robot is positioned relative to the temperature conditioning rack, the press, and the unloader to manipulate the end effector at the temperature conditioning rack, the press, and the unloader to reversible engage with the mold. As will be provided hereinafter, one or more recited components may be omitted, replaced, or added. Further, the arrangement of various components of the system may be adjusted.

Aspects herein also contemplate a method of physical foaming a footwear component by temperature conditioning a mold to a temperature from 15 degrees Celsius to 90 degrees Celsius and then engaging the mold with a robotically conveyed end effector adapted to reversible engage with the mold. The method continues by conveying, with the end effector, the mold to a press and then applying a gas counter pressure to a cavity of the mold to pressurize the mold cavity. The gas counter pressure, in an example, is at or above a critical pressure of a physical blowing agent of a single-phase solution to be injected into the mold. The method continues with injecting the single-phase solution of a polymeric composition and a supercritical fluid into the cavity of the mold. The method then continues with releasing the gas counter pressure from the cavity of the mold and then eventually removing the footwear component from the cavity of the mold. As will be provided in more detail hereinafter, additional or alternative steps may be implemented. Further, one or more steps may be omitted in some examples.

One type of injection molding system that both foams and molds polymeric compositions uses a microcellular injection molding process, in which one or more supercritical fluids—e.g., supercritical nitrogen, supercritical carbon dioxide, etc.—are used as physical blowing agents. For example, the supercritical fluid may be injected into a polymer melt contained in an injection barrel of the injection molding system, where the supercritical fluid dissolves in the polymer melt to form a molten single-phase solution. The single-phase solution may then be flowed into the mold cavity, at which point conditions are adjusted to cause the supercritical fluid to transition to a gas (e.g., nucleation to a gas) and the polymer to solidify. This transition of the polymer composition in the mold cavity may cause the polymer composition to expand (e.g., due to foaming) to fill the mold cavity, and once solidified, retain the shape of the foam polymer product.

These types of injection molding systems that use a microcellular injection molding process are often configured to control system parameters, which may affect properties of the foam polymer product. System parameters may be controlled at various stages of the injection molding process. For example, parameters may be controlled at the melting and mixing components forming the single-phase solution, as well as among the components that transport the single-phase solution to the mold. In addition, parameters may be controlled among the mold tooling. Theses stages may independently and/or collectively influence the melt, mixing, and molding processes.

Conventional injection molding systems have been configured to execute a microcellular injection molding process. However, the attributes of parts typically molded with these systems is often limited, such that the operating parameters and tooling of a conventional system are often not calibrated to mold parts having different attributes. For example, the part thickness or wall thickness of a part typically molded in a conventional system may be relatively thin, such that conventional systems may not produce thicker parts having desired properties.

Turning to FIG. 1, which depicts an article of footwear component 100, in accordance with aspects hereof. The article of footwear component 100 is a sole. As previously discussed, any foamed component is contemplated to be manufactured with the disclosed systems and methods provided herein, but in an example, the article of footwear component 100 is a footwear sole (e.g., footwear midsole). The footwear component 100 has a superior surface 102, an inferior surface 104, a toe end 106, a heel end 108, a lateral side 110, and a medial side 112. The superior surface 102 is sometimes referred to as a foot-facing surface and the inferior surface 104 is sometimes referred to as a ground-facing surface, wherein both alternative designations are based on a traditional orientation of the article of footwear during intended use.

The footwear component 100 may be of any size, but it includes at least those shoe sizes having a length between the toe end 106 and the heel end 108 in a range from 127 millimeters to 342 millimeters. The footwear component 100 has a width that may be any size, such as in a range from 70 millimeters to 135 millimeters measured across a widest part of the footwear component between the medial side 112 and the lateral side 110 perpendicular to a line extending between an extreme point at the toe end 106 and an extreme point at the heel end 108. The footwear component has a thickness that may be any thickness, but in an example the thickness between the superior surface 102 and the inferior surface 104 at a thickest location that is from 1 millimeter to 80 millimeters.

As such, it is contemplated that the systems and methods provided herein are effective to form a foamed polymeric component having a volume that is relatively significant as compared to article formed by traditional physical foaming operations. Further, the resulting foamed component produced by the systems and methods disclosed herein may have a high foaming ratio (e.g., non-polymeric volume relative to polymeric composition volume of the resulting foamed article) relative to traditional physically foamed articles. For example, some foamed components formed from the methods and system provided herein have a foaming ratio ranging from 90:10 to 65:35, such as 90:10, or 85:15, or 80:20, or 75:25, or 70:30, or 65:35, or ratios there between. Stated differently, it is contemplated that a footwear component with a foam ratio of 80:20 has twenty percent of the component volume formed from the polymeric composition and the remaining 80 percent of the foamed component volume is an open volume (e.g., non-polymeric composition) of the cellular structures formed as a result of the foaming process. In yet another way of characterizing the foam composition, a relative density may be expressed. The relative density of the foam article (e.g., foamed footwear component) is the density of the foamed article divided by the material (e.g., polymeric composition) from which it is formed. Therefore, it is contemplated that the footwear component has a relative density ranging from 0.1 to 0.35, such as 0.1, or 0.15, or 0.2, or 0.25, or 0.3, or 0.35, or relative densities there between. This high foaming ratio produces a foamed component suitable for use as a footwear component.

It is contemplated that alternative sizes, shapes, and styles of soles may be formed from the provided systems and methods. It is contemplated that alternative components may be formed from the provided systems and methods. For example and not limiting, it is contemplated that an insole, a midsole, an outsole, an insert, or other foot-supporting structure may be formed from the systems and methods provided herein. Additionally, a footwear upper, component of a footwear upper, or other component of an article of footwear may also be formed from methods and systems provided herein. The footwear component 100 is a non-limiting example of a footwear component that may be formed from the methods and systems provided herein.

Figure 2:
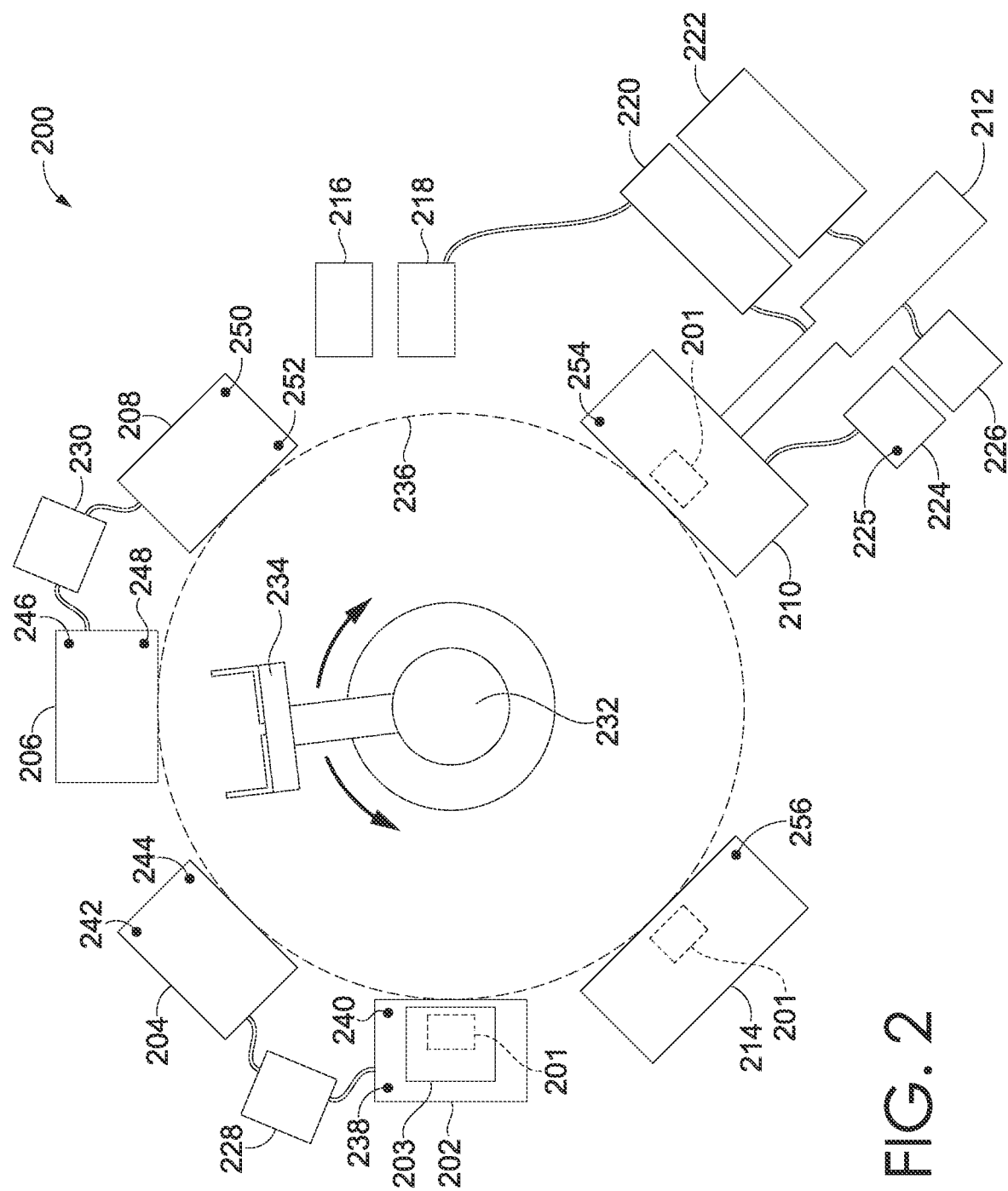
FIG. 2 depicts a schematic plan view of a footwear component manufacturing system in a first configuration, in accordance with aspects hereof.

FIG. 2 depicts a schematic plan view of a footwear component manufacturing system 200 in a first configuration, in accordance with aspects hereof. The system 200 is configured to move the tooling, such as a mold, through the various system components, such as an injector 212. The movement of the tooling to the injector as opposed to moving the injector to the tooling assists in achieving a greater throughput for manufacturing of footwear components. For example, by moving the tooling to the injector, the injector can be injecting during the times it would instead be moving in an alternative configuration where the injector is moved to the tooling. Additionally, because a variety of footwear component sizes (e.g., different sole sizes for different shoe sizes) may be manufactured during a common period, the specific tooling that is moved to the injector may be adjusted to fulfill production demands. In the alternative configuration where the injector moves to the tooling may increase travel time as the injector is forced to travel past tooling that does not meet current production demands. As such, moving the tooling to the injector, as is provided in the system 200, increases efficiencies through flexible manufacturing. It is contemplated that in alternative examples that the injector moves to two or more locations of the system, such as between two or more tooling locations.

The system 200, in a clockwise manner, is comprised of a temperature conditioning rack 202, a temperature control unit 228, a temperature conditioning rack 204, a temperature conditioning rack 206, a temperature control unit 230, a temperature conditioning rack 208, a controller 216, a physical foaming agent supply 218, a press 210, and injector 212, a dosing source 220, a hopper 222, a temperature control unit 224, a gas counter pressure source 226, an unloader, a robot 232, and an end effector 234. Each of the components of system 200 will be discussed individually hereinafter.

A phantom-lined representation of a tooling, a mold 201, is depicted at various elements (e.g., temperature conditioning rack 202, press 210, unloader 214) of the system 200. The mold 201 is depicted in phantom lines to highlight that the mold 201 is transient through the system 200 and may therefore may or may not be positioned at the one or more elements at a specific time. The mold 201 is configured to receive an injection of polymeric composition from the injector 212 at the press 210. The injected polymeric composition forms within the mold as a foamed article. An example of the mold 201 will be depicted and discussed in greater detail hereinafter, such as mold 900 at FIGS. 9-10 and 14A-17.

Figure 4:
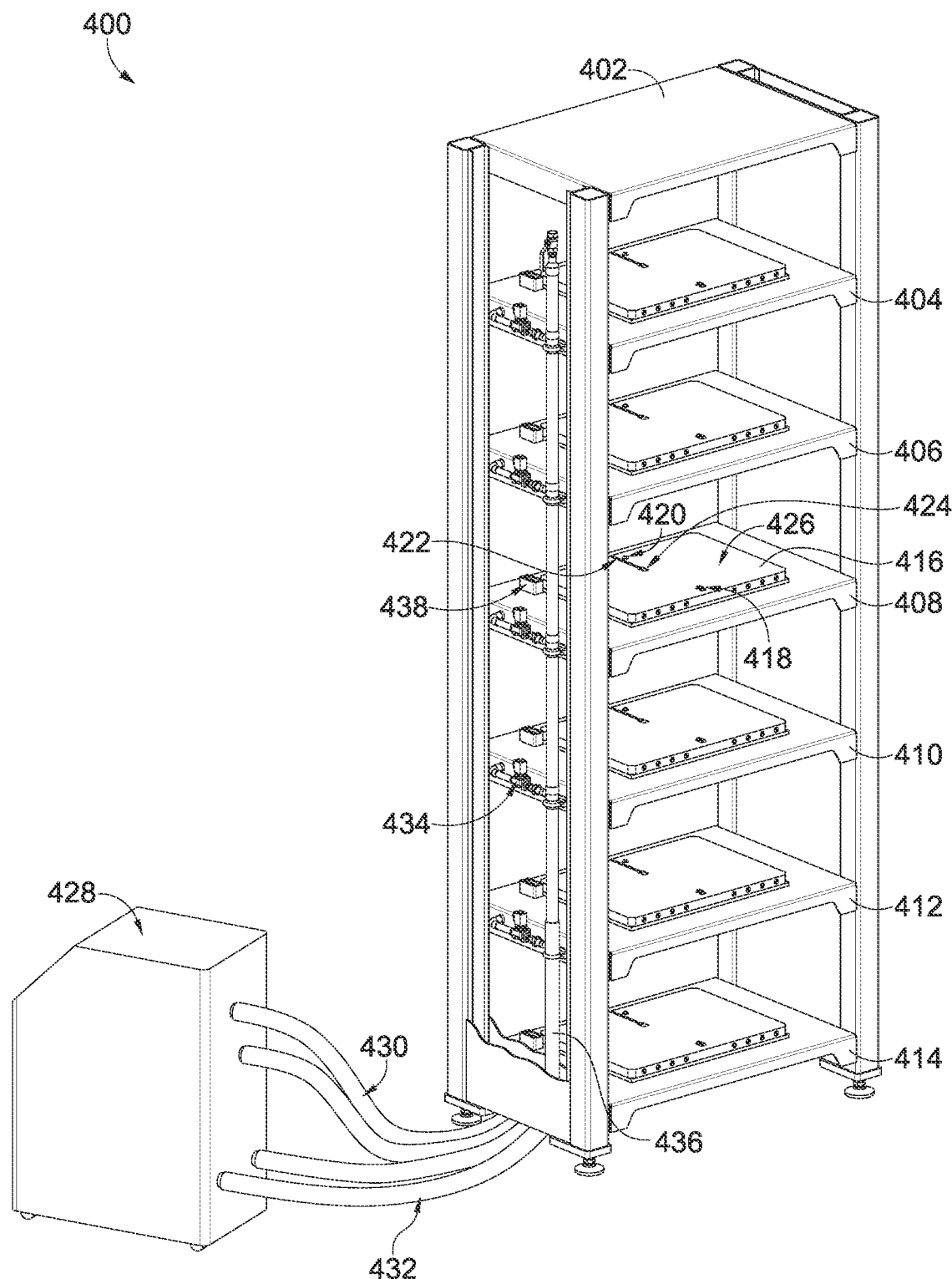
FIG. 4 depicts a perspective view of a temperature conditioning temperature conditioning rack and a temperature control unit, in accordance with aspects hereof.
Figure 5:
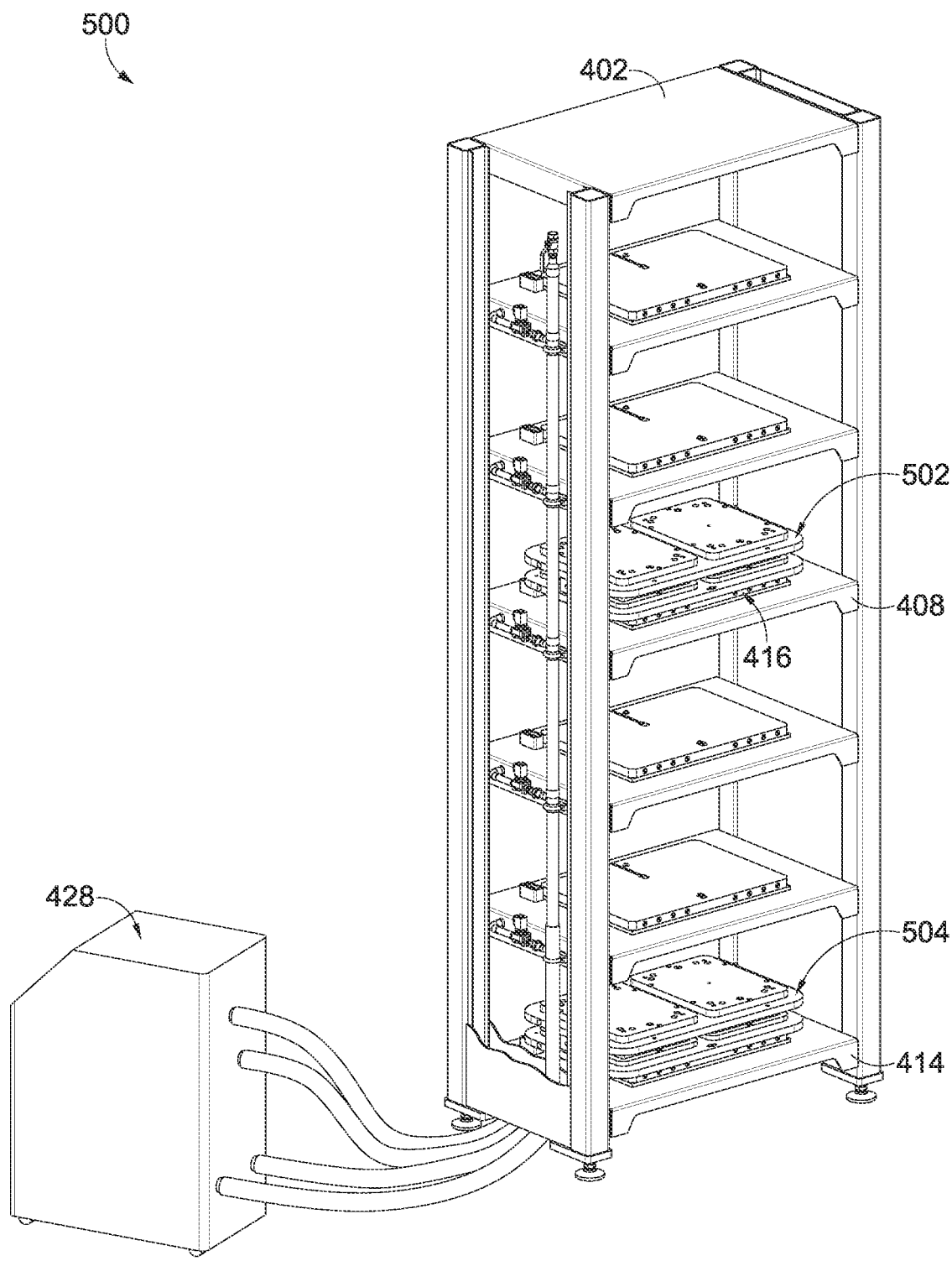
FIG. 5 depicts the temperature conditioning temperature conditioning rack and a temperature control unit of FIG. 4 having a quantity of molds, in accordance with aspects hereof.
Figure 6:
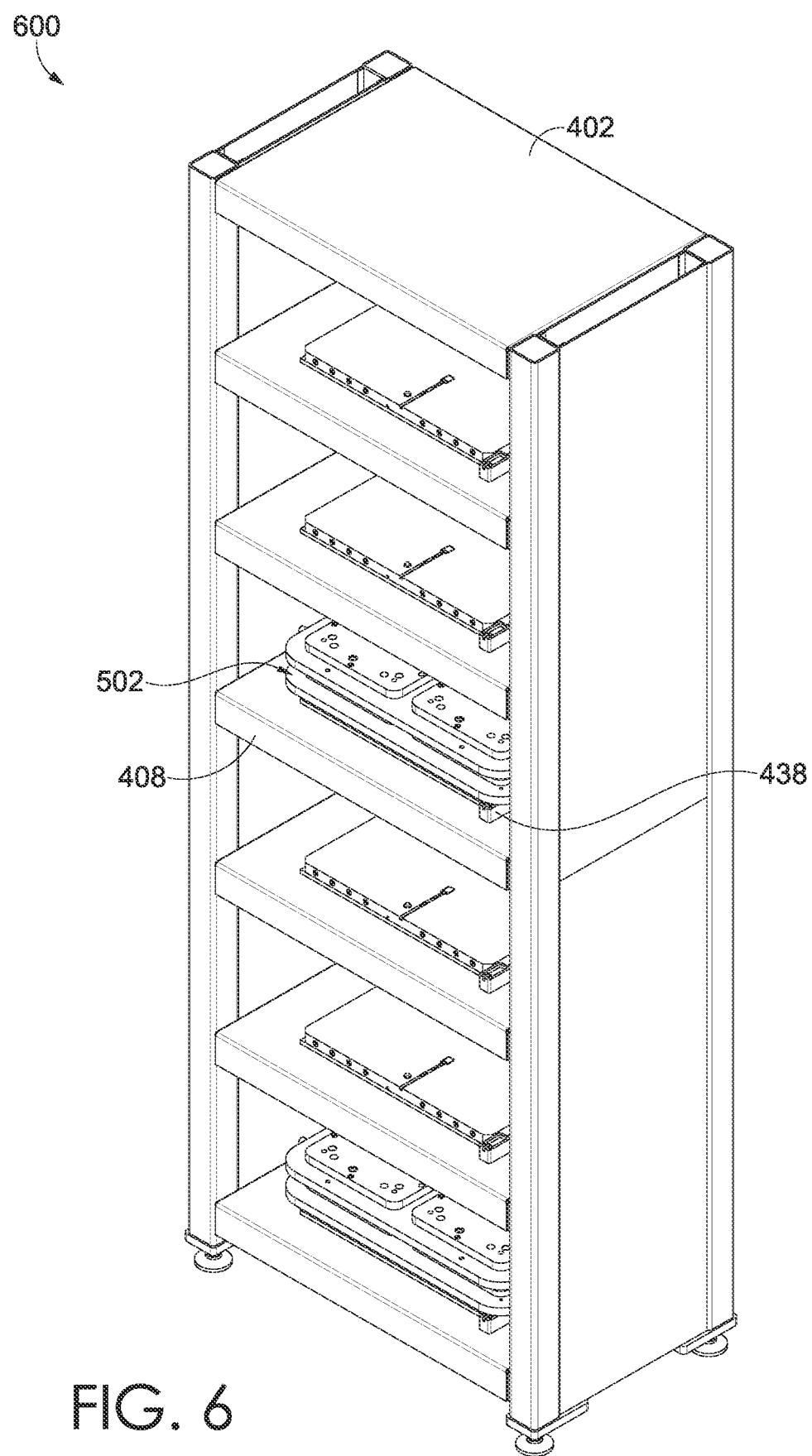
FIG. 6 depicts the temperature conditioning temperature conditioning rack of FIG. 5 in a rear perspective view, in accordance with aspects hereof.

The temperature conditioning rack 202, which will be discussed in greater detail in connection with FIGS. 4-6, is a temperature conditioning rack effective to temperature condition a mold. Temperature conditioning is the influence of temperature for the conditioned article to a target temperature. Temperature conditioning may raise or lower the temperature of an article to the target temperature. For example, temperature conditioning may be effective to raise a temperature of a mold (e.g., the mold 201) from ambient conditions prior to injecting a molten polymeric composition into a cavity of the mold. Temperature conditioning may also (or alternatively) be effective to lower a temperature of the mold 201 from a post-injection temperature caused by the injection of the molten polymeric composition. This temperature conditioning post-injection may reduce a time for the cellular structure of the foamed article within the mold to achieve a sufficient structural stability to be removed from the cavity of the mold. As such, it is contemplated that the temperature conditioning rack 202 may be used to temperature condition the mold 201 pre-injection and to temperature condition the mold 201 post-injection. The ability to temperature condition the mold 201 with the temperature conditioning rack 202 prior to injecting a single-phase solution into a cavity of the mold 201 results in a consistent physically foamed article formed in the mold 201, in examples.

The temperature conditioning rack 202 is comprised of a Radio Frequency Identification (RFID) reader 238. The RFID reader 238 is configured to emit electromagnetic interrogation pulses that can be received by an RFID tag (such as RFID tag 1708 of FIG. 17). In response, the RFID tag responds with information that is received by the RFID reader 238. The information may be static information for a given RFID tag or it may be dynamic information stored by the RFID tag and provided in response. In either case, it is contemplated that the RFID reader 238 is effective to receive information from an RFID tag. In use, a mold or other tooling includes an RFID tag that is interrogated by the RFID reader 238 to determine what associated tooling is present at the temperature conditioning rack 202. As will be seen in FIG. 4, it is contemplated that the temperature conditioning rack 202 is comprised of a plurality of bays and each of the bays is comprised of a unique RFID reader (e.g., RFID reader 438). Each RFID reader is therefore effective to determine a specific RFID tag (and therefore an associated mold having the specific RFID tag associated therewith) present in each of the bays of the temperature conditioning rack. Consequently, a specific knowledge of molds and location of the mold within the temperature conditioning rack is obtained by the quantity of RFID readers for a temperature conditioning rack.

While the various elements/components/systems of the system 200 are discussed as comprising RFID readers (e.g., RFID reader 238 of the temperature conditioning rack 202), one or more RFID readers from one or more of the components of the system 200 may be omitted altogether. For example, because of the automated nature of the system 200 that limits or eliminates human intervention, the system 200 is effective to maintain knowledge of tooling location within the system 200 at all times because the position of the tooling is controlled by components of the system 200 (e.g., robot 232). Through a log of tooling position as changed by the system 200, the system 200 can determine the location of the tooling even without relying on RFID confirmation, in an example. However, use of a confirmation system, such as RFID, visual codes (e.g., QR code, bar code) or other radio-frequency-enabled tracking technology, is also contemplated to ensure location of tooling is confirmed to further limit potential manufacturing challenges.

The temperature conditioning rack 202 is also comprised of a thermocouple 240, configured to measure temperature. In an example, the thermocouple 240 can be an electrical device that produces a temperature-dependent voltage or resistance (e.g., a resistance temperature detectors (RTDs)) that is interpreted to measure temperature. The thermocouple 240 is effective to measure a temperature of a mold in the temperature conditioning rack 202. Alternatively, and as will be discussed in more detail in FIGS. 4-6, the thermocouple can be effective to measure a temperature of a temperature conditioning plate onto which a mold is placed. A temperature conditioning plate 203 is a supporting structure of the temperature conditioning rack 202 that is configured to temperature condition the tooling (e.g., mold 201) that is supported by the temperature conditioning plate 203. The temperature conditioning plate 203 will be discussed in greater detail hereinafter at FIG. 4 as temperature conditioning plate 416 as an example of the temperature conditioning plate 203. As will be provided herein, it is contemplated that the system 200 is comprised of a quantity of the temperature conditioning plates 203. For example, each bay of the temperature conditioning racks 202, 204, 206, and 208 may be comprised of a temperature conditioning plate, such as the temperature conditioning plate 203.

The temperature conditioning plate 203 is configured to condition the temperature of tooling using thermal conduction, in an example. Conduction allows for thermal energy transfers between the tooling (e.g., mold 201) and the temperature conditioning plate (e.g., temperature conditioning plate 203). Over time, the temperature of the tooling converges on the temperature of the temperature conditioning plate through conduction. Therefore, a temperature measure of the temperature condition plate 203 serves as an approximation or proxy for a temperature of the mold 201 maintained at the temperature conditioning plate 203. The thermocouple 240 is therefore effective to measure or approximate the temperature of the mold 201 (or any tooling) maintained in the temperature conditioning rack 202 on the temperature conditioning plate 203. Based on the measured temperature by the thermocouple 240, the system 200 is able to determine if the mold 201 is temperature appropriate for receiving an injection or for having a foamed component removed therefrom.

The temperature conditioning rack 204, the temperature conditioning rack 206, and the temperature conditioning rack 208 are similarly described to the temperature conditioning rack 202. However, it is contemplated that each of the temperature conditioning rack 202, 204, 206, 208 may have variations in size, position, configuration, and components. In an example, each of the temperature conditioning racks 202, 204, 206, 208 may temperature condition tooling, such as the mold 201, to different temperatures or a similar temperature. Further, the temperature conditioning rack 204 is comprised of an RFID reader 242 and a thermocouple 244, the temperature conditioning rack 206 is comprised of an RFID reader 246 and a thermocouple 248, and the temperature conditioning rack 208 is comprised of an RFID reader 250 and a thermocouple 252.

The temperature control unit 228 is effective to manipulate a temperature of a temperature conditioning fluid to a target temperature. A temperature control unit, such as the temperature control unit 228, is effective to heat and/or cool a fluid that is circulated there through. The temperature control unit 228 may include a heat exchanger that is effective to extract or introduce thermal energy from/to the temperature conditioning fluid. In some instances, the temperature control unit 228 includes refrigerant that is effective to cool the temperature conditioning fluid. In some instances, the temperature control unit 228 includes heating elements (e.g., electric resistance heaters, combustion chambers, electric induction coils) (not shown) effective to heat the temperature conditioning fluid. It is also contemplated that the temperature control unit 228 is comprised of a circulation pump (not shown) effective to circulate a temperature conditioning fluid (e.g., pump the temperature conditioning fluid).

The temperature control unit 228 is fluidly coupled with the temperature conditioning rack 202. Fluidly coupled (or fluid coupling) represents a connection effective to circulate or transmit a fluid between at least two components. A fluid coupling may include a hose, tubing, channel, conduit, or other vessel effective for the transmission of a fluid between the fluidly coupled components. As will be discussed in greater connection with FIGS. 4-6, the temperature control unit 228 may be fluidly coupled with a temperature conditioning rack 202 through at least a manifold that is effective to distribute the circulated temperature conditioning fluid among multiple bays (or temperature conditioning plates 203 in each bay) to achieve intended temperatures at each of the targets (e.g., bays, temperature conditioning plates).

The temperature control unit 230 and the temperature control unit 224 are similarly described as the temperature control unit 228. However, it is contemplated that each of the temperature control units may have different configurations, settings, capacities, and the like. For example, it is contemplated that the temperature control unit 228 and the temperature control unit 230 circulate temperature conditioning fluid at a first temperature (e.g., ranging from 15 degrees Celsius to 90 degrees Celsius) and the temperature control unit 224, which is fluidly coupled with the press 210 operates at a second temperature. The second temperature may be higher than the first temperature if the temperature control unit 224 is fluidly coupled with a hot-runner plate (e.g., hot-runner plate 1116, 1212 of FIG. 11) of the press 210, as will be discussed in greater detail hereinafter. For example, while the temperature control units 228, 230 are configured to condition a temperature conditioning fluid to a temperature ranging from 15 degrees Celsius to 90 degrees Celsius, the temperature control unit 224 is configured, in an example, to condition a temperature conditioning fluid to a temperature ranging from 20 degrees Celsius to 250 degrees Celsius. Stated differently, depending on the components that are temperature conditioned by the temperature control unit 224, 228, 230, the temperature control unit 224, 228, 230 may provide different temperatures of temperature conditioned fluid to the respectively connected component.

Each temperature control unit 224, 228, 230 may service one or more components. For example, it is contemplated the temperature control unit 228 is fluidly coupled to the temperature conditioning rack 202 and the temperature conditioning rack 204. It is contemplated the temperature control unit 230 is fluidly coupled with the temperature conditioning rack 206 and the temperature conditioning rack 208. The temperature control unit 224 is fluidly coupled with the press 210. As will be discussed in greater detail at FIGS. 11-18, the temperature control unit 224 may service a press plate (e.g., press plate 1110 of FIG. 11) of the press 210 and/or a hot-runner plate (e.g., hot-runner plate 1116, 1212 of FIG. 12) of the press 210, in an example.

While the system 200 is discussed having a fluid connection between temperature control units (e.g., temperature control units 224, 228, 230) and components (e.g., temperature conditioning racks 202, 204, 206, 208, and press 210) of the system 200, it is also contemplated that the temperature control units 224, 228, 230 may be integrated with the component or otherwise coupled with the component(s). For example induction heating, piezoelectric and pyroelectric effect devices, electric resistance heater, and the like may alternatively be utilized to temperature condition one or more components of the system.

The press 210, as will be discussed in greater detail in FIGS. 12-19, secures the mold 201 for receiving the injected polymeric composition from the injector 212. Additionally, the press 210 is effective to serve as a conduit for gas counter pressure to the mold 201 from the gas counter pressure source 226. The press 210 also supports a manifold (e.g., injection manifold 1120 of FIG. 13) that is configured to distribute polymeric composition from the injector 212 to the mold. Further, the press 210 supports one or more universal runners (e.g., hot-runner plate 1116 and second hot-runner 1212 of FIG. 14A) that serve as conduits through which the manifold (e.g., injection manifold 1120 of FIG. 13) having a polymeric composition extends and, in the case of a hot-runner, are configured to temperature condition during fluid communication from the injector 212 to the mold. The press 210 also includes an RFID reader 254. The RFID reader 254 is effective to identify an RFID tag associated with a mold 201 at the press 210. The identification of the mold 201, like in other components of the system 200, allows for the controller 216 to monitor production, tooling, and components for effective manufacture of physically foamed footwear components.

The injector 212, which will be discussed in greater detail at FIGS. 19-22, is configured to form a single-phase solution comprising a molten polymeric composition and a physical blowing agent. As discussed herein, the physical blowing agent may be a supercritical fluid supplied from the dosing source 220 and introduced to the polymeric composition at the injector 212. Additionally or alternatively, the physical blowing agent may be impregnated into the polymeric composition that is supplied to the injector 212. Hopper 222 is a device to supply the polymeric composition to the injector 212. The polymeric composition may be supplied from the hopper 222 in a variety of media, such as pellet, bead, chip, reground scrap, and/or granule. Example compositions for the polymer material are discussed below.

The injector 212, which may also be referred to as an injection molding barrel, an injection molding system, and/or an injection molder, melts and/or shears the polymeric composition supplied by the hopper 222 through the application of heat and/or pressure to produce a molten polymeric composition. In a contemplated example, the injector 212 is also responsible for introducing the physical blowing agent (e.g., a supercritical fluid supplied from the dosing source 220) to the polymeric composition to form a single-phase solution of the polymeric composition and the physical blowing agent. In this example, the conditions within the injector 212 must be capable of supporting the supercritical fluid in a supercritical fluid state. Stated differently, the conditions within the injector 212 as a supercritical fluid is introduced are at a temperature and a pressure above the critical temperature and the critical pressure of the introduced supercritical fluid. The injector 212 is then responsible for metering (e.g., dosing) the single-phase solution to the press 210. As previously introduced, it is contemplated that the injector 212 pairs with a hot-runner plate (e.g., hot-runner plate 1116, 1212 of FIG. 14A), via an injection manifold (e.g., injection manifold 1120 of FIG. 11), to eventually form a fluid coupling with the mold 201 maintained at the press 210 to which the metered single-phase solution is injected.

The dosing source 220 is effective to prepare and meter the physical blowing agent for introduction to the injector 212 and impregnation with a polymeric composition. For example, the dosing source 220 is fluidly coupled with the physical foaming agent supply 218 and prepares the physical foaming agent supplied by the physical foaming agent supply 218 for introduction to the injector 212 through a fluid coupling between the physical foaming agent supply 218 and the injector 212. The dosing source 220, in an example, is effective to convert an inert substance, such as nitrogen or carbon dioxide, from a first state (e.g., gas or liquid) supplied from the physical foaming agent supply 218 into a different state, such as a supercritical fluid. In an example, this phase transition is accomplished through a pressure differential to a pressure above a critical pressure of the inert substance. Further, the dosing source 220 is also effective to meter (e.g., measure) a determined quantity of the physical blowing agent for the polymeric composition being prepared by the injector 212 to be injected.

Specific to the manufacturing of physically foamed footwear components, a variety of sizes, volumes, and/or shapes will be formed in a series of injections by the injector 212. For example, the mold 201 into which the injector will inject a single-phase solution may be a first size of a first style in a first injection and then the next and immediate injection will be for a mold of a second size and a second style of footwear component. As such, different volumes of single-phase solution will be metered by the injector 212 based on the footwear component to be formed for a given mold at the press 210. With each variation in the injection volume, a different dosing of physical blowing agent is provided by the dosing source 220 to the injector 212. This varies from traditional physical foaming injection operations where a consistent injection volume is injected in successive injections into a common mold. Because footwear components are formed in a variety of sizes corresponding to the large variety of footwear sizes, a dynamic dosing solution, as opposed to a static dosing solution that is set and maintained, is included in the system 200 as the dosing source 220.

The physical foaming agent supply 218 may be a tank, canister, vessel, generator, or other component effective to store or produce a physical blowing agent effective for use in the system 200. The physical foaming agent supply 218 is fluidly coupled to the dosing source 220; therefore, the physical foaming agent supply 218 may be a supply line or other remote solution for storing, maintaining, and/or generating the physical blowing agent.

The gas counter pressure source 226 is fluidly coupled with the press 210 and effective to supply a counter pressure to a mold positioned at the press 210 prior and/or during an injection of polymeric composition into the mold. The gas counter pressure source 226 is configured to supply a gas counter pressure ranging from 500 pounds per square inch (psi) to 1,500 psi. However, it is contemplated that pressures above and below this range may be leveraged to achieve a foamed article in the system 200. The gas counter pressure source 226, in a first example, is a compressor or other pressure creating device that is effective to convert a gas from a first pressure to a second, higher pressure. For example, the second pressure may be at or above a critical pressure of the supercritical fluid of the single-phase solution to be injected into the mold 201. The gas counter pressure source 226 is effective to deliver, via the press 210, counter pressure that pressurizes the cavity (e.g., cavity 1420 of FIG. 14B) within the mold 201 positioned at the press 210. Pressurizing the mold cavity with the counter pressure allows a single-phase solution that is injected into the volume of the cavity to remain a single-phase solution (e.g., preventing a foaming action from occurring) as the single-phase solution transitions from the injector through a manifold to the mold. In this way, the initiation of the foaming action can be controlled based on the release of the counter pressure as opposed to initiating immediately at a time of injection. This control over the timing of the initiation in the foaming action (e.g., dropping the pressure below a critical pressure of the physical blowing agent) allows the system 200 to also compensate for the molten polymer to achieve an appropriate temperature prior to foaming. As such, the use of gas counter pressure allows the system 200 to achieve a desired timing of foaming, achieve a desired dispersion of polymer material in the mold cavity prior to foaming, and achieve a desired polymer temperature prior to foaming. Stated differently, the gas counter pressure source 226 allows the mold 201 to maintain the single-phase solution as a single phase until the system 200 is prepared to initiate the foaming of the polymer material.

The gas counter pressure source 226 comprises a regulator 225 that is effective to achieve and maintain a defined pressure in a mold cavity of the mold 201. The regulator 225 is effective in at least two stages. In the first stage, gas counter pressure is introduced into a mold cavity prior to (or during) the injection of the single-phase solution into the cavity. Regardless of the pressure of the gas at the gas counter pressure source 226 that is at or above the set pressure, the regulator 225 is effective to ensure the pressure experienced within the mold cavity is a set pressure. The second stage is during the injection phase. As the injector 212 injects the polymeric composition into the mold cavity, the polymeric composition consumes at least a portion (e.g., 20%) of the mold cavity volume. Without the regulator 225, this consumption of volume by the polymeric composition could result in an increase in pressure within the mold cavity. However, the regulator 225 is effective to equalize the internal cavity pressure with the change in volume experienced during the injection. As some examples of the system rely on controlling pressure of the single-phase solution prior to foaming to achieve an acceptable foamed component, the regulator 225 of the gas counter pressure source 226 is effective in further achieving pressure control.

The gas counter pressure source 226 may supply any suitable fluid as a gas counter pressure. In an example, the gas counter pressure source 226 supplies a gas that is a similar composition to the physical blowing agent. For example, if the physical blowing agent is nitrogen, the gas counter pressure source 226 supplies nitrogen. If the physical blowing agent is carbon dioxide, the gas counter pressure source 226 supplies carbon dioxide. It is also contemplated that the gas counter pressure source 226 supplies air, which may be conditioned to adjust humidity or temperature, as the counter pressure supplied to the mold cavity. Further, it is contemplated that the gas counter pressure source 226 supplies any inert gas, regardless of the physical blowing agent composition. In yet another contemplated example, the gas counter pressure source 226 is fluidly coupled with the physical foaming agent supply 218 as a source for the gas that is supplied by the gas counter pressure source 226 to the press 210 holding the mold.

The unloader 214, which will be discussed in greater detail hereinafter in connection with FIGS. 23-26, is effective to open the mold 201 having a foamed article of footwear component therein. The opening of the mold 201 allows for the removal of the foamed article of footwear component from the mold 201. The unloader 214 receives the mold 201 having a foamed component in the cavity of the mold after the foamed article has achieved a sufficient temperature to provide dimensional stability to the foamed component during and after removal of the foamed component. The temperature may be indirectly determined based on a lapsed period of time following the injection of the polymeric composition and/or based on a temperature conditioning of the mold 201 at a temperature conditioning rack (e.g., temperature conditioning rack 2020) following the injection of the polymeric composition. The unloader 214 is effective to engage with a first portion of the mold (e.g., first carrier plate 908 of FIG. 9) to secure the mold 201 with the unloader 214 while the unloader 214 engages with a second portion (e.g., second carrier plate 906 of FIG. 9) of the mold 201 and separates the first portion of the mold from the second portion of the mold. This separation of the mold portions open the mold for the foamed component to be removed from the cavity within the mold and for the clearing of one or more runners of the mold. The unloader 214 also comprises an RFID reader 256 effective to read an RFID tag (e.g., RFID tag 1708 of FIG. 17) of the mold 201 positioned at the unloader 214. As with other RFID readers in the system 200, the RFID reader 256 is useable to identify, verify, and locate the tooling during the operations of the system 200.

The robot 232 is a multi-axis articulated robot manipulator effective to position the end effector 234 at least at the temperature conditioning racks 202, 204, 206, 208, the press 210, and/or the unloader 214, in an example. The robot 232 may be an industrial robot, such as an articulated robot, but it could be any suitable type of robot capable of maneuvering with multiple degree of freedom (e.g., between 2-7 degrees of freedom based on Cartesian and/or Polar coordinate systems). For example, a Selective Compliance Assembly/Articulated Robot Arm (SCARA) robot or an anthropomorphic robot are contemplated robot configurations. In some examples, the robot 232 rotates about a Z-axis (extends out of the plan view of FIG. 2) of the system 200 and moves along the Z-axis allowing the end effector 234 to be positioned at different heights within the system 200. In this example, the Z-axis defines a point of rotation about which the robot 232 rotates and defines an arc motion path 236. The robot also moves in the X and Y axial directions as the end effector 234 is position at or in the various components of the system 200 to pick and place the mold 201. It is also contemplated that the robot 232 is effective to also rotate about the X-axis and/or Y-axis in some examples. Therefore, the robot 232 may articulate in at least six degree of freedom.

The end effector 234 is the end-of-arm tooling for the robot 232, which is discussed in greater detail in connection with an example of the end effector 234, as end effector 702 of FIGS. 7-8. The end effector 234 is adapted to specifically manipulate the mold 201 used in the system 200. As will be discussed in greater detail in connection with FIGS. 9-10, the tooling includes a quantity of keyways (e.g., the first plate-manipulator keyway 912 and the second plate-manipulator keyway 910 of FIG. 9) for receiving one or more protrusions (e.g., from the end effector 234 and/or other components of the system 200 to position, locate, and/or secure the tooling.

As the robot 232 positions the end effector 234 at a tooling (e.g., mold 201), the end effector 234 engages with the tooling to locate the tooling relative to the end effector 234 and to securely position the tooling at the end effector 234 so that the robot 232 is able to precisely and intentionally position the tooling at a component of the system 200. The end effector 234 and the robot 232 may be commonly controlled by a controller, such as the controller 216 or a similar controller.

The system 200 provides the motion path 236 that represents a circular or arc path that allows for primary conveyance between the components of system 200 to be in a rotational manner about the Z-axis of the robot 232. In an example, at least the temperature conditioning rack 202, the press 210, and the unloader 214 are positioned on, within a set distance of, or inside an arc accessible by the robot 232, such as the motion path 236. It is contemplated that each of the temperature conditioning racks 202, 204, 206, 208, the unloader 214, and the press 210 are positioned within three meters of a common arc having its origin at the Z-axis of rotation for the robot 232. Having these components positioned within at least three meters of the arc ensures the end effector 234 is able to be positioned in a reasonable manner for throughput purposes of the system 200 at each of the components. Stated differently, it is contemplated that the components of the system 200 are within a three-dimensional workspace serviceable by the robot 232 and the end effector 234. In this way, the robot 232, by way of the end effector 234, is capable of picking and placing tooling (e.g., mold 201) at the components of the system 200. This limitation on throughput is emphasized by the system 200 where the injector 212 remains stationary and the robot 232 is responsible for supplying the injector 212 with tooling (e.g., mold 201) for successive injections. In alternative arrangements where the injector moves to the tooling, the motion of the injector may be a limiting factor of the system throughput.

The controller 216 includes a processor and memory and is functional to receive information, store information, process information, and communicate instructions to one or more components of the system 200. The controller 216 is a computing device that is capable of managing, initiating, and controlling processes being performed at one or more components of the system 200. The controller 216 is logically coupled in a wired or wireless manner to one or more components of the system 200. As such, the controller 216 is capable of receiving information from one or more components, storing the information, determining processing steps to be performed by the one or more components, and then communicating instructions for the one or more components to perform to produce a component for an article of footwear.

The controller 216 is programmable to execute one or more instructions to cause the system 200 to manufacture a foamed footwear component. The instructions include tooling management through communication between one or more RFID readers of the system 200. For example, the RFID reader 238 of the temperature conditioning rack 202 interrogates and receives a response from an RFID tag (e.g., RFID tag 1708 of FIG. 17) associated with the mold 201 contained in a known bay of the temperature conditioning rack 202. The RFID reader 238 communicates with the controller 216 information indicating the location of the specific RFID tag associated with the mold 201. The controller 216 also communicates with the thermocouple 240 determining a measured temperature, such as the temperature conditioning plate 203 within the bay at which the RFID tag of the mold 201 is identified. The controller 216 associates the measured temperature with the mold 201. The controller 216 is also provided information as to what the mold 201 associated with the identified RFID tag is configured to form, such as a specific sole size of a specific footwear style.

In an example, the controller 216 is provided a manufacturing target to produce a specified number of a specific footwear style and/or footwear component size. The controller 216, in an example, is configured to determine which molds (e.g., mold 201) of a plurality of molds within the system 200 are able to achieve the target. The controller 216 is also configured to determine appropriate processes to be performed and when for the molds capable of achieving the target. For example, the controller 216 is aware of one or more conditions of the mold (e.g., does the mold contain a foamed article that has yet to be removed, has the mold achieved a sufficient temperature conditioned state, has the mold had sufficient time since a specific operation), and based on the conditions for the mold, the controller determines which mold should be conveyed or otherwise used to achieve the manufacturing target. In yet another example, the controller 216 may be tasked with achieving a manufacturing target that includes a quantity of footwear component sizes to be manufactured in a provided time frame. In this example, the controller 216 takes into consideration the conditions of the various molds (e.g., mold 201) within the system 200 and determines which mold should be conveyed next and to what portion of the system 200. For example, when multiple temperature conditioning racks (e.g., 202, 204, 206, 208) are present in the system 200, the controller 216 may select one of the temperature conditioning racks 202, 204, 206, 208 based on a reduction in robot 232 travel time for that specific operation or over a sequence of conveyances (e.g., taking into consideration what the next conveyance will be after a current conveyance, it may reduce total conveyance time to have a longer initial conveyance of the current conveyance if the subsequent conveyance is reduced by an amount more than the additional initial conveyance time). As such, the controller 216 is effective to dynamically adjust component selection, tooling selection, conveyance paths, and the like in an effort to increase a throughput of the system 200 as a whole. This is in contrast to a linear determination of a traditional system that performs a first step and then a second step regardless of conditions within the system that may delay execution of the first step and/or second step.

Continuing with an example where the controller 216 determines a next conveyance, the controller 216 instructs the robot 232 to position the end effector 234 at the mold 201 that is currently at a known bay of the temperature conditioning rack 202. The end effector 234 then grasps the mold 201 and interrogates the RFID tag (e.g., RFID tag 1708 of FIG. 17) of the mold 201 with an RFID reader (e.g., RFID reader 713 of FIG. 7) of the end effector 234 to confirm the correct mold has been selected. The end effector 234 then communicates with the controller 216 indicating the mold 201 associated with the identified RFID tag is being conveyed, as instructed, to the press 210.

The robot 232, by way of the end effector 234, places the mold at the press 210. The RFID reader 254 of the press 210 interrogates the RFID tag of the deposited mold 201. The RFID reader 254 then communicates with the controller 216 confirming the RFID tag of the mold 201 is positioned at the press 210. The press 210 secures the mold 201 and pairs the mold 201 with the hot-runner plate (e.g., 1116, 1212 of FIG. 2) to align hot-runner outlets (e.g., hot-runner outlet 1513 of FIG. 15C) and a counter pressure outlet (e.g., gas counter pressure outlet 1521 of FIG. 15B) of the hot-runner plate (e.g., 1116, 1212 of FIG. 2) with the appropriate ports on the mold 201. The controller 216 instructs the gas counter pressure source 226 to pressurize a cavity of the mold 201 to an appropriate pressure through the interaction of the mold 201 with the press 210 (e.g., by way of the counter pressure outlet on the hot-runner plate).

The injector 212, as instructed by the controller 216 in advance, doses an appropriate single-phase solution, and injects the metered single-phase solution to the mold 201 by way of the press 210. In this example, the controller 216 anticipates the future injection of a specific mold having a specific mold cavity volume. In anticipation of this specific mold volume, the injector 212 is instructed to prepare the appropriate single-phase solution volume to be injected by the controller 216. This anticipation may include the controller 216 instructing the dosing source 220 to dose a specific amount of physical blowing agent to the injector 212 and for the hopper 222 to dispense a specific amount of polymer material to the injector 212 in anticipation of the injection volume of the yet-to-be received mold and its associated cavity.

The controller 216 is informed of the successful injection into the mold cavity by the injector 212. The controller 216 then, according to programmed operating instructions, instructs the gas counter pressure source 226 to release the gas counter pressure at the mold 201 after a specified time from the injection (or other condition, such as temperature of the injected material, flow coverage of the injected material, or temperature of the tolling). The release of the gas counter pressure in the mold cavity initiates the foaming action of the injected polymeric composition and physical blowing agent, as discussed above. The controller 216 then instructs the robot 232 to retrieve the mold 201 (with the injected material) from the press 210 and to place the mold 201 at a temperature conditioning rack, such as the temperature conditioning rack 204. The controller 216 may then receive a confirmation from the RFID reader (e.g., RFID reader 713 of FIG. 7) of the end effector 234 confirming the mold 201 has been retrieved and placed. Further confirmation may be received as the RFID tag from the mold 201 is further interrogated by an RFID reader (e.g., RFID reader 242) of the temperature conditioning rack (e.g., temperature conditioning rack 2020) that is receiving the mold 201. The confirmation is then communicated to the controller 216. Further, the thermocouple (e.g., thermocouple 244) associated with the bay in which the mold 201 was positioned following the injection provides a temperature reading for the mold 201 as the injected polymeric composition that now foamed cools and become more dimensionally stable. The temperature is reported to the controller 216, which may associate the temperature with the mold 201.

Once an appropriate time or temperature has been reached for the mold 201 following an injection by the injector 212, the controller 216 instructs the robot 232 to retrieve the mold 201 to be positioned at the unloader 214. The determination by the controller 216 as to when the mold can be moved to the unloader 214 is based, in part, on the controller 216 being aware of the time at which the injection into the mold cavity occurred, the time at which the counter pressure was released, the temperature (or approximation of the temperature through inferred readings based on the temperature conditioned plate from which it was selected) of the mold prior to receiving the injection, the temperature (or approximation of such) of the mold following the injection at the temperature conditioning rack, the time the mold was temperature conditioned at the temperature conditioning rack, and the specifics of the mold (e.g., size, style, volume of the mold cavity forming the footwear component). In combination, the controller 216 collects and stores information throughout the process to optimize the throughput of the system 200.

At the unloader 214, the RFID reader 256 interrogates the RFID tag (RFID tag 1708 of FIG. 17) associated with the mold 201 and communicates to the controller 216 the identification of the mold 201. The controller 216 initiates an unloading process of the foamed article from the mold 201. At the conclusion of the unloading process, the controller 216 instructs the robot 232 to retrieve the mold 201 from the unloader 214 and to deposit the mold 201 at a temperature conditioning rack (e.g., temperature conditioning rack 202, 204, 206, 208). The controller 216 may then capture information on the processes performed on the mold 201 during the production of the foamed component. This data is useful in tooling management (e.g., number of cycles) and quality control auditing.

Quality control of the produced components/articles is enhanced with the system 200. The system 200 is capable of tracking and collecting information that is associated with every article manufactured in the system 200. For example, the time, temperature, pressure, material, machine parameters, environmental parameters, tooling parameters, and the like are all capable of being captured, logged, and associated with a specific component that is produced from the system 200. If a defect or other trait is identified in connection with a specific article formed by the system 200, a review of the conditions, parameters, and other variables that are associated with the manufacturing of that specific article is able to be accomplished. The information that is reviewed in connection with a specific article produced in the system 200 is possible, in part, because of the autonomous nature of the system 200. Because the tooling moves autonomously through the system 200, without human intervention, a chain of custody is maintained about the tooling that produces the specific article and therefore the information captured in connection with forming the specific article can be tracked in connection with the specific tooling even prior to the formation of the specific article. Stated differently, the system 200 is effective to capture and maintain information useful in quality control and manufacturing process reviews of specific article formed by the system 200.

The above process is a non-limiting example of how the system 200 with the controller 216 may operate. It is contemplated that, while a single controller 216 is depicted and described, in actuality, a quantity of controllers may operate in concert to achieve the functions provided herein. For example, the robot 232, the press 210, the injector 212, and/or the unloader 214 may have dedicated controllers that operate independently or at the guidance of the controller 216. As such, the use of the controller 216 is a general indicator of a computing device capable of controlling one or more aspects of the system 200 that may be divided among a plurality of controllers that are in logical communication through wired or wireless communication protocols.

The system 200 is a non-limiting example of a system contemplated herein. It is understood that any number of individual components may be incorporated in the system 200. For example, four temperature conditioning racks 202, 204, 206, 208 are depicted, but it could be one temperature conditioning rack, two temperature conditioning racks, three temperature conditioning racks, five temperature conditioning rack, or any suitable number of temperature conditioning racks. Similarly, an example of the positioning for the various components are provided for illustration purposes, but alternative positioning is contemplated. For example, it is contemplated that the press 210 or the unloader 214 may be positioned between two or more of the temperature conditioning racks (e.g., 204, 206) to optimize, through minimization, the travel time of the robot 232 between the various components. Specifically, because the mold 201 travels in a sequence from a temperature conditioning rack (e.g., temperature conditioning rack 202, 204, 206, 208), to the press 210, to a temperature conditioning rack (e.g., temperature conditioning rack 202, 204, 206, 208), to the unloader 214, to a temperature conditioning rack (e.g., temperature conditioning rack 202, 204, 206, 208), providing temperature conditioning racks at intermediate location between the press 210 and the unloader 214 may reduce travel time by the robot 232, in an example. Further, the schematic illustration of FIG. 2 is merely for illustration purposes and is not limiting as to size, location, relative position, or scale. Further yet, it is contemplated that one or more components may be omitted from the system and/or that one or more components may be introduced to the system.

Figure 3:
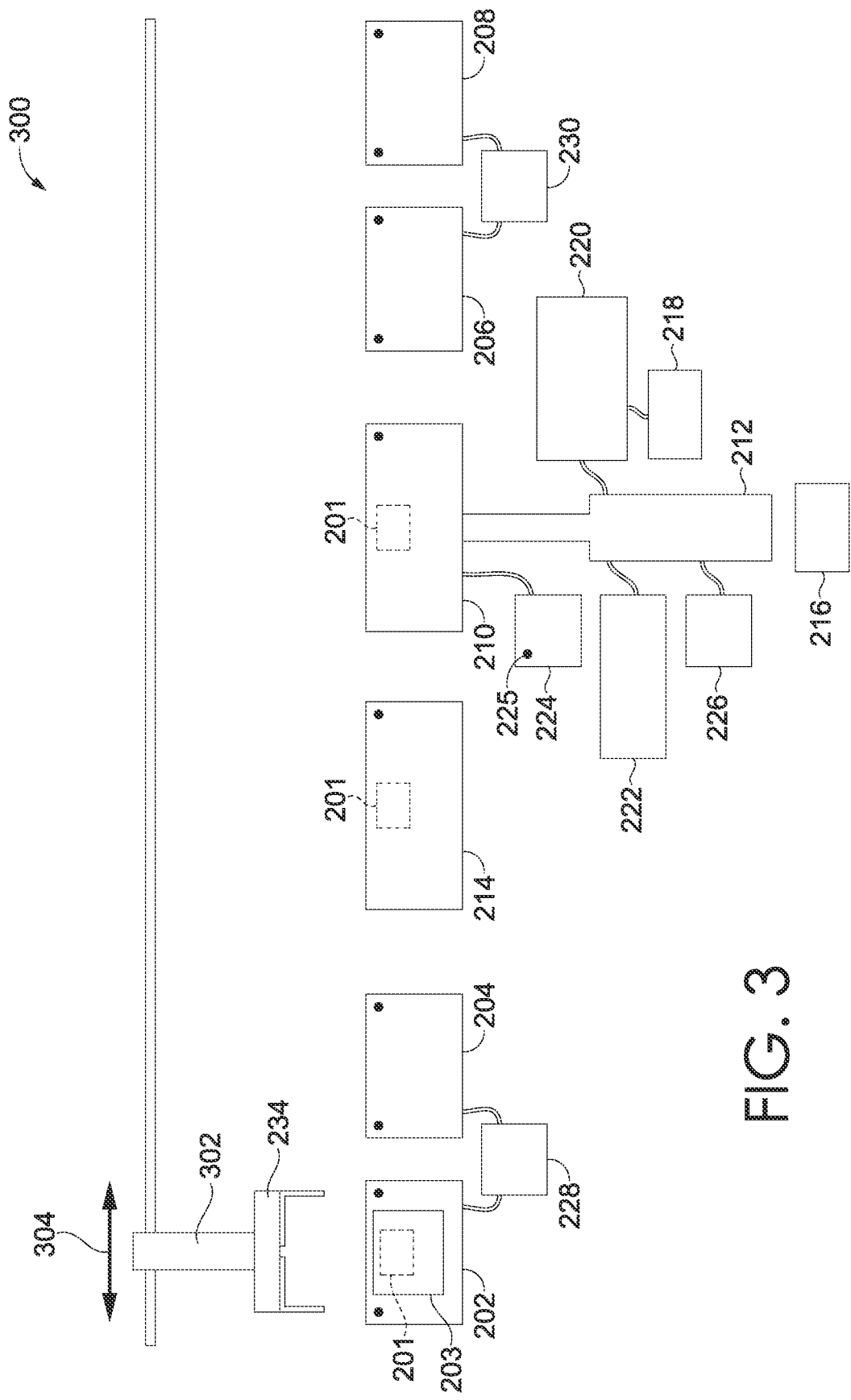
FIG. 3 depicts a schematic plan view of a footwear component manufacturing system in a second configuration, in accordance with aspects hereof.

FIG. 3 depicts a schematic plan view of a footwear component manufacturing system 300 in a second configuration, in accordance with aspects hereof. The components of the system 300 that are similarly number to those of FIG. 2 will not be discussed in detail again and instead are understood from the discussion in FIG. 2 for the similarly numbered elements. However, the second configuration of the system 300 demonstrates a non-arc/rotary motion path 304 provided by a robot 302. In this example, the robot 302 is a gantry-style robot that is effective to move tooling (e.g., a mold) in a linear fashion through the system 300. As was discussed in connection with the system 200 of FIG. 2, the system 300 is based on a concept of moving the tooling (e.g., mold 201) through the system as opposed to traditional injection molding operations where the injector 212 is moved to the tooling. This alternative approach is specifically adapted to the manufacturing of footwear components that come in a variety of injection volumes and of significant foam volumes (e.g., part thickness) that self insulate and therefore slow the cooling of the foamed part following the foaming (e.g., the part insulates itself because of the significant foam volume). As such, the system 300, like the system 200 of FIG. 2, is configured to move the mold 201 to the injector 212 as opposed to moving the injector 212 to the mold 201.

The robot 302 operates in a manner similar to what was described in connection with the robot 232 of FIG. 2. However, instead of a primary movement path that is based on rotation as was done in FIG. 2, the robot 302 has primary movement capabilities in a linear manner along the motion path 304. In addition to movement along motion path 304, the robot 302 may also move in the Z-axis and the X-axis when the motion path 304 is in the Y-axis direction. This movement is sometimes referred to as a Cartesian robot. It is contemplated that additional motion fields are possible, such as a rotation about any of the X, Y, and/or Z-axis.

The linear (e.g., non-arc/rotary) primary motion path of the system 300 may provide for additional scalability to the system 300 over an arc motion path system, in some examples, For example, the linear distance can be expanded indefinitely to incorporate additional components that are accessible by the robot 302. This is in contrast to the arc or rotary motion path of a robotic arm that has a limited reach based on the arm configuration and therefore a limited circumference length as a motion path along which components are placed that is able to support additional components. Further, while component are depicted on a single side of the motion path 304, it is contemplated that components may be placed on both sides of the motion path and that two or more robots may operate in parallel motion paths or in a common motion path, in an example.

The arrangement of the components in the system 300 is provided to optimize throughput of the system 300, in an example. For example, temperature conditioning racks (e.g., temperature conditioning rack 202, 204, 206, 208) are positioned on both sides of the unloader 214 and the press 210. However, it is contemplated that depending on the configuration of the temperature conditioning racks, the process parameters, and the robot prioritization, that an alternative arrangement of components results in an optimized throughput of the system 300. For example, it is contemplated that at least one temperature conditioning rack (e.g., temperature conditioning rack 202, 204, 206, 208) may be positioned between the press 210 and the unloader 214 to provide optimized throughput on the system depending on the process parameters (e.g., injection time, resting time, robot velocity). Further, it is contemplated that the temperature conditioning racks 202, 204, 206, 208, the unloader 214, and the press 210 are all positioned within three meters of a common line that is parallel to the motion path 304. This relative positioning ensures the end effector 234 is effective to access each of the components without significantly sacrificing the throughput of the system 300 through excessive robot motion compensating for components of the system out of alignment relative to the motion path of the robot 302.

The system 300 is a non-limiting example of a system contemplated herein. It is understood that any number of individual components may be incorporated in the system. For example, four temperature conditioning racks 202, 204, 206, 208 are depicted, but it could be one temperature conditioning rack, two temperature conditioning racks, three temperature conditioning racks, five temperature conditioning rack, or any number of temperature conditioning racks. Similarly, an example of the positioning for the various components is provided for illustration purposes, but alternative positioning is contemplated. Further, the schematic illustration of FIG. 3 is merely for illustration purposes and is not limiting as to size, location, relative position, or scale. Further yet, it is contemplated that one or more components may be omitted from the system 300 and/or that one or more components may be introduced to the system 300.

FIG. 4 depicts a perspective view 400 of a temperature conditioning rack 402 and a temperature control unit 428, in accordance with aspects hereof. The temperature conditioning rack 402 is an example embodiment of the previously discussed temperature conditioning racks 202, 204, 206, and 208 of FIG. 2. The temperature conditioning rack 402 is comprised of a quantity of bays 404, 406, 408, 410, 412, and 414. The quantity of bays may be any number, such as one bay, two bays, three bays, four bays, six bays, seven bays, eight bays, nine bays, or ten bays. For example, the temperature conditioning rack 402 may include four to eight bays, in an example. The number of bays is selected as an optimization for system throughput. The number of bays are limited based on the minimum distance for the tooling to be maintained between the stacked bays and for the end effector of a robot to access, position, and remove the tooling from the bays. The height of the temperature conditioning rack is also limited, (e.g., mold 201) in some examples, to a height that is accessible by the robot, such as an arm-style robot having limited reach. Furthermore, the number of bays is limited, in part, by a capacity of the temperature control unit 428 to effectively condition a temperature for the number of bays. As such, aspects contemplated that the temperature conditioning rack 402 having four to eight bays satisfies the conditions identified and provides an effective throughput for the system. However, as process parameters, components, and/or conditions are adjusted, an alternative range of bays is contemplated and provided herein.

The six bays of the temperature conditioning rack 402 are each provided with a temperature conditioning plate, such as a temperature conditioning plate 416 in the bay 408. A temperature conditioning plate may be a separate component of the bay or it may be integrally formed in the bay. The temperature conditioning plate 416 is effective to condition a temperature of tooling placed thereon. For example, a mold 502 as shown in FIG. 5 is positioned on the temperature conditioning plate 416. The temperature conditioning plate 416, in an example, includes a top surface 426 that interfaces with the tooling (e.g., mold 502 of FIG. 5) when the tooling is positioned on the temperature conditioning plate 416 and the temperature conditioning plate 416 is comprised of a bottom surface that, in an example, is supported by the bay.

The temperature conditioning plate 416 includes a fluid channel (not shown) that extends between the top surface 426 and the bottom surface that begins at a fluid input port (not shown) and terminates at a fluid output port (not shown). The fluid input port is fluidly coupled with the temperature control unit 428 and the fluid output port is fluidly coupled with the temperature control unit 428 allowing for a circulation of temperature conditioning fluid between the temperature control unit 428 and the temperature conditioning plate 416. The temperature conditioning rack 402 also includes a temperature conditioning fluid manifold 436 that serves as a fluid coupling between the temperature control unit 428 and the temperature conditioning plate 416. The temperature conditioning fluid manifold 436 is effective to control the distribution of the temperature conditioning fluid from the temperature control unit 428 to the quantity of bays. This controlled distribution of the temperature conditioning fluid by the temperature conditioning fluid manifold 436 provides, in an example, a more equal temperature distribution of the temperature conditioning fluid among the quantity of bays.

The temperature conditioning fluid manifold 436 may have one or more valves that are dynamically or manually controlled to further control the distribution of the temperature conditioning fluid in an even (e.g., consistent flow rate, consistent temperature) manner. An example of a valve used by the temperature conditioning fluid manifold 436 is a valve 434. The valve 434 may be controlled by a controller (e.g., controller 216 of FIG. 2) to adjust a flow of the temperature conditioning fluid provided to the temperature conditioning plate 416. For example, if the temperature conditioning plate 416 is not being used, the valve 434 may restrict the flow of the temperature conditioning fluid in an effort to conserve energy used to temperature condition the temperature conditioning plate 416 when not conditioning the tooling. The temperature control unit 428 is fluidly coupled, at least in part, with the fluid input port via supply line 432 and the temperature control unit 428 is fluidly coupled, at least in part, with the fluid output port via return line 430. Each of the supply line 432 and the return line 430 may be fluidly coupled with a respective manifold (e.g., temperature conditioning fluid manifold 436).

The temperature conditioning plate 416 also includes a first protrusion 418 extending outwardly from the top surface 426. The first protrusion 418 is sized, shaped, and positioned on the top surface 426 to be received by a first plate-alignment keyway 1704 of FIG. 17 in a bottom surface of the tooling, as will be discussed in greater detail in connection with FIG. 17 hereinafter. The top surface 426 is also comprised of a second protrusion 420 extending outwardly from the top surface 426. The second protrusion 420 is sized, shaped, and positioned on the top surface 426 to be received by a second plate-alignment keyway 1706 of FIG. 17 in a bottom surface of the tooling. The first protrusion 418 is asymmetrical with respect to the second protrusion 420 in one or more characteristics. Those characteristics include, but are not limited to, protrusion length extending from the top surface 426, the protrusion cross section as taken in a plane parallel to the top surface 426 are as taken in a plane perpendicular to the top surface 426, the position of the protrusion on the top surface 426, a size of the protrusion (e.g., width), or any combination.

The asymmetry between the first protrusion 418 and the second protrusion 420 is effective to ensure the tooling is positioned in a proper orientation and a proper location within a bay. This proper orientation and positioning ensure that the end effector (e.g., end effector 234 of FIG. 2), which operates with very tight tolerances (e.g., less than 2 millimeters) is capable of securing the tooling without intervention by a human operator. The proper orientation and positioning also ensures that the tooling having an RFID tag is positioned appropriately relative to an RFID reader 438 to be interrogated and confirmed in the specific bay. Further yet, the orientation and position confirmation provided by the asymmetry of the two protrusions also ensure that tooling is properly aligned with a thermocouple (e.g., thermocouple 424 of FIG. 4) of the temperature conditioning plate 416. In an example, the thermocouple 424 is placed in a recess 422 to prevent interference with the tooling as the tooling is positioned on and off of the temperature conditioning plate 416. In this example, the thermocouple 424 is recessed in the recess 422 such that the thermocouple is flush or slightly recessed from the top surface 426.

The temperature control unit 428 is an example embodiment of the temperature control unit 228 of FIG. 2. The temperature control unit 428 is effective to condition (e.g., heat or cool) a conditioning fluid to a temperature from 15 degrees Celsius to 90 degrees Celsius, from 50 degrees Celsius to 80 degrees Celsius, and/or from 55 degrees Celsius to 70 degrees Celsius. It is contemplated that the temperature control unit 428 services two or more temperature conditioning racks (e.g., temperature conditioning racks 202 and 204 of FIG. 2). For example, the temperature control unit 428 has a plurality of inlets and outlets to fluidly connect with a plurality of components, such as two temperature conditioning racks via the supply line 432 and the return line 430.

FIG. 5 depicts a configuration 500 having the temperature conditioning rack 402 and the temperature control unit 428 of FIG. 4 having a quantity of molds 502, 504, in accordance with aspects hereof. The first mold 502 is supported in bay 408 on the temperature conditioning plate 416. A second mold 504 of the quantity of molds is depicted in the bay 414.

FIG. 6 depicts the temperature conditioning rack 402 of FIG. 5 in a rear perspective view 600, in accordance with aspects hereof. The back perspective view illustrates the second protrusion 420, the recess 422, and the RFID reader 438 with better clarity. FIGS. 4-6 provide an example temperature conditioning rack 402. It is understood that any size of temperature conditioning rack may be implemented having any number of bays, temperature conditioning plates, and configurations. Therefore, while FIGS. 4-6 provide and describe a specific temperature conditioning rack, it is not intended to be limiting to the system and methods provided herein.

Figure 7:
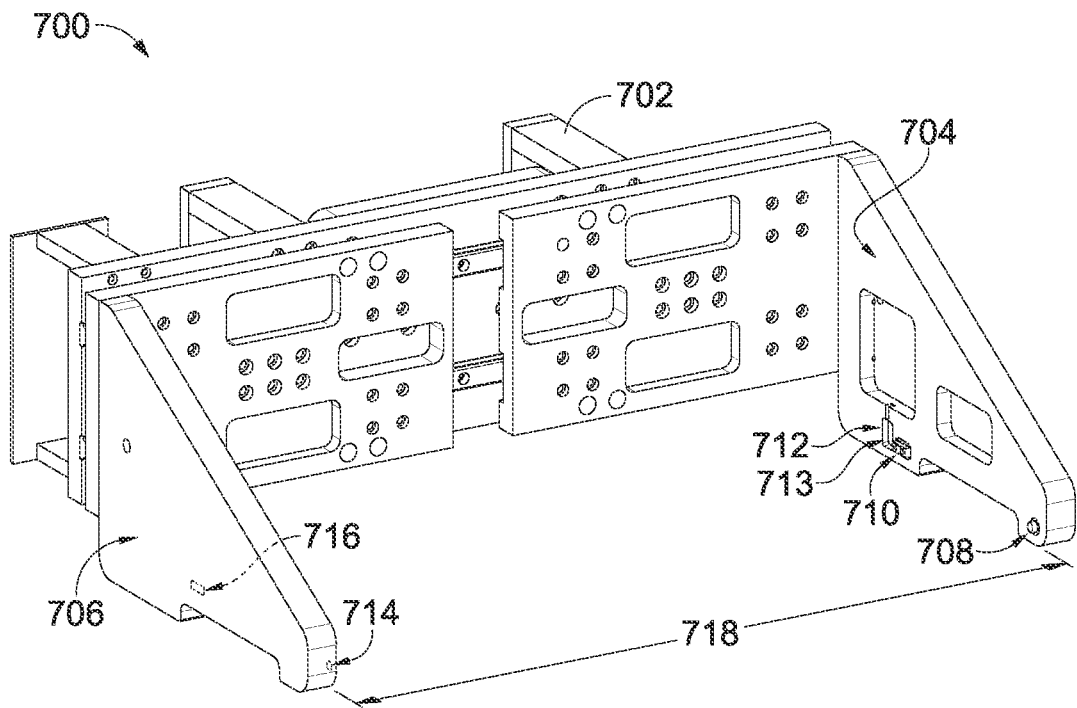
FIG. 7 depicts an end effector in a first configuration, in accordance with aspects hereof.

FIG. 7 depicts an end effector 702 in a first configuration 700, in accordance with aspects hereof. The end effector 702 is an example embodiment of the previously discussed end effector 234 of FIG. 2. The end effector 702 is comprised of a first side 704 and a second side 706. The first side 704 and the second side 706 are slideably positioned on the end effector 702 to move between a first distance 718 and a second distance 802 depicted in FIG. 8. This slideable movement allows the first arm 704 and the second arm 706 to converge on a first side of tooling and a second side of the tooling (e.g., mold 900 of FIG. 9) respectively to engage the end effector 702 with the tooling. The tooling will be described relative to FIG. 9 hereinafter.

The first arm 704 and the second arm 706 are in a parallel configuration such that as the first arm 704 and the second arm 706 position between the first distance and the second distance, they converge on the tooling and align with the tooling to work within the tight tolerances of the robot (e.g., robot 232 of FIG. 2) controlling the end effector 702. Stated differently, the first arm 704 and the second arm 706 remain parallel to sides of the tooling to which they will engage as the first arm 704 and the second arm 706 move into an engagement configuration. The parallel arrangement allows for secured engagement and operation within tight tolerances.

The first arm 704 is comprised of a first protrusion 708 and a second protrusion 710. Each of the first protrusion 708 and the second protrusion 710 extend outwardly from the first arm 704 toward the second arm 706. Similarly, the second arm 706 is comprised of a third protrusion 714 and a fourth protrusion 716 that extend outwardly from the second arm 706 toward the first arm 704. The first protrusion 708 is asymmetrical with respect to the second protrusion 710 in one or more characteristics. The characteristics include, but are not limited to, the protrusion length, protrusion cross section shape, protrusion position, protrusion size, and any combination thereof. Similarly, the third protrusion 714 is asymmetrical with respect to the fourth protrusion 716 in one or more characteristics. The characteristics include, but are not limited to the protrusion length, protrusion cross section shape, protrusion position, protrusion size, and any combination thereof. It is contemplated that the first protrusion 708 and the third protrusion 714 are symmetrical in one or more characteristics and the that second protrusion 710 and the fourth protrusion 716 are symmetrical in one or more characteristics. For example, the first protrusion 708 may have a cylindrical volume while the second protrusion 710 may be a rectilinear volume. In this example, the second protrusion 710 having the rectilinear volume would not engage with a keyway configured to receive a cylindrical volume of the first protrusion 708.

The characteristics of each protrusion are adapted to be received in and therefore engage with a respective keyway in a tool, such as a mold. This coordination between protrusion characteristics and an associated keyway allows for the end effector 702 to securely engage the tool in a known location and orientation to similarly position the tool at a known location and orientation.

The end effector 702 is comprised of an RFID reader 713 that is received in a recess 712 of the first arm 704. The position of the recess 712 is selected such that the RFID reader 713 is capable of interrogating an RFID tag (e.g., RFID tag 1708 of FIG. 17) on a specific location of an engaged mold (e.g., mold 900 of FIG. 9). The close proximity between the RFID reader 913 and the RFID tag limits identification errors or failures to interrogate the RFID tag. As previously provided, the RFID reader 913 of the end effector 702 is effective to report the RFID tag identification to a controller (e.g., controller 216 of FIG. 2) for process management and system coordination. The end effector 702 is also comprised of a movement mechanism, such as an electric linear actuator, a pneumatic actuator, a hydraulic actuator, or other drive system (not shown). The movement mechanism responds to a command to adjust the distance between the first arm 704 and the second arm 706. Stated differently, the movement mechanism is mechanically joined with the first arm 704 and/or the second arm 706 to adjust a relative position of the first arm 704 and/or the second arm 706 to engage and disengage with a mold (e.g., mold 900 of FIG. 9) between the first arm 704 and the second arm 706.

Figure 8:
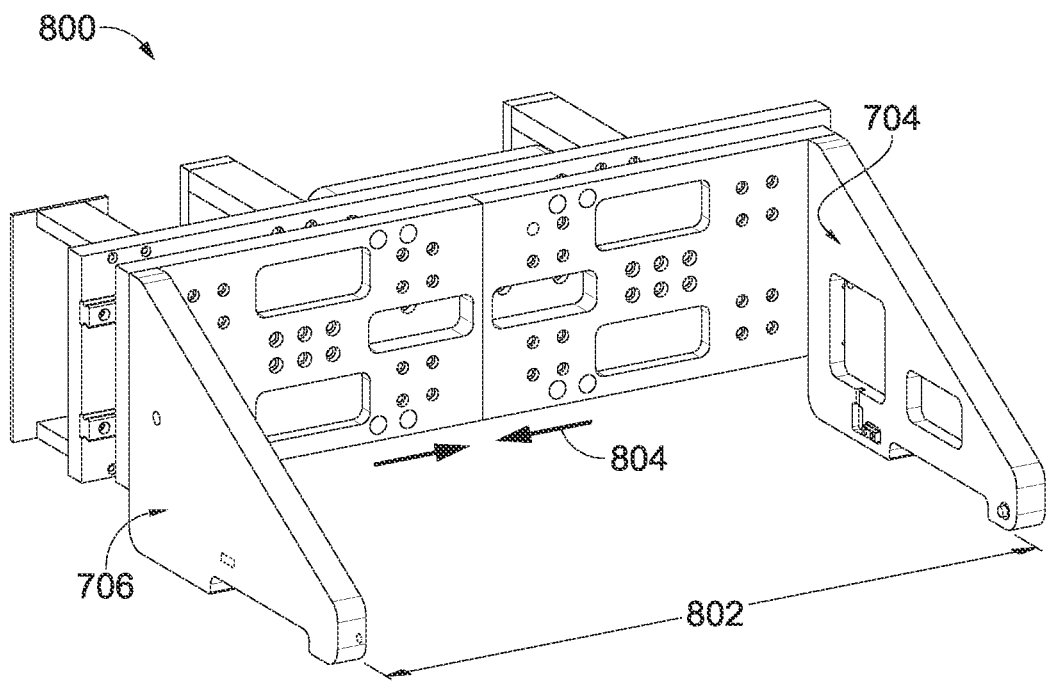
FIG. 8 depicts the end effector of FIG. 7 in a second configuration, in accordance with aspects hereof.

FIG. 8 depicts the end effector 702 of FIG. 7 in a second configuration 800, in accordance with aspects hereof. As depicted in FIG. 8, the first arm 704 and the second arm 706 converge in a sliding motion depicted by directional indicators 804. This convergence results in a distance 802 extending between the first arm 704 and the second arm 706. This second configuration 800 is appropriate to engage with and secure a mold (e.g., mold 900 of FIG. 9), in an example.

The end effector 702 of FIGS. 7 and 8 is a non-limiting example of an end effector contemplated herein. While specific structures, configurations, and elements are depicted and described, it is contemplated that additional or alternative structures, configurations, and/or elements may form an end effector effective in the system and methods contemplated herein.

Figure 9:
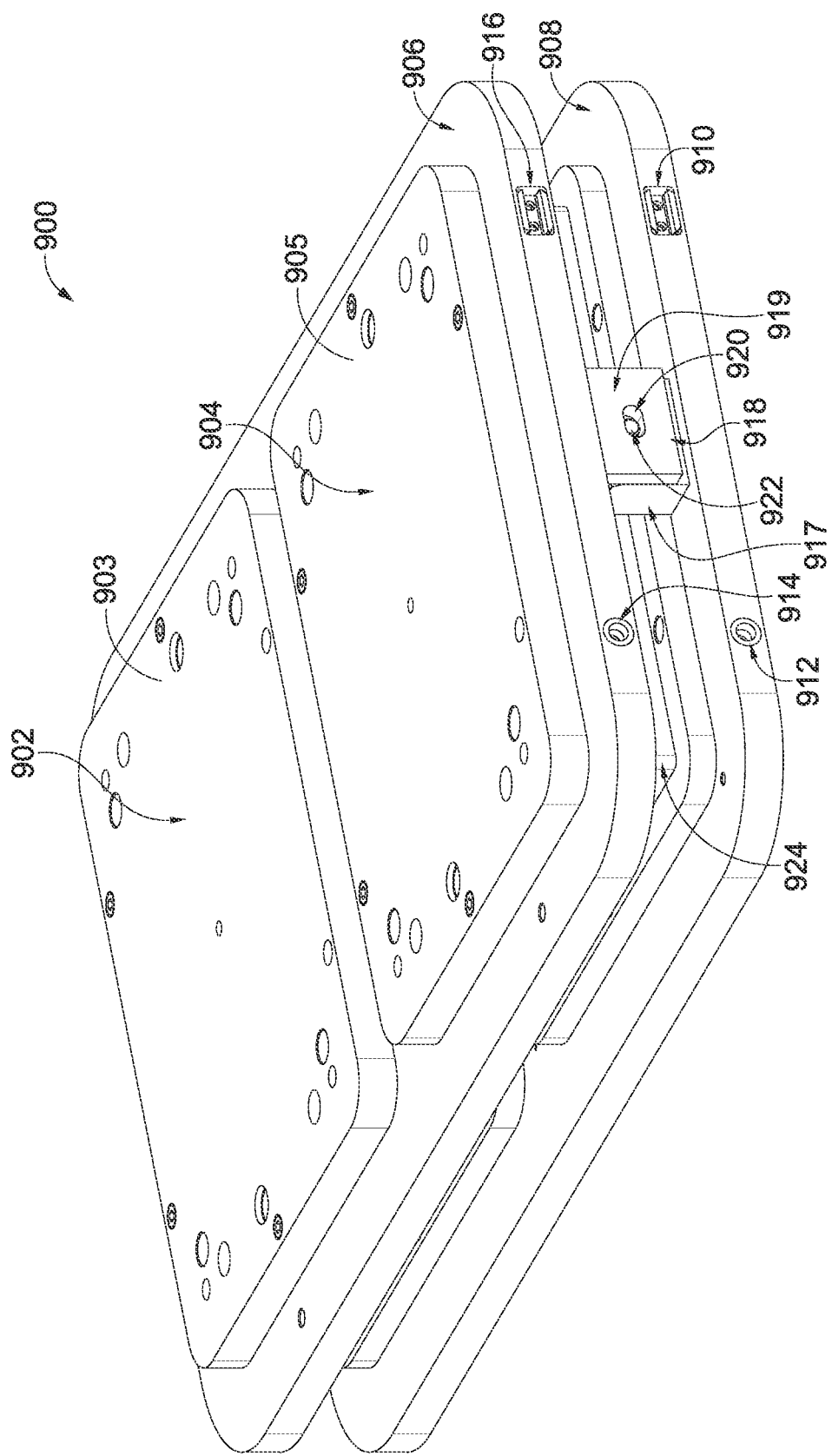
FIG. 9 depicts a perspective view of a mold, in accordance with aspects hereof.

FIG. 9 depicts a perspective view of a mold 900, in accordance with aspects hereof. The mold 900 is a specific form of a tool or tooling as commonly referenced herein. Alternative tooling, such as alternative molds, are contemplated as being utilized and effective in the system (e.g., system 200 of FIG. 2) and methods provided herein. The mold 900 is comprised of a first mold portion 903 and a second mold portion 905. It is contemplated that each of the mold portions 903, 905 includes a mold cavity (e.g., mold cavity 1420 of FIG. 14) effective to form a component (e.g., footwear sole component) using the system and methods provided herein. For example, the first mold portion 903 is effective to form a right sole portion and a left sole portion for a pair of footwear. Similarly, the second mold portion 905 is effective to form a right sole portion and a left sole portion to form a second pair of footwear. In this example, the first mold portion 903 is comprised of a first mold cavity for the right sole and a second mold cavity for the left sole. The second mold portion 905 is comprised of a third mold cavity for the right sole of the second pair and a fourth cavity for the left sole of the second pair. It is contemplated that the mold cavity volumes of the first mold portion 903 is similar to or equal to the mold cavity volumes of the second mold portion 905. This commonality in mold volumes allows for consistent injection volumes as distributed by a manifold (e.g., injection manifold 1811 of FIG. 18B) serving as a conduit between an injector (e.g., 212 of FIG. 2) and the mold cavities. Maintaining consistency between mold volumes that are injected with a common injection shot from an injector provides greater control on the resulting product, in an example.

The mold 900 is comprised of a first top mold plate 902 and a second top mold plate 904. The mold 900 is comprised of a first carrier plate 908 and a second carrier plate 906. The mold 900 is comprised of a ring mold plate 924 and a tooling latch assembly 918. The tooling latch assembly 918 is comprised of a first portion 917 extending from the first carrier plate 908 towards the second carrier plate 906 and a second portion 919 extending from the second carrier plate 906 towards the first carrier plate 908. The first portion 917 and the second portion 919 of the tooling latch assembly 918 are offset and parallel positioned to interface and join when a biased pin 922 extending out from the first portion 917 towards the second portion 919 and extends, when in the biased position, into an aperture 920 of the second portion 919. The biased pin 922 may be manipulated by a key (e.g., key 2606 of FIG. 24) from an unloader (e.g., unloader 2300 of FIG. 24) to recess the biased pin 922 from the aperture 920 allowing the first portion 917 and the second portion 919 to slideably disengage and the first carrier plate 908 to distance itself from the second carrier plate 906, which allows the mold 900 to open. Having the biased pin 922 engaged in the aperture 920, the mold 900 is latched in a closed position.

Each of the carrier plates 906, 908 include keyways intended to engage with protrusion from different components of the system, as will discussed in more detail hereinafter. The first carrier plate 908 is comprised of a first plate-manipulator keyway 912 and a second plate-manipulator keyway 910. The second carrier plate 906 is comprised of a first plate-opening keyway 914 and a second plate-opening keyway 916. The first plate-manipulator keyway 912 and the second plate-manipulator keyway 910 are asymmetrical in at least one characteristic. The one or more characteristics include a keyway depth, cross section shape, position, size, or any combination. For example, the first plate-manipulator keyway 912 has a cylindrical volume and the second plate-manipulator keyway 910 has a rectilinear volume.

In practice, the first plate-manipulator keyway 912 is adapted to receive the third protrusion 714 of the end effector 702 from FIG. 7 and the second plate-manipulator keyway 910 is adapted to receive the fourth protrusion 716 of the end effector 702 from FIG. 7. Similarly, the first plate-opening keyway 914 is adapted to receive a first protrusion 2320 from an unloader 2300 that will be discussed in connection with FIG. 25 and the second plate-opening keyway 916 is adapted to receive a second protrusion 2322 from the unloader 2300 of FIG. 25. The opposite side of the tooling from the location of the first plate-manipulator keyway 912, the second plate-manipulator keyway 910, the first plate-opening keyway 914, and the second plate-opening keyway 916 is contemplated to have similar keyways. The similar keyways may be symmetrical to the respective keyway on the depicted side of FIG. 9. Alternatively, it is contemplated that the keyways on the opposite side of the mold 900 from the side depicted in FIG. 9 are asymmetrical in one or more characteristics to their respective keyways on the depicted side of the mold 900 in FIG. 9.

Figure 10:
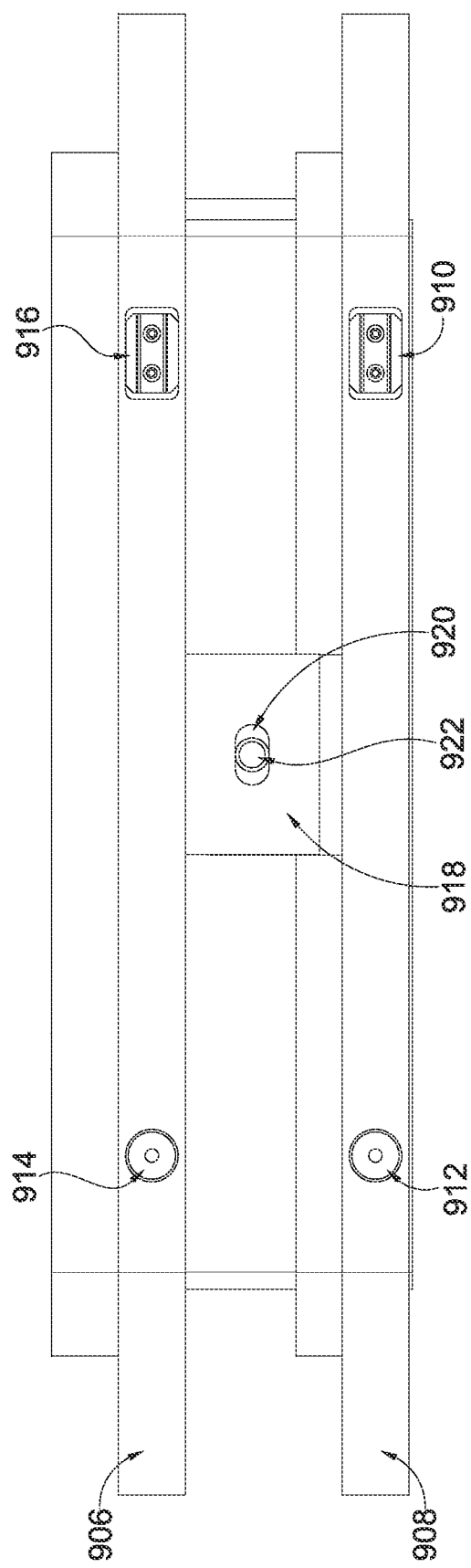
FIG. 10 depicts a side view of the mold of FIG. 9, in accordance with aspects hereof.

FIG. 10 depicts a side view of the mold 900 discussed in connection with FIG. 9, in accordance with aspects hereof. The mold 900 is provided as a non-limiting example for tooling that may be implemented in the system and method contemplated herein. The tooling may produce alternative foamed components; have alternative elements, alternative configurations, alternative sizing, and alternative configurations. As such, the system and methods contemplated herein may implement alternative tooling within the cope contemplated.

Figure 11:
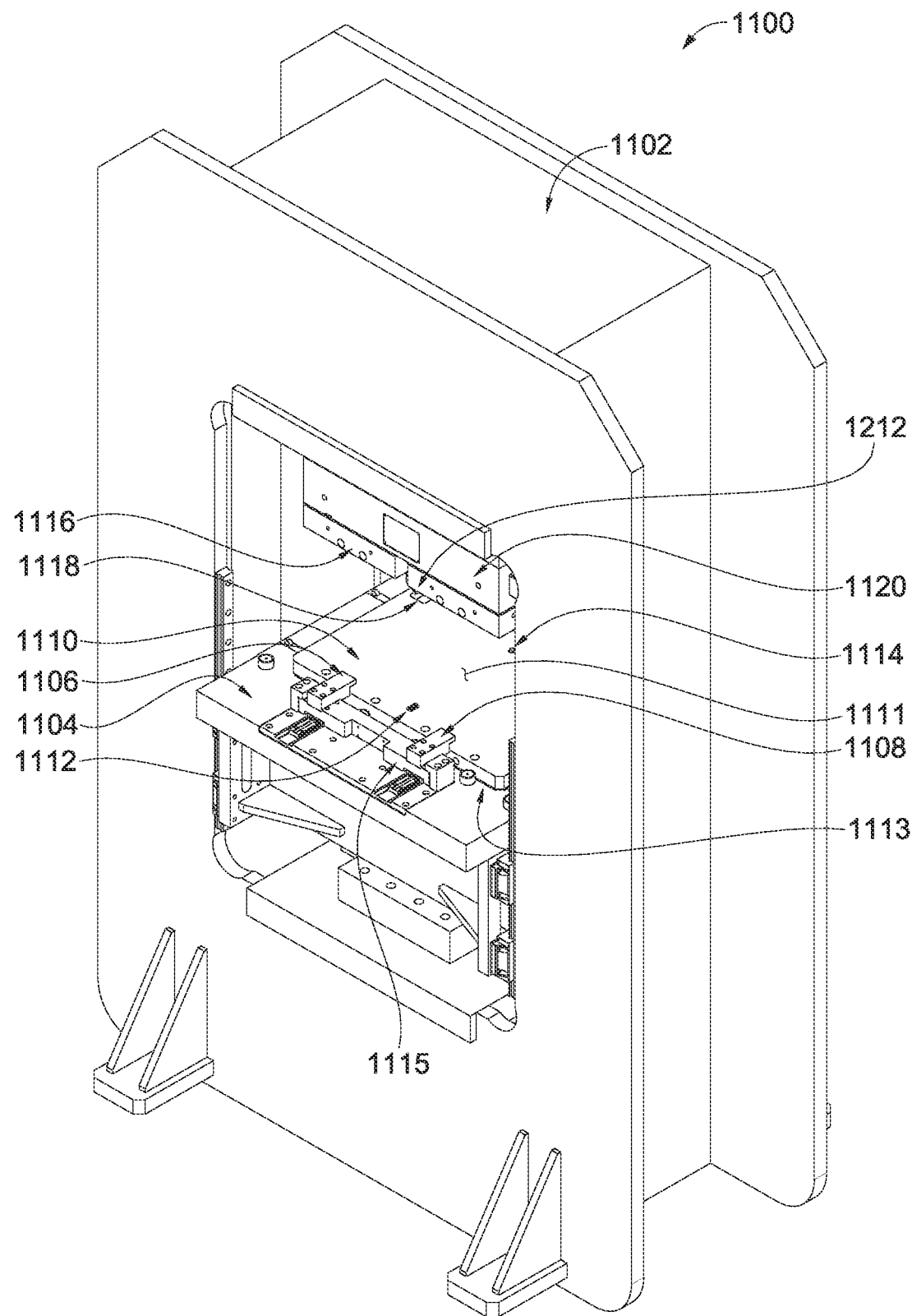
FIG. 11 depicts a perspective view of a press, in accordance with aspects hereof.

FIG. 11 depicts a perspective view of a press 1100, in accordance with aspects hereof. The press 1100 is an example embodiment of the press 210 previously discussed in connection with FIG. 2. The disclosure of the press 210 of FIG. 2 is applied to the press 1100 herein. The press 1100 has a frame 1102 with a moveable support platform 1104. The moveable support platform 1104 is moveable by one or more actuators, such as a first actuator 1202 of FIG. 12 and a second actuator 1204 also of FIG. 12. The press 1100 also includes a press plate 1110 that has a top surface 1111 and an opposite bottom surface 1113. The press plate bottom surface 1113 is positioned on the moveable support platform 1104 and the press plate top surface 1111 is positioned to receive and support a tooling, such as the mold 900 form FIG. 9. The press 1100 also includes a press lock 1115 that is moveable between a locked configuration and an unlocked configuration. In the locked configuration, the press lock 1115 secures a tooling (e.g., mold 900 as depicted in FIG. 13), such as through engagement with a first carrier plate 908 of the mold 900 from FIG. 9. The press lock 1115 includes a pair of sliding fingers 1106, 1108 that move in a direction transverse to a direction that the moveable support platform 1104 moves. The pair of sliding fingers include a first finger 1106 and a second finger 1108. The first finger 1106 and the second finger 1108 are able to move in unison to engage a common surface of the tooling to secure the tooling to the press plate 1110. A second pair of fingers (not shown) also move in a direction transverse to a direction that the moveable support platform 1104 moves and in a direction of disagreement with the pair of sliding fingers 1106, 1108. The pair of fingers 1106, 1108 and the second pair of fingers work in cooperation to secure the tooling (e.g., mold 900 as depicted in FIG. 13) to the press plate 1110. The press plate 1110 also includes a first protrusion 1112 extending from the top surface 1111 toward a hot-runner plate 1116 and a second hot-runner plate 1212. The press plate 1110 also includes a second protrusion 1114 extending from the top surface 1111 toward the hot-runner plate 1116 and the second hot-runner plate 1212.

The first protrusion 1112 is asymmetrical with respect to the second protrusion 1114 in one or more characteristics. Those characteristics include, but are not limited to, protrusion length extending from the top surface of the press plate 1110, the protrusion cross section as taken in a plane parallel to the top surface of the press plate 1110, the position of the protrusion on the top surface of the press plate 1110, a size of the protrusion (e.g., width), or any combination.

The asymmetry between the first protrusion 1112 and the second protrusion 1114 is effective to ensure the tooling (e.g., mold 900 as depicted in FIG. 13) is positioning in a proper orientation and a proper location within the press 1100. This proper orientation and positioning ensure that the tooling aligns with the hot-runner plate 1116 and, by extension, and injection manifold 1120 that serves as a conduit for injected polymeric composition to the tooling. The proper orientation and positioning also ensures that the tooling having an RFID tag is positioned appropriately relative to an RFID reader 1118 to be interrogated and confirmed in the press 1100. Further yet, the orientation and position confirmation provided by the asymmetry of the two protrusions 1112, 1114 also ensure that tooling is properly aligned with a thermocouple of the press plate 1110, if present.

The first protrusion 1112 and the second protrusion 1114 operate in a manner similar to the first protrusion 418 and the second protrusion 420 of the temperature conditioning rack 402 discussed in connection with FIG. 4. Stated differently, common alignment keyways in the tooling are effective for aligning the tooling in at least two components of the system, such as the temperature conditioning rack 402 and the press 1100.

The press plate 1110, in an example, includes a conditioning fluid channel (not shown) extending between the top surface 1111 and the bottom surface 1113. The conditioning fluid channel has an inlet (not shown) and an outlet (not shown) allowing the press plate 1110 to be fluidly coupled with a temperature control unit (e.g., temperature control unit 204 of FIG. 2). In this way, the press plate 1110 may function to condition tooling during and/or after an injection, in part, in a manner similarly described with the temperature conditioning plate 416 of the temperature conditioning rack 402 of FIG. 4.

Figure 12:
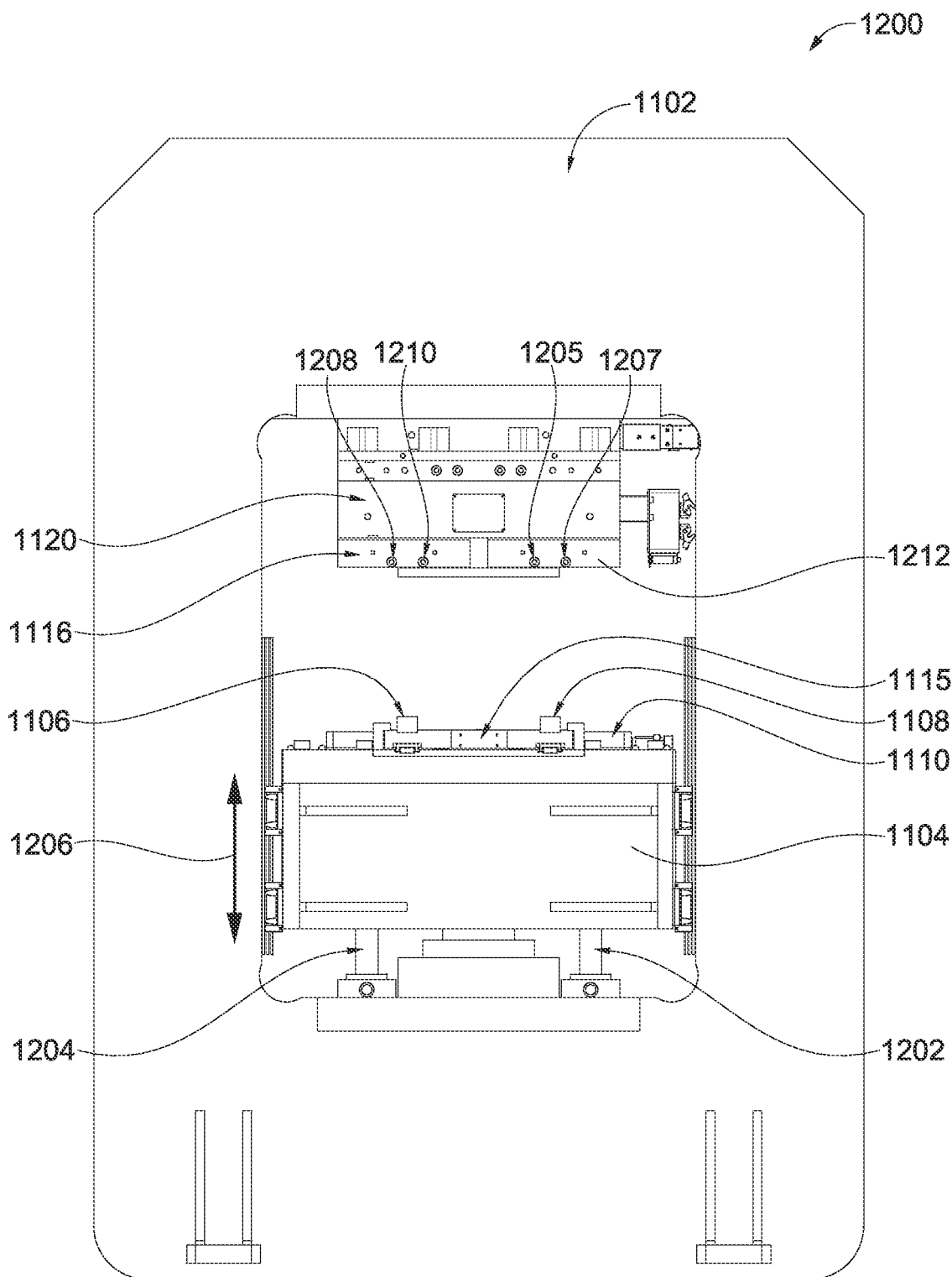
FIG. 12 depicts a front view of the press from FIG. 11 in a first configuration, in accordance with aspects hereof.
Figure 13:
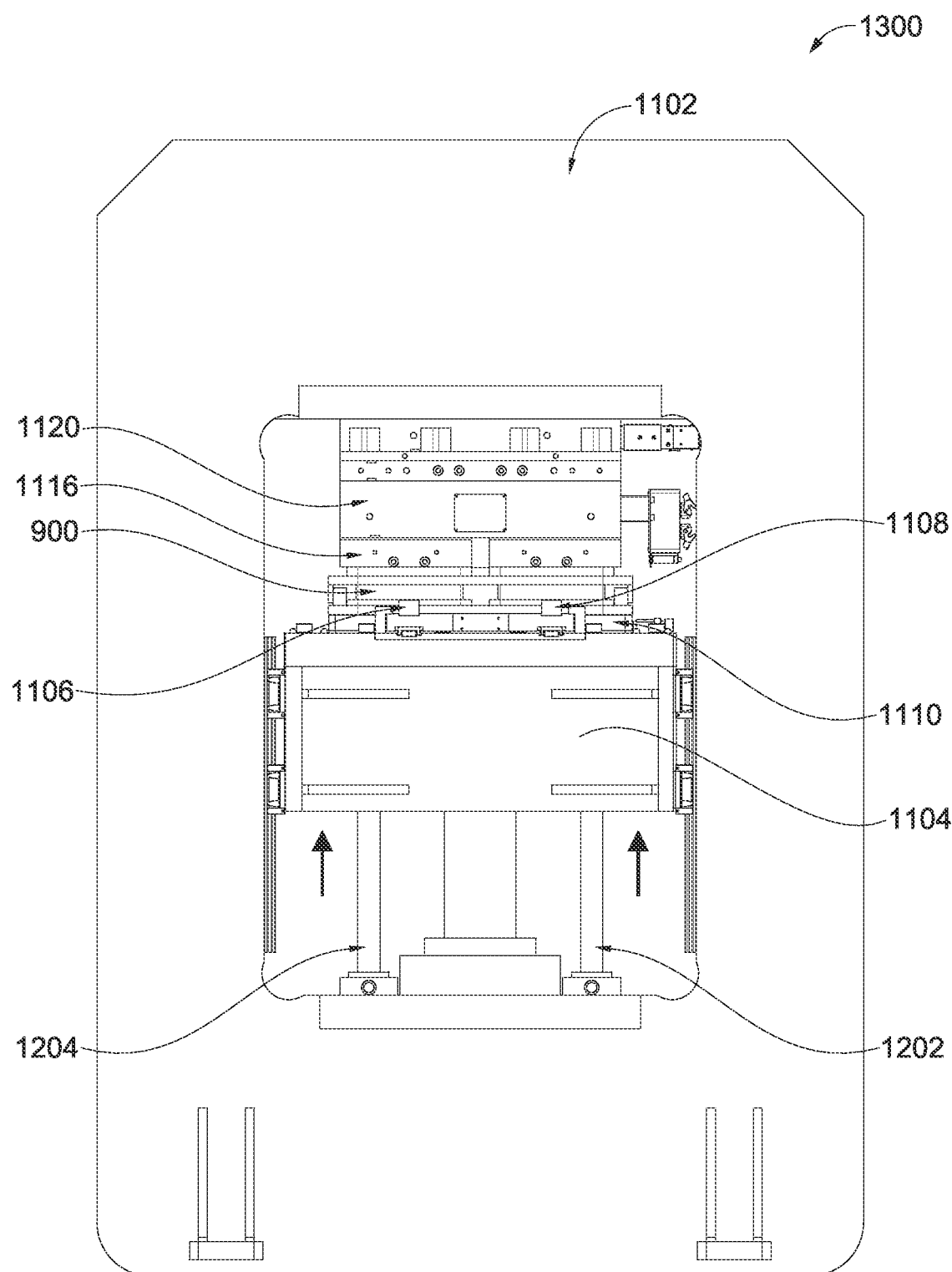
FIG. 13 depicts a front view of the press from FIG. 11 in a second configuration with a mold, in accordance with aspects hereof.

FIG. 12 depicts a front view of the press 1100 from FIG. 11 in a first configuration 1200, in accordance with aspects hereof. The press 1100 is an example embodiment of the press 210 of FIG. 2. The first configuration 1200 has the moveable support platform 1104 in a retracted platform position. The first actuator 1202 and the second actuator 1204 may be any type of actuator, such as a pneumatic actuator, hydraulic actuator, electric linear actuator, or the like. The positioning of the moveable support platform 1104 allows the press 1100 to secure the tooling (e.g., mold 900 as depicted in FIG. 13) against the hot-runner plates 1116, 1212 to form an effective seal allowing the single-phase solution to fluidly pass from the press 1100 to the tooling and for gas counter pressure to be maintained in the cavity of the tooling as passed from the press 1100. The first configuration 1200 having the moveable support platform 1104 in a retracted platform position allows for tooling, such as the mold 900 of FIG. 9 to be positioned on the press plate 1110 and may be secured by the press lock 1115.

The hot-runner plate 1116, 1212 is statically positioned, such as through bolts, latches or other securements, to the press. In this manner, as the moveable support platform 1104 moves from the first configuration 1200 to a second configuration 1300 depicted in FIG. 13, a distance between the moveable support platform 1104 and the hot-runner plate 1116, 1212 reduces such that the distance in the first configuration 1200 is greater than the distance in the second configuration 1300.

The hot-runner plate, such as the hot-runner plate 1116, provides a mechanism for keeping the molten polymeric composition within the injection manifold 1120 in a molten state. To accomplish this, the hot-runner plate 1116 is comprised of a channel (not shown) within the hot-runner plate 1116 that is effective to circulate conditioning fluid that is at a temperature to heat the hot-runner plate 1116 and associated injection manifold 1120 to a temperature sufficient for maintaining the molten polymer in a molten state between injections. The hot-runner plate 1116 is comprised of an inlet 1208 and an outlet 1210 that are fluidly coupled by the channel extending through the hot-runner plate 1116 for circulating the conditioning fluid.

A second hot-runner plate 1212 provides a mechanism for keeping the molten polymeric composition within the injection manifold 1120 in a molten state. To accomplish this, the hot-runner plate 1212 is comprised of a channel (not shown) within the hot-runner plate 1212 that is effective to circulate conditioning fluid that is at a temperature to heat the hot-runner plate 1212 and associated injection manifold 1120 to a temperature sufficient for maintaining the molten polymer in a molten state between injections. The hot-runner plate 1212 is comprised of an inlet 1205 and an outlet 1207 that are fluidly coupled by the channel extending through the hot-runner plate 1212 for circulating the conditioning fluid.

The use of a hot-runner plate (e.g., the hot-runner plate 1116, second hot-runner plate 1212) in this physical foaming operation reduces waste created from extended cold runners extending between the injector 212 of FIG. 2 and the tooling. By keeping a portion of the conduit between the injector and the tooling as a hot runner, the polymeric composition does not solidify between injections in those portions heated by the hot-runner plate 1116, 1212. Additionally, as previously discussed, the timing between injecting the polymeric composition into the tooling and reducing the gas counter pressure is responsible for the acceptability of the foamed part, in an example. This timing, which could be 1 second, 2 seconds, 3 second, 4 seconds, 5 seconds, or 6 seconds depending on injection volume, mold cavity characteristics, runner characteristics, and other variables, can be influenced by the temperature of the molten polymeric composition being injected. Therefore, as the injector 212 of FIG. 2 is dosing for a subsequent injection, different times may elapse between shots and therefore the molten polymeric composition in the manifold (e.g., manifold 1811 of FIG. 18B) or other locations of the runner system or injector 212 of FIG. 2 may drop in temperature at different levels without the hot-runner plate (e.g., the hot-runner plate 1116, second hot-runner plate 1212). Therefore, in an example, the hot-runner plate (e.g., the hot-runner plate 1116, second hot-runner plate 1212) is applied to the system in order to achieve consistent foamed components regardless of timing between injections or other variables during successive injections.

FIG. 13 depicts a front view of the press 1100 from FIG. 11 in the second configuration 1300 with the mold 900, in accordance with aspects hereof. As depicted, the moveable support platform 1104 is elevated bringing the mold 900 into fluid communication with the hot-runner plate 1116, 1212. As previously discussed, this fluid communication allows for a transfer of single-phase solution from the injector 212 of FIG. 2 by way of the injection manifold 1120 through the hot-runner plate 1116, 2121 to the cavities of the mold 900 while remaining in a single-phase solution. Similarly, the fluid communication between the hot-runner plate 1116, 1212 and the mold 900 allows for counter pressure to supplied to the mold 900 from a gas counter pressure supply, such as the gas counter pressure source 226 of FIG. 2.

The injection manifold 1120 distributes the single-phase solution from the injector 212 of FIG. 2 to the mold 900 through the hot-runner plate(s) 1116, 1212. The injection manifold 1120 also maintains the single-phase solution as a single-phase solution between successive shots or injections into tooling. The manifold accomplishes this, in part, through valves that are opened when the fluid communication is created by the press 1100 between the mold 900 and the hot-runner plate 1116. 1212 as the injection manifold 1120 contacts the mold 900 though the hot-runner plate (e.g., the hot-runner plate 1116, second hot-runner plate 1212), in an example.

The press 1100 is depicted having a specific configuration, structure, and arrangement; however, the press 1100 is a non-limiting example of a press contemplated herein. Alternative arrangements, such as omission of a hot-runner plate, a press plate, alternative actuators, alternative press locking mechanisms, and the like are all contemplated with the scope of the system and methods provided herein.

Figure 14A:
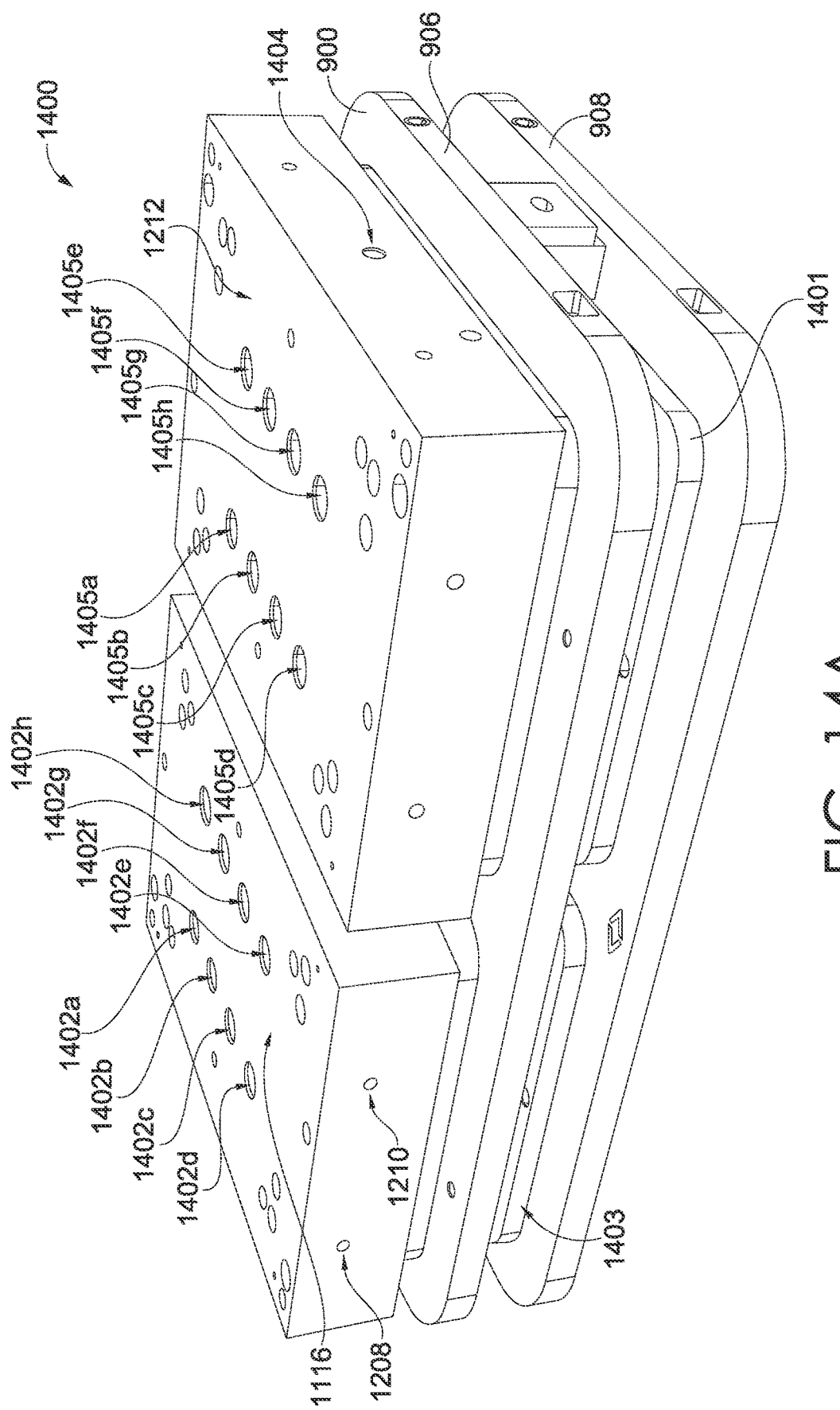
FIG. 14A depicts a perspective view of a mold joined with a hot-runner plate forming a tooling assembly, in accordance with aspects hereof.

FIG. 14A depicts a perspective view of the mold 900 having a first mold portion 1401 and a second mold portion 1403 in fluid communication with the hot-runner plates 1116 and 1212 forming a tooling assembly 1400, in accordance with aspects hereof. A gas counter pressure port 1404 is depicted as extending from a side of the hot-runner plate 1212. The gas counter pressure port 1404 provides a conduit through the hot-runner plate 1212 for fluidly coupling the gas counter pressure supply with the cavity (e.g., mold cavity 1420 of FIG. 14B) of the mold 900 in the second portion associated with the hot-runner plate 1212. A similar gas counter pressure port extends through the hot-runner plate 1116 on an opposite that is out of view in FIG. 14A. The gas counter pressure port (not shown) of the hot-runner plate 1116 also provides a conduit through the hot-runner plate 1116 for fluidly coupling the gas counter pressure supply (e.g., gas counter pressure source 226 of FIG. 2) with the cavity of the mold 900 in a portion of the mold 900 associated with the hot-runner plate 1116.

The second hot-runner plate 1212 includes a quantity of nozzle-receiving openings 1405a-h extending through the hot-runner plate 1212 toward the mold 900. The hot-runner plate 1116 includes a quantity of nozzle-receiving openings 1402a-h extending through the hot-runner plate 1116 toward the mold 900. Each nozzle-receiving opening 1402a-h and 1404a-h is effective to receive a nozzle (e.g., nozzle 1807 of FIG. 18B) from a manifold, as shown in greater detail at FIGS. 15B and 15C. The nozzle (e.g., nozzle 1807 of FIG. 18B) is effective to fluidly couple a gate (e.g., a gate 1422 of FIG. 14B) of the mold 900 with the injector 212 allowing for a fluid communication of the molten composition from the injector 212 to the mold cavity (e.g., mold cavity 1420 of FIG. 14B).

Figure 14B:
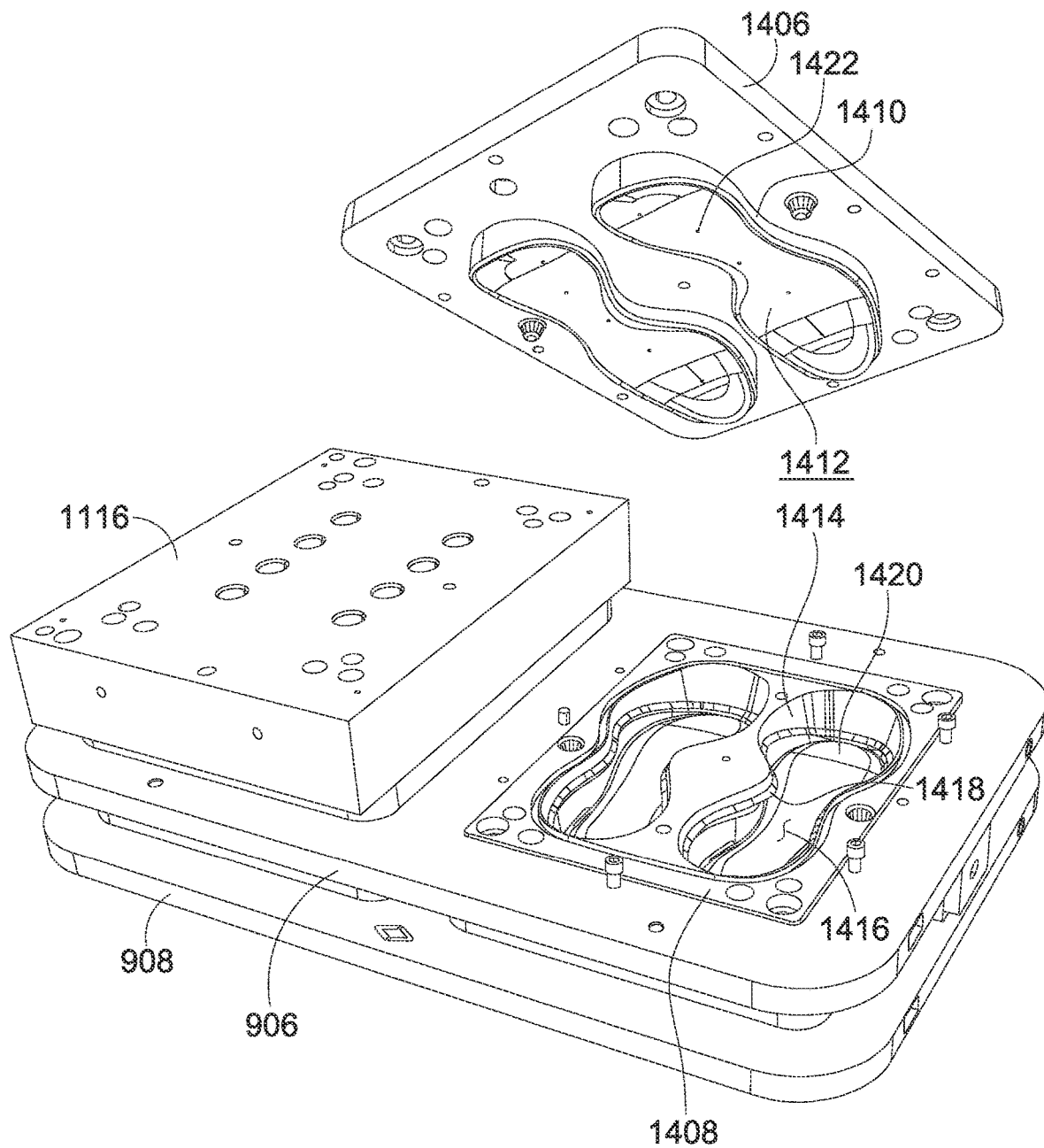
FIG. 14B depicts a partially exploded view of the tooling assembly of FIG. 14A showing a second mold plate separated from a mold ring plate, in accordance with aspects hereof.

FIG. 14B depicts a partially exploded view of the tooling assembly 1400 of FIG. 14A showing a second mold plate 1406 separated from a mold ring plate 1408, in accordance with aspects hereof. The second mold plate 1406 includes a perimeter wall 1410 forming a boundary along sides of a mold cavity wall 1412. In addition, the mold ring plate 1408 includes a mold cavity wall 1414 at least partially enclosing a mold-ring cavity 1416, and the mold cavity wall 1414 includes a first perimeter ridge 1418 traversing the perimeter of the mold-ring cavity 1416. When the second mold plate 1406 is layered next to or abuts the mold ring plate 1408, such as when the first mold portion 1401 is assembled, the perimeter wall 1410 nests inside the mold cavity wall 1414 to at least partially enclose a portion of the mold-ring cavity 1416. In addition, the perimeter wall 1410 abuts the first perimeter ridge 1418 to at least partially seal and form a mold cavity 1420.

One aspect of the present disclosure includes a mold system having a universal runner plate (e.g., universal hot-runner plate or universal cold-runner plate) and an array of two or more molds (e.g., first mold portion 1401 and second mold portion 1403 of FIG. 14A), each of which is configured to interface with the universal runner plate and includes a three-dimensional mold-cavity size. Furthermore, the three-dimensional mold-cavity size of a first mold of the array is for a footwear component of a first shoe size, such that the first mold includes a first runner configuration. The three-dimensional mold-cavity size of the second mold of the array is for a footwear component of a second shoe size. In one aspect, the first shoe size and the second shoe size are each in a range of US Men's 3.5 to US Men's 15, or US Men's 5 to US Men's 12, or US Men's 6 to US Men's 11, or US Men's 7 to US Men's 10. For example, the first shoe size might be in a range of US Men's 3.5 to U.S. Men's 8, or US Men's 5 to US Men's 7.5, or US Men's 6 to US Men's 7; and the second shoe size might be in a range of US Men's 8.5 to US Men's 15, or US Men's 9 to US Men's 12, or US Men's 9 to US Men's 10.

Figure 15A:
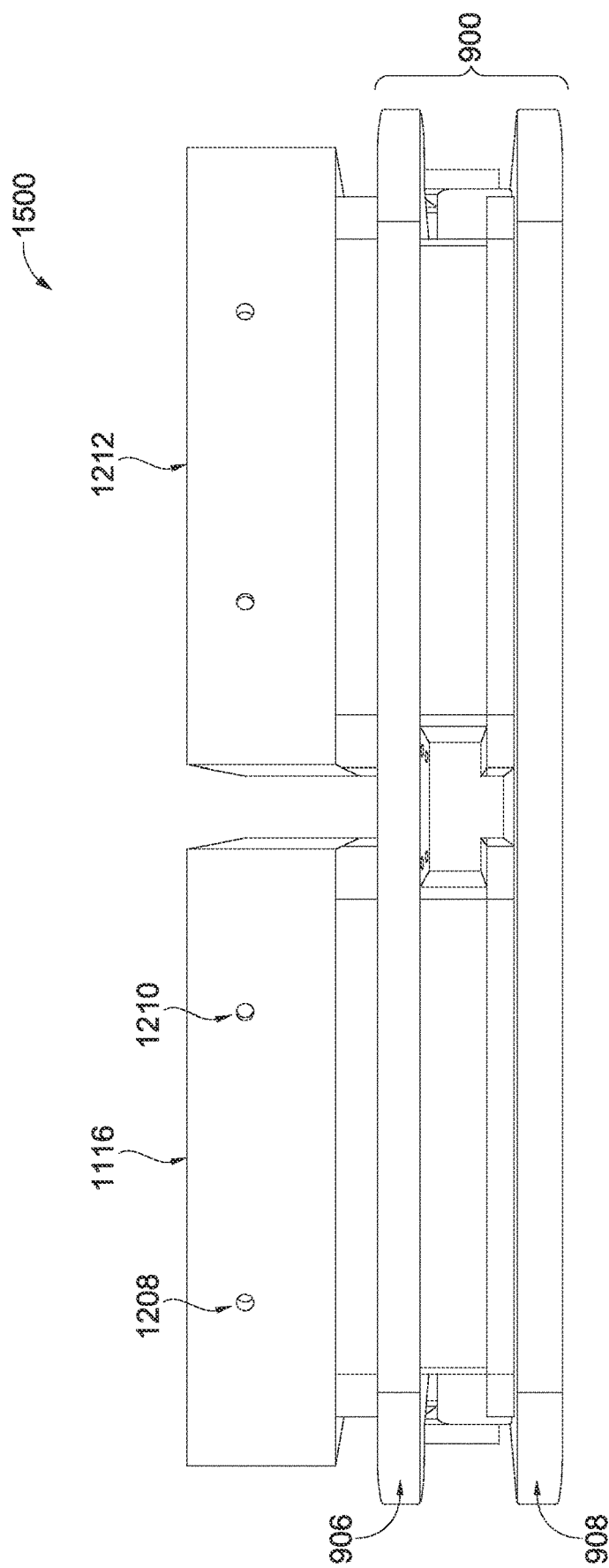
FIG. 15A depicts a front view of the mold and hot-runner plate of FIG. 14A, in accordance with aspects hereof.
Figure 15B:
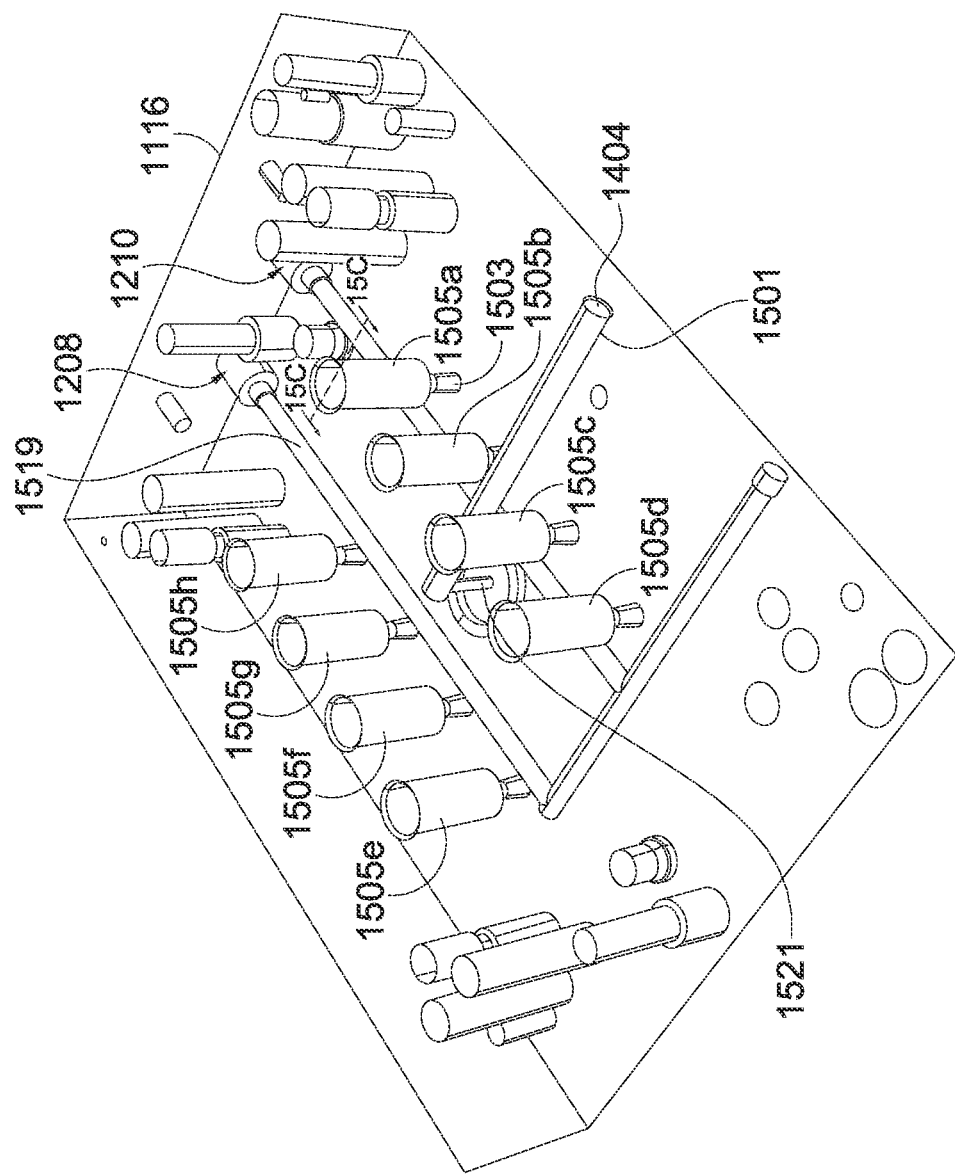
FIG. 15B depicts internal components of a the hot-runner plate of FIG. 15A, in accordance with an aspect hereof.

FIG. 15A depicts a front view 1500 of the mold 900 and hot-runner plates 1116, 1212 of FIG. 14A, in accordance with aspects hereof. Referring to FIGS. 15B and 15C, some of the walls of the hot-runner plate 1212 are omitted to illustrate some interior components of the hot-runner plate 1212 in more detail. For example, the hot-runner plate 1212 includes eight nozzle-receiving sleeves 1505a-1505h, each of which receives a respective nozzle (e.g., nozzle 1807 of FIG. 18B) of the injection manifold 1120. Each nozzle-receiving sleeve 1505a-1505h includes a nozzle-receiving opening 1402a (see FIG. 14A) and a sleeve outlet 1507. The sleeve outlet 1507 includes a perimeter rim 1515 that forms a nozzle seat 1517 against which a tip of the nozzle (e.g., nozzle 1807 of FIG. 18B) biases when then nozzle is fully inserted into the nozzle-receiving sleeve.

The hot-runner plate 1116 also includes hot runners (e.g., 1509) that transport material from each nozzle (e.g., nozzle 1807 of FIG. 18B) after being dispensed. For example, each hot runner (e.g., 1509) includes a hot-runner inlet (e.g., 1511) that fluidly connects with the sleeve outlet (e.g., 1507 in the cross-sectional view of FIG. 15C) and includes a hot-runner outlet 1513. In an aspect of the present disclosure, the hot-runner inlet (e.g., 1511) is spaced apart from the hot-runner outlet (e.g., 1513) by a distance in a range of about 1 cm to about 3 cm. As such, when material is dispersed from the nozzle (e.g., nozzle 1807 of FIG. 18B), a sprue is formed in the hot runner (e.g., 1509), the sprue having a length in a range of about 1 cm to about 3 cm. In an aspect of the present disclosure, this sprue length provides a grasping region at which a tool can grip the sprue for removing solidified material from the runners in the mold (e.g., mold 900 of FIG. 9).

The hot-runner plate 1116 includes various components to help control conditions related to the injection-molding system. For example, the hot-runner plate 1116 includes conditioned-fluid lines 1519 for transporting conditioned fluid throughout the hot-runner plate 1116. The conditioned fluid may be conditioned to include a temperature for maintaining, increasing, or decreasing a temperature of components of the hot-runner plate, including the hot runners (e.g., 1509), the nozzle-receiving sleeves 1505a-1505h, and the nozzles (e.g., nozzle 1807 of FIG. 18B) when inserted in the sleeves (see also FIG. 12 depicting the inlet 1208 and the outlet 1210 positioned on an exterior wall of the hot-runner plate 1116). As such, when the thermoplastic elastomer composition (e.g., single-phase solution with supercritical fluid as physical foaming agent) is dispensed from a nozzle (e.g., nozzle 1807 of FIG. 18B), the temperature in the hot-runner plate 1116 may be maintained high enough to delay transition of the supercritical fluid to a gas and/or to maintain the polymeric composition in a molten state.

In a further aspect, the hot-runner plate 1116 includes a gas conduit 1501 for fluidly communicating with the gas counter pressure source 226 of FIG. 2 by way of the gas counter pressure port 1404 of FIG. 14A to a gas counter pressure outlet 1521 that is effective to fluidly communicate with a mold (e.g., mold 900 of FIG. 9).

Figure 18A:
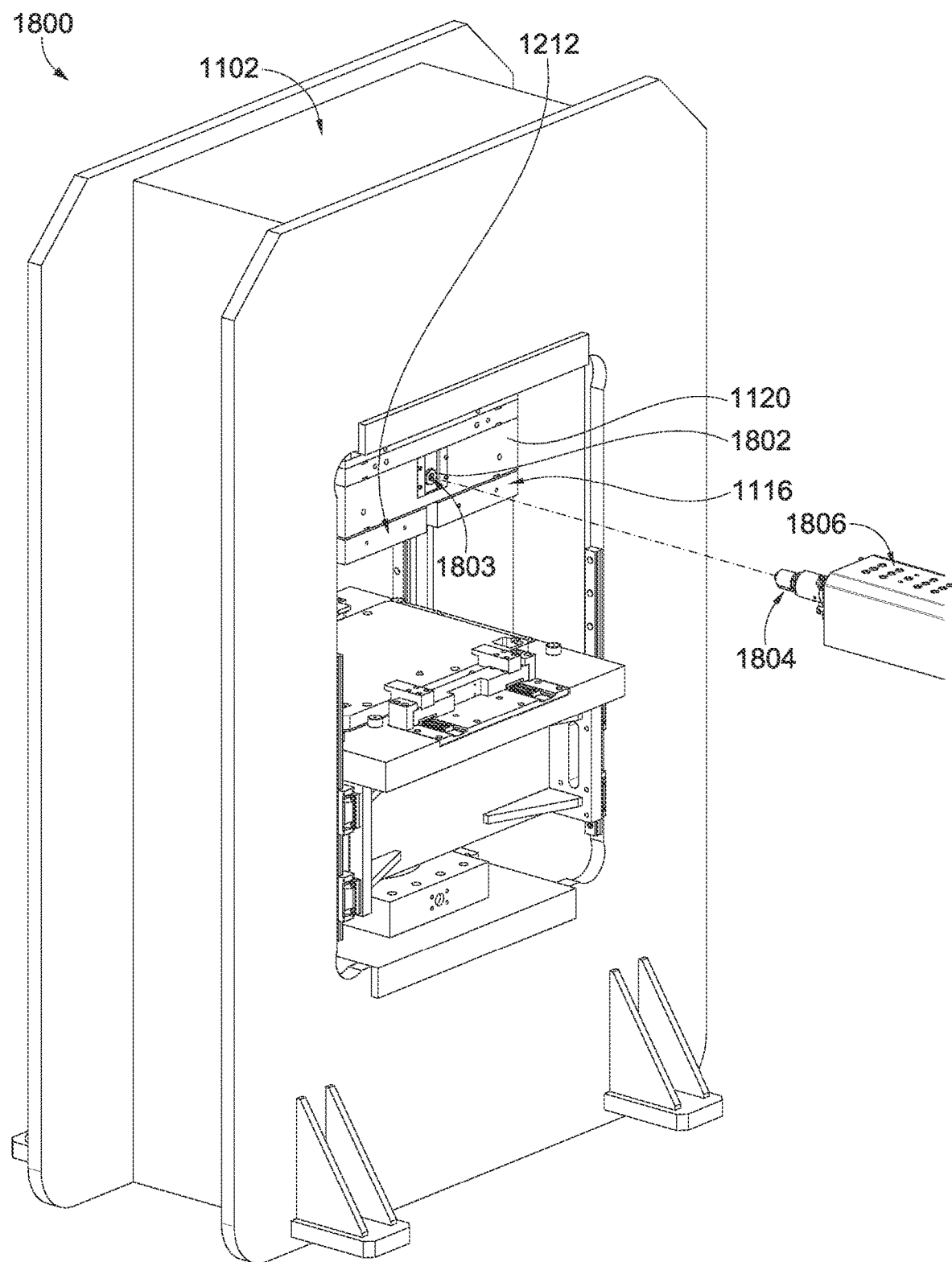
FIG. 18A depicts the press of FIG. 11 aligned with an injector, in accordance with aspects hereof.

In one aspect of the present disclosure, the hot-runner plate 1116, 1212 is a universal hot-runner plate that is coupled directly to the injection manifold 1120 of FIG. 18A. For example, one or more fasteners may couple the hot-runner plate 1116, 1212 to the injection manifold 1120. Some conventional injection molding systems may, in contrast to the present disclosure, have separate hot-runner plates that each interfaces with a different cold-runner plate (or other plate that is not temperature conditioned) and that are connected and disconnected to the manifold or nozzles in each injection cycle. This aspect of the present disclosure includes a universal hot-runner plate that is mountable to the nozzles and that can interface with an array of different molds, each of which includes a different mold cavity, a different gate scheme, or any combination thereof. For example, the mold cavities may differ in volume and or shape as being used to mold parts of different sized shoes, and the gate scheme may differ by including different gate positions and/or quantities of gates. In aspects, as single gate may service the mold cavity as opposed to a plurality of gates servicing the single mold cavity. In addition, the hot-runner plate 1116 is plumbed with all of the components used to control various aspects of the molding process, including the conditioned-fluid lines 1519 and the gas conduit 1501. Hot-runner plates are often associated with higher costs (e.g., added plumbing for temperature conditioning elements). Among other things, a universal hot-runner plate may reduce costs across multiple sets of molds, since only a single, common hot-runner plate may be used across the multiple sets, as opposed to having to make a hot-runner plate for each mold. In addition, it can reduce costs over time since there are fewer parts to store, maintain, repair, move, handle, etc. Although the figures of this present disclosure illustrate the hot-runner plates 1116 and 1212, which provide an interface between the injector nozzles 1807 and the tooling, in other aspects of this disclosure, universal cold-runner plates or other types of universal runner plates may provide the interface between the injector nozzles 1807 and the tooling.

Figure 17:
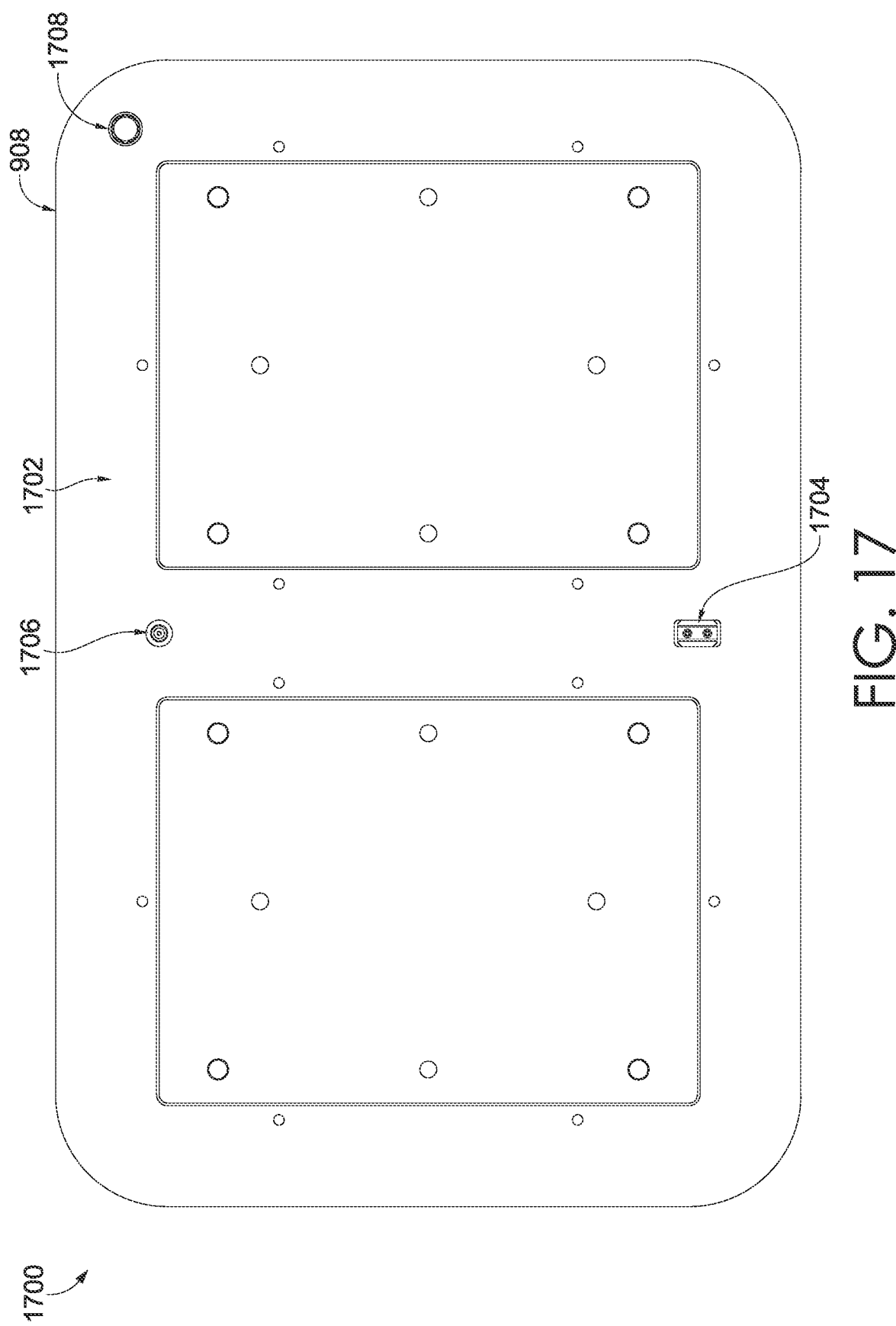
FIG. 17 depicts a bottom plan view of the mold and hot-runner plate of FIG. 14A, in accordance with aspects hereof.

FIG. 16 depicts a side view 1600 of the mold 900 and hot-runner plate 1212 of FIG. 14A, in accordance with aspects hereof. FIG. 17 depicts a bottom plan view 1700 of the mold 900 of FIG. 14A, in accordance with aspects hereof. The first plate-alignment keyway 1704 and the second plate-alignment keyway 1706 are depicted on a bottom surface 1702 of the first carrier plate 908. As previously discussed, the first plate-alignment keyway 1704 and the second plate-alignment keyway 1706 are effective for receiving alignment protrusions from components of the system, such as the temperature conditioning rack 402 of FIG. 2, the press 1100 of FIG. 11, and an unloader 2300 of FIG. 23. These keyways 1704, 1706 ensure alignment, position, and orientation during various processes and in anticipation of future processes (e.g., in preparation to be picked by the end effector with strict dimensional tolerance).

Also depicted is an RFID tag 1708. The RFID tag 1708 is recessed into the bottom surface 1702 preventing interference or collision with other surfaces of the system 200 of FIG. 2. The RFID tag 1708 provides is a unique identifier that is associated with the mold (e.g., mold 502 of FIG. 5) such that when the RFID tag 1708 is interrogated, the unique identifier results in the system 200 knowing the location of the mold based on the location of the RFID tag 1708 in the system 200 and/or by which RFID reader (e.g., 438 RFID reader of FIG. 4) identifies the RFID tag 1708.

FIG. 18*a* depicts a perspective view 1800 of the press 1100 of FIG. 11 aligned with an injector 1806, in accordance with aspects hereof. The injector 1806, which may be referred to as an injection-molding barrel, terminates with a nozzle 1804. The injector 1806 is an example embodiment of the injector 212 of FIG. 2. The nozzle 1804 is effective to engage with an injector port 1802 of the injection manifold 1120. The injector port 1802 is sized and configured to engage with the nozzle 1804 to form a fluid coupling that allows single-phase solution to remain a single-phase solution as the single-phase solution transfer from the injector 1806 to the injection manifold 1120. The injector port 1802 provides a conduit 1803 through the injection manifold 1120 to the manifold nozzles (e.g., nozzles 1807 of FIG. 18B) that extend through the hot-runner plates 1116, 1212 and form a fluid coupling with the mold 900 of FIG. 13 secured and compressed in the press 1100.

Figure 18B:
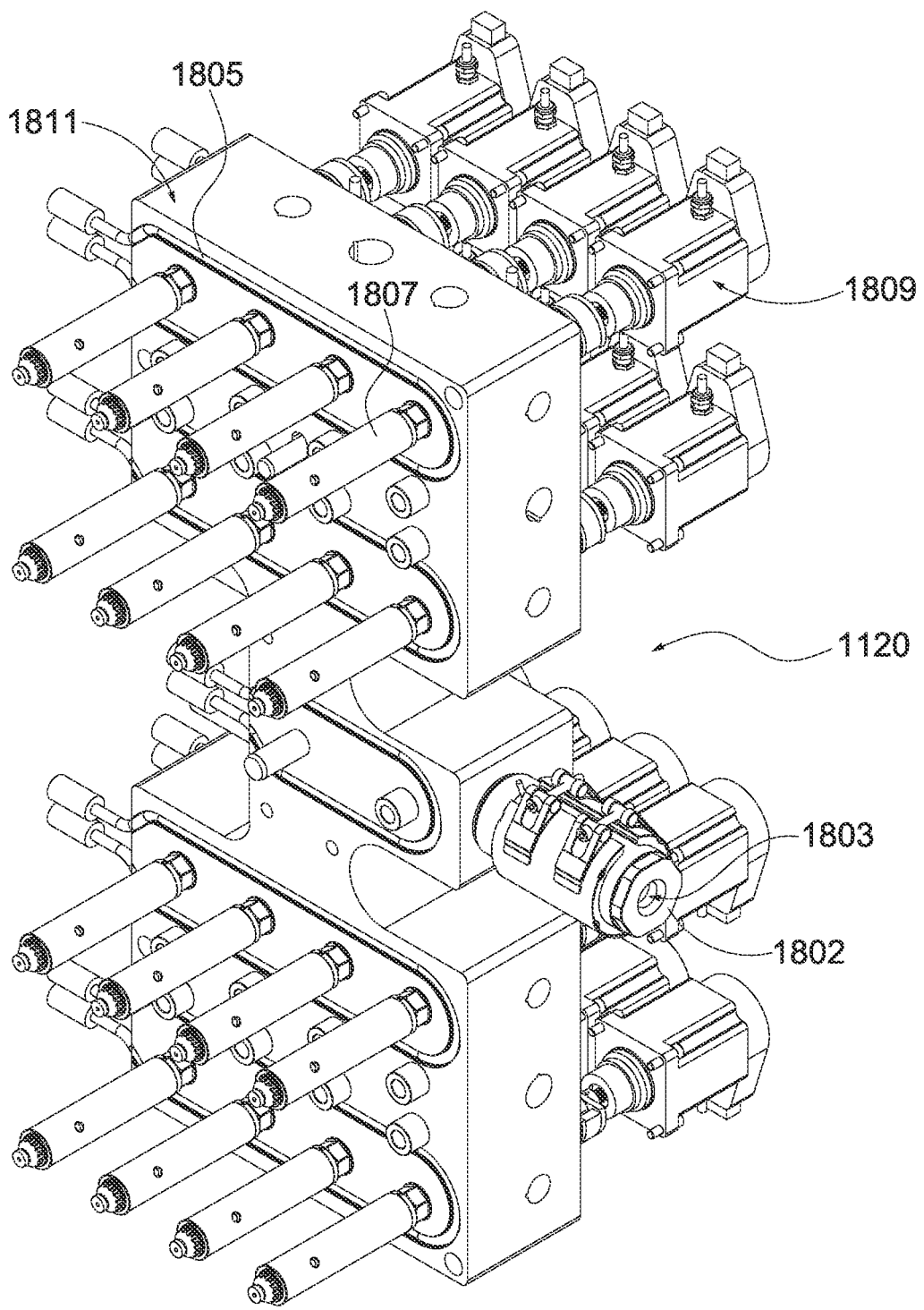
FIG. 18B depicts the injection manifold, in accordance with aspects hereof.

Referring to FIG. 18B, an example of a set of injection nozzles (e.g., 1807) is shown as part of the injection manifold 1120 having exterior walls removed. The injection manifold 1120 includes the injector port 1802 that connects to the nozzle 1804 of the injector 1806. The injection manifold 1120 also includes a series of internal components (not shown) that receive a deposit/shot of thermoplastic elastomer composition from the injector 1806 and divides the shot into a number of deposits for separately distributing through the nozzles (e.g., 1807). The injection manifold 1120 may also include one or more sensors (e.g., thermocouple) (not shown) for monitoring conditions (e.g., temperature, pressure, etc.) of the injection manifold 1120 that may affect the thermoplastic elastomer composition, as well as a manifold temperature conditioning unit 1811 for maintaining, increasing, or decreasing a temperature of the injection manifold 1120. For example, the manifold temperature conditioning unit 1811 may include conditioned-fluid lines 1805 for holding and transporting coolant or heated conditioning fluid. As such, a state of the thermoplastic elastomer composition (e.g., single-phase solution) may be maintained while a deposit is distributed from each nozzle (e.g., 1807) into the hot-runner plates 1116, 1212. For example, the injection manifold 1120 may maintain the thermoplastic elastomer composition at conditions conducive to maintaining the foaming agent in a supercritical-fluid phase and to reducing the likelihood of transition to a gas. In a further aspect, the injection manifold 1120 includes an injector-pin assembly (e.g., 1809) for each nozzle (e.g., 1807), which may selectively insert a pin (or other obstruction) into a tip of each nozzle to impede a flow of material.

In a further aspect of the present disclosure, the nozzles 1807 are arranged in groups of nozzles, including between two and six nozzles. For example, in FIG. 18*b*, the nozzles 1807 are arranged in four groups of four linearly aligned nozzles, and in other aspects the groups may include two, three, five, or six linearly aligned nozzles. Each group of nozzles is positioned to collectively inject material into a single mold cavity. For example, in one aspect of the present disclosure, each group of four nozzles is configured to inject material into a single mold cavity having a three-dimensional shape of a footwear component (e.g., footwear sole). In one aspect, four nozzles optimizes the available footprint and injection-system real estate operable to distribute material in to the mold cavity having the three-dimensional shape of a footwear sole. That is, the three-dimensional shape of an average size footwear sole includes a length and four nozzles may optimally use that length to evenly distribution shots of material into the mold cavity in a way that each shot foams and solidifies in a desired manner.

In FIG. 18B, the injection manifold 1120 includes sixteen nozzles 1807, each of which is able to be inserted into a respective nozzle-receiving opening (e.g., 1402) of the hot-runner plates 1116 and 1212 depicted in FIG. 14A.

Figure 19:
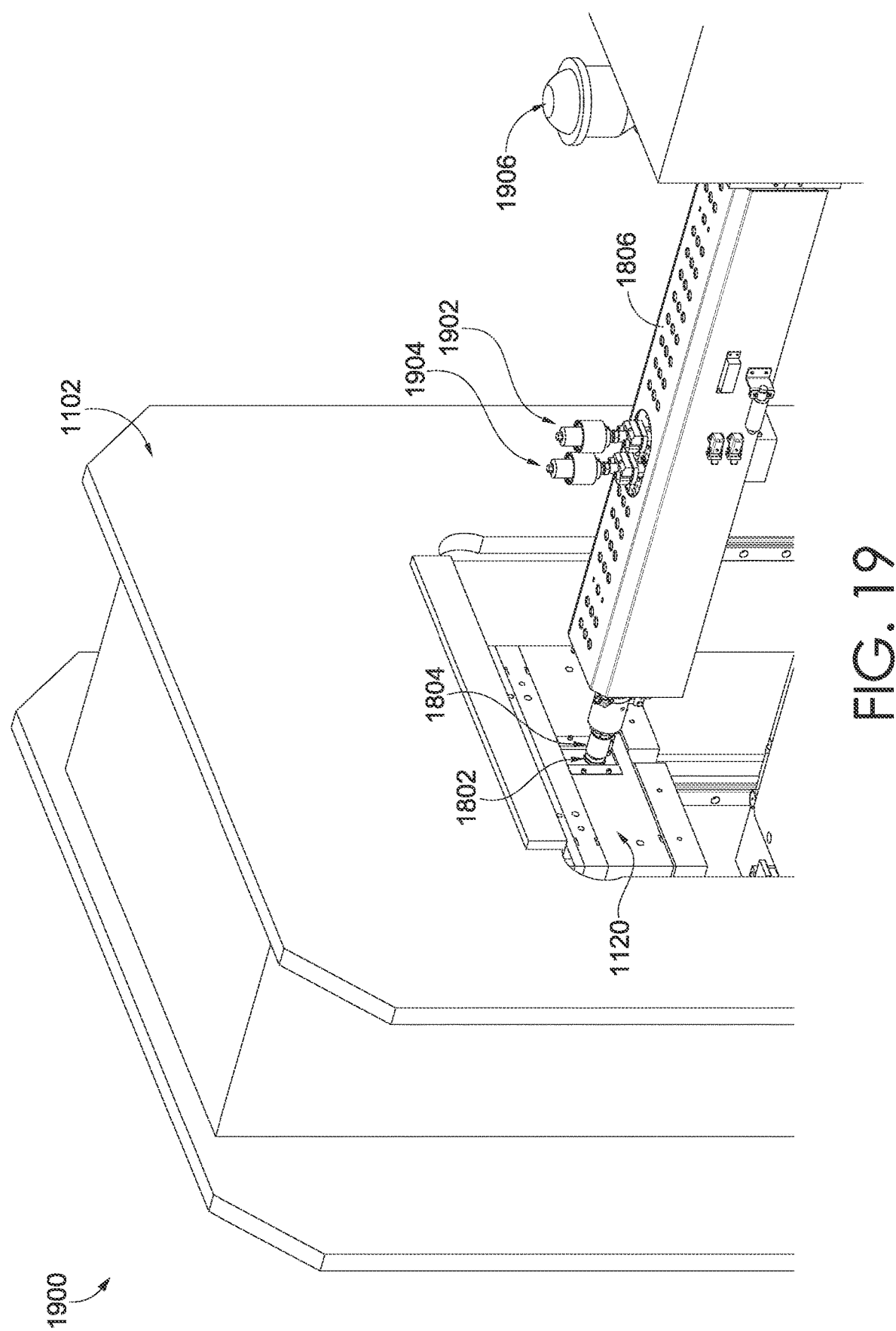
FIG. 19 depicts the press and injector of FIG. 18a paired, in accordance with aspects hereof.

FIG. 19 depicts a perspective view 1900 of the press 1100 and injector 1806 of FIG. 18A paired and in fluid communication, in accordance with aspects hereof. The injector 1806 includes physical foaming agent ports 1902, 1904. The physical foaming agent ports 1902, 1904 provide a coupling location for fluidly coupling the injector 1806 with the dosing source (e.g., dosing source 220 of FIG. 2) that provides the physical foaming agent, such as a supercritical fluid. The injector 1806 also includes a polymeric composition hopper 1906 that supplies a polymeric composition to the injector 1806 for conversion to a single-phase solution. An injector may include one or more physical foaming agent ports. The physical foaming agent ports, such as physical foaming agent ports 1902, 1904, may be an aperture extending through one or more surfaces, such as surfaces defining a portion of the injector.

Figure 20:
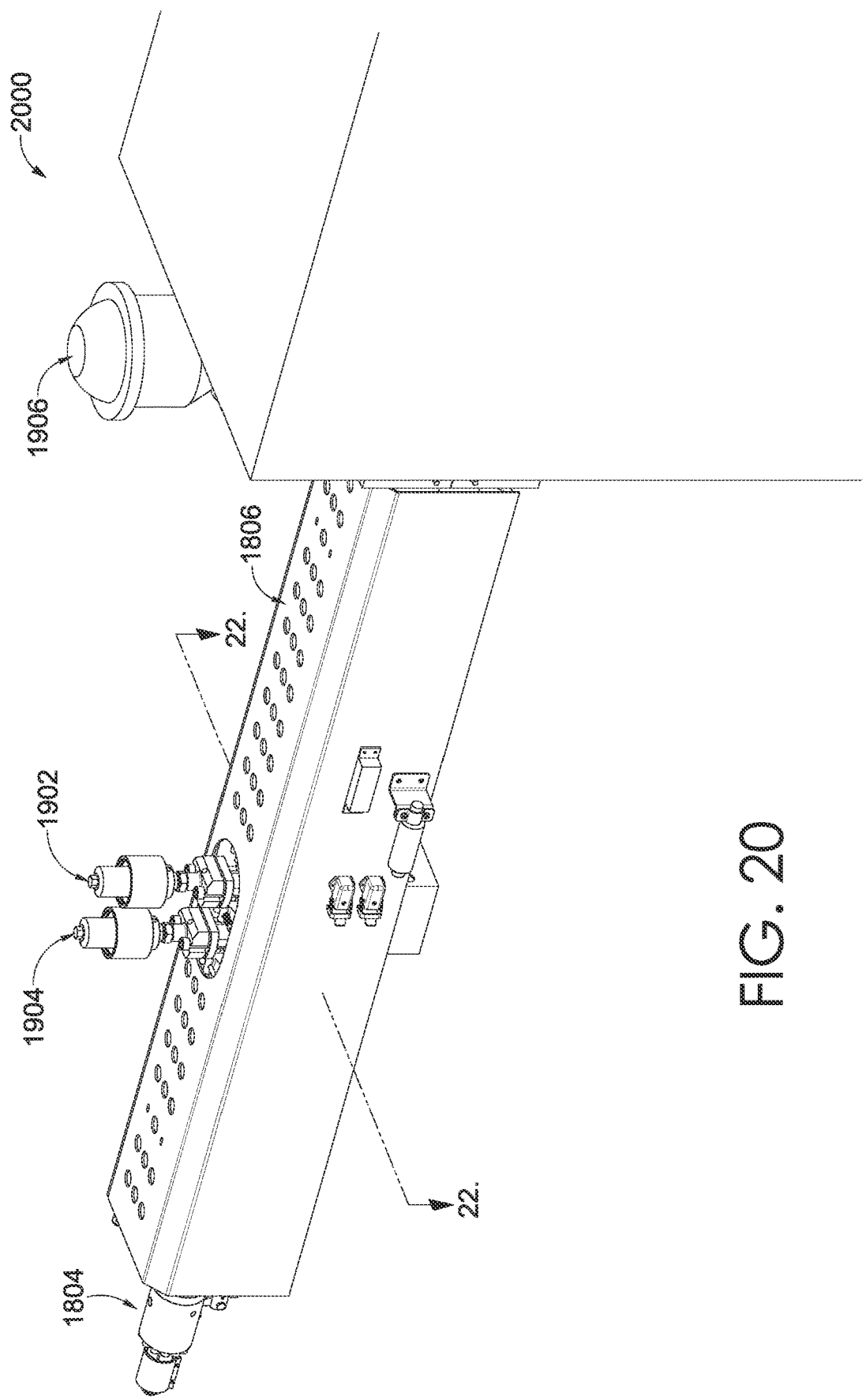
FIG. 20 depicts a perspective view of the injector of FIG. 18, in accordance with aspects hereof.
Figure 21:
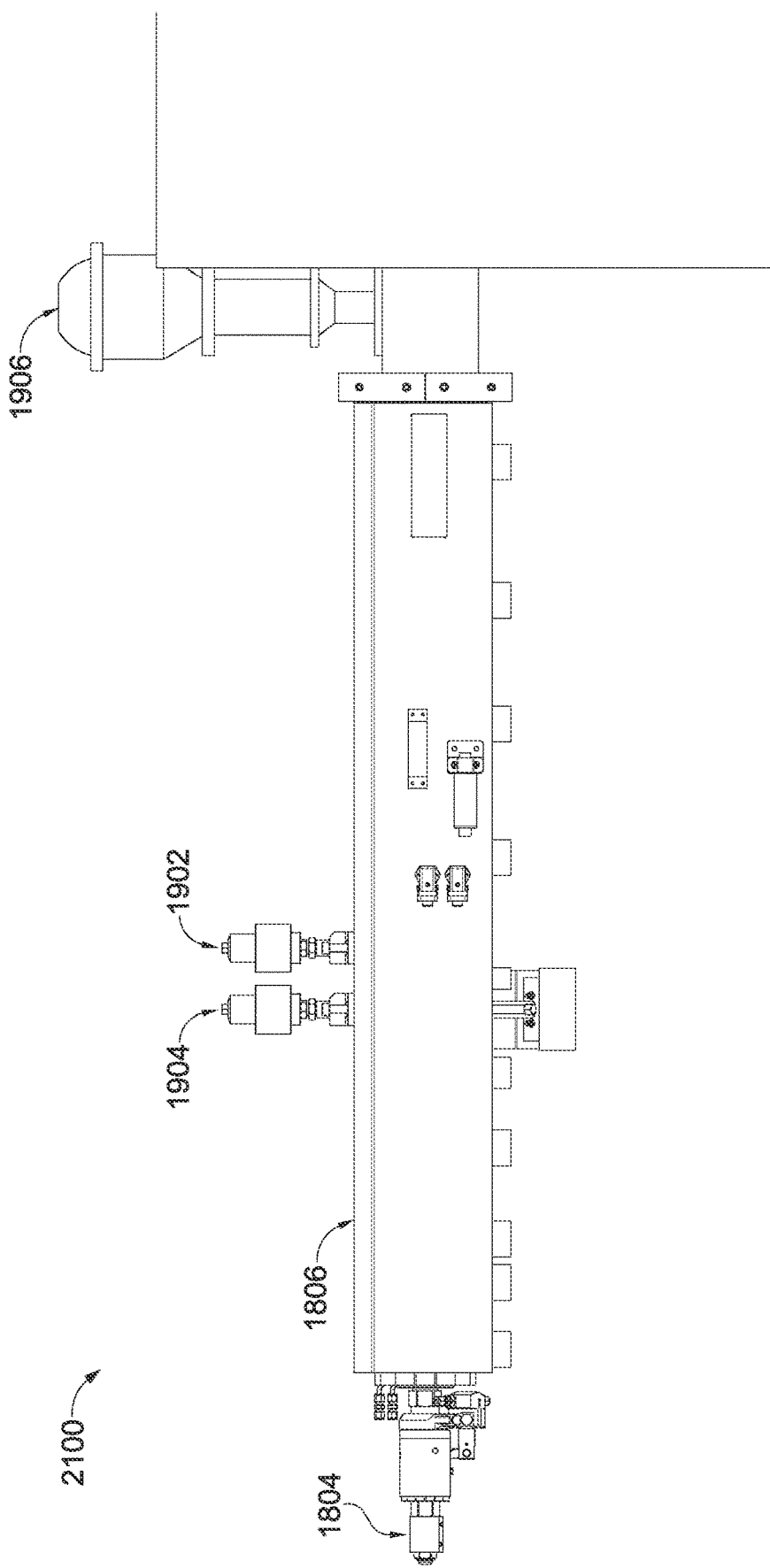
FIG. 21 depicts a side view of the injector of FIG. 20, in accordance with aspects hereof.

FIG. 20 depicts a perspective view 2000 of the injector 1806 of FIG. 18, in accordance with aspects hereof. A section line 22-22 is provided in FIG. 20 that will define the cross section of FIG. 22, hereinafter. FIG. 21 depicts a side view 2100 of the injector 1806 of FIG. 20, in accordance with aspects hereof.

Figure 22:
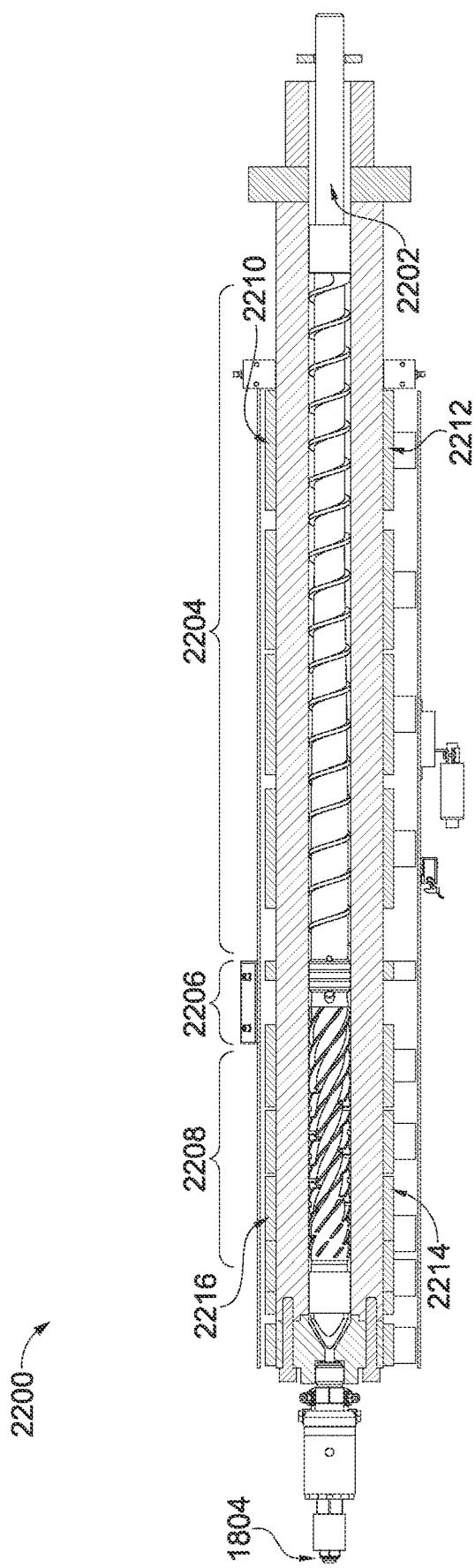
FIG. 22 depicts a cross-section view of the injector of FIG. 21 along section line 22-22, in accordance with aspects hereof.

FIG. 22 depicts a cross-section view 2200 of the injector 1806 of FIG. 21 along section line 22-22, in accordance with aspects hereof. The injector 1806 is comprised of a screw 2202. The screw 2202 may be rotated by an electric motor, a hydraulic motor, or other rotational mechanisms (not shown). The screw rotation speed affects the melting of the polymeric composition, formation of the single-phase solution, and injection. As such, the screw rotation is from 20 rotations per minute to 120 rotations per minute. The screw 2202 is functional to convey polymeric composition through the injector 1806 and to compress the polymeric composition, which increases the pressure experienced by the polymeric composition within the injector. The injector is also comprised of a quantity of heating elements extending along a length of the injector 1806. A selection of the heating elements are labelled as heating elements 2210, 2212, 2214, 2216. The heating elements are effective to heat the polymeric composition to a molten state. Friction/shear-induced heat generated by the screw 2202 advancing the polymeric composition through the injector 1806 may also contribute to the melting of the polymeric composition. The heating elements may use induction heating, electrical resistive heating, conditioning fluid, or the like.

The injector 1806 is depicted having at least three general regions. A first region 2204 represents a portion of the injector 1806 in which the polymeric composition is heated and compressed. A second region 2206 represents a portion of the injector 1806 in which the physical foaming agent is introduced with the molten polymeric composition. A third region 2208 represent a portion of the injector 1806 in which the physical foaming agent and the molten polymeric composition are integrated to form a single-phase solution. The third region 2208 is also effective, in an example, for metering a volume of single-phase solution for a subsequent injection shot, which will be fluidly communicated through the nozzle 1804 to the manifold, as previously described.

While a specific injector is depicted and described, the injector 1806 is a non-limiting example. It is contemplated within the scope of the system and methods provided herein that an alternative injector configuration, arrangement, and/or structure may be implemented while staying within the contemplated scope herein.

Figure 23:
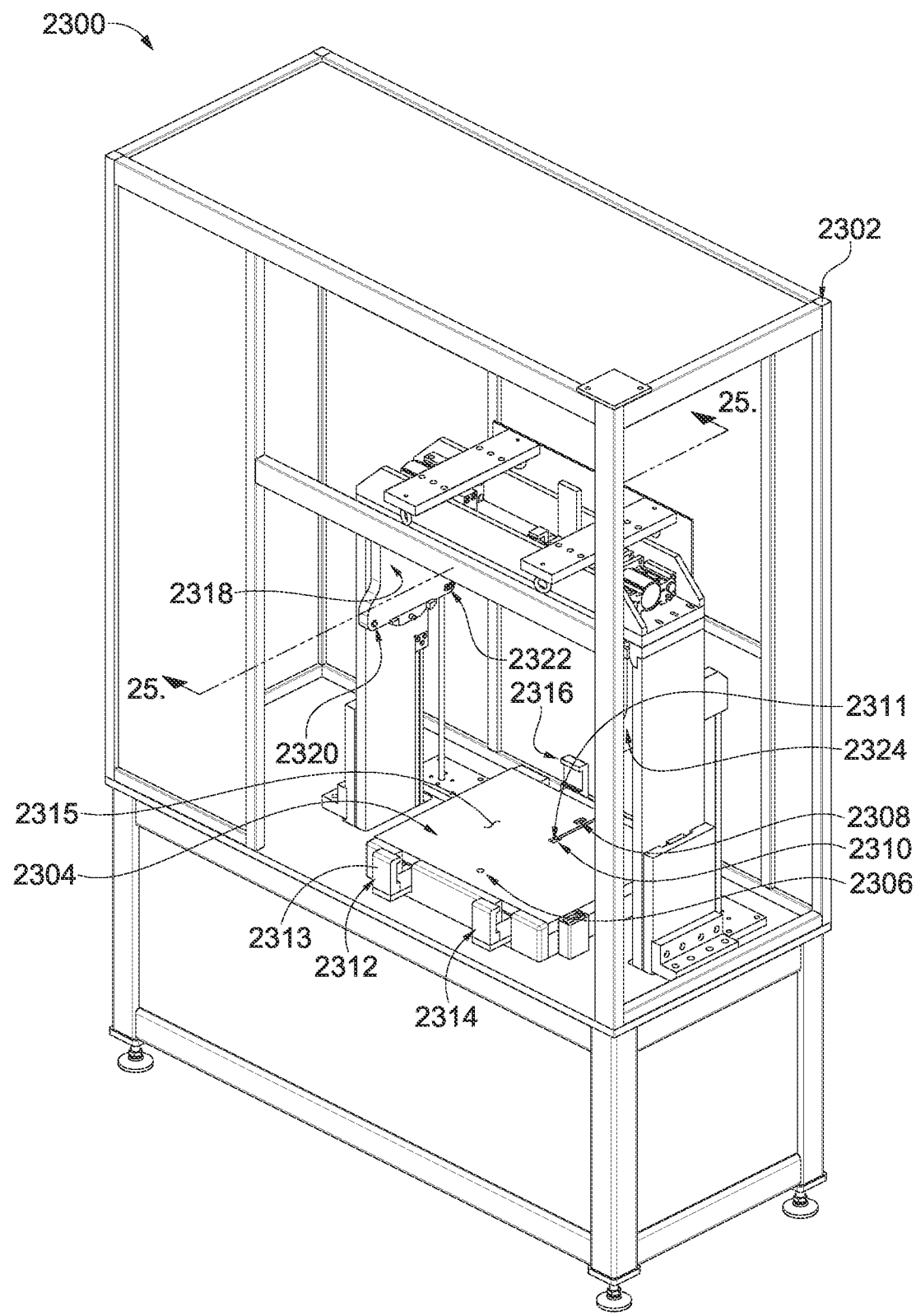
FIG. 23 depicts a perspective view of an unloader, in accordance with aspects hereof.

FIG. 23 depicts a perspective view of an unloader 2300, in accordance with aspects hereof. The unloader 2300 is an example embodiment of the unloader 214 described in connection with FIG. 2. The unloader comprises a frame 2302, an unloader plate 2304, a first unloader arm 2318, a second unloader arm 2324, an unloader lock 2313 having finger 2312, 2314, 2316, and an unloader plate 2304. The unloader plate comprises a first protrusion 2308, a second protrusion 2306, and a recess 2310 containing an RFID reader 2311.

The unloader 2300 is effective to open tooling (e.g., mold 900 shown in FIG. 26) for the unloading of the foamed article (e.g., footwear component 100) contained in a cavity (e.g., cavity 1420 of FIG. 14B) of the tooling. The unloader 2300 secures the tooling to the unloader plate 2304 by sliding the unloader lock 2313 having the fingers 2312, 2314, 2316 over a portion of the tooling, such as the first carrier plate of the mold 900 of FIG. 9. The unloader lock 2313 is able to transition between the unlocked configuration and the locked configuration by sliding the fingers 2312, 2314, 2316 in a plane parallel with a top surface 2315 of the unloader plate 2304. After securing the tooling to the unloader plate 2304, the first unloader arm 2318 and the second unloader arm 2324 can engage with another portion of the tooling, such as the second carrier plate 906 of the mold 900 of FIG. 9. The engagement is achieved through a first protrusion 2320 extending outwardly from the first unloader arm 2318 toward the second unloader arm 2324 and a second protrusion 2322 extending outwardly from the first unloader arm 2318 toward the second unloader arm 2324. The first protrusion 2320 is configured to be received in a keyway, such as the first plate-opening keyway 914 of FIG. 10 and the second protrusion 2322 is configured to be received in a keyway, such as the second plate-opening keyway 916 of FIG. 10.

The first protrusion 2320 is asymmetrical with respect to the second protrusion 2322 in one or more characteristics. The characteristics include, but are not limited to, the protrusion length, protrusion cross section shape, protrusion position, protrusion size, and any combination thereof. Similarly, a third protrusion extending from the second unloader arm 2324 is asymmetrical with respect to a fourth protrusion that is also extending from the second unloader arm 2324 in one or more characteristics. The characteristics include, but are not limited to, the protrusion length, protrusion cross section shape, protrusion position, protrusion size, and any combination thereof. The first protrusion and the third protrusion are symmetrical, in an example in at least one characteristic. The second protrusion and the fourth protrusion are symmetrical, in an example, in at least one characteristic.

The first unloader arm 2318 and the second unloader arm 2324 slideably position between an open configuration with a first distance between the first unloader arm 2318 and the second unloader arm 2324 and a closed configuration with a second distance between the first unloader arm 2318 and the second unloader arm 2324. This directional movement, which is in a horizontal manner as depicted, is in disagreement. For example, as the first unloader arm 2318 moves left, the second unloader arm 2324 moves right, which represents an opening configuration. Similarly, as the first unloader arm 2318 moves right, the second unloader arm 2324 moves left, which represents a closing configuration. The slideable motion may be achieved through a powered actuator, such as an electric linear actuator, a pneumatic actuator, a hydraulic actuator, or other movement mechanisms (not shown).

The first unloader arm 2318 and the second unloader arm 2324 are also structured to move in agreement in an alternative direction, such as the vertical direction as depicted in FIG. 23. For example, as the first unloader arm 2318 moves up, the second unloader arm 2324 also moves up, which represents a lifting configuration. Similarly, as the first unloader arm 2318 moves down, the second unloader arm 2324 also moves down, which represents a closing configuration. The agreement motion may be achieved through a powered actuator, such as an electric linear actuator, a pneumatic actuator, a hydraulic actuator, or other movement mechanisms. Therefore, the first unloader arm 2318 and the second unloader arm 2324 are effective to move in a first direction in agreement with each other and to move in a transverse direction in disagreement with each other.

Figure 24:
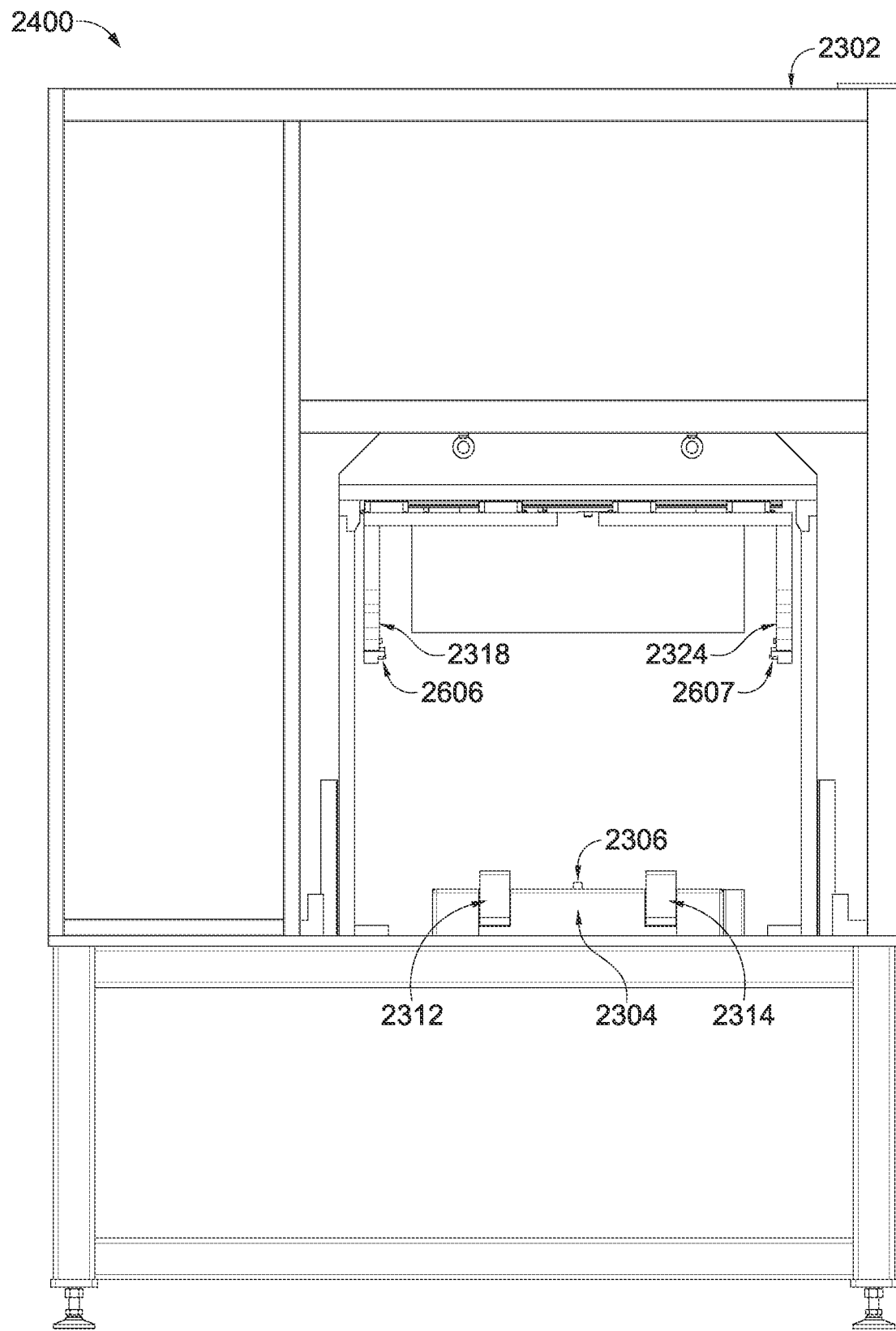
FIG. 24 depicts a side view of the unloader of FIG. 23, in accordance with aspects hereof.
Figure 25:
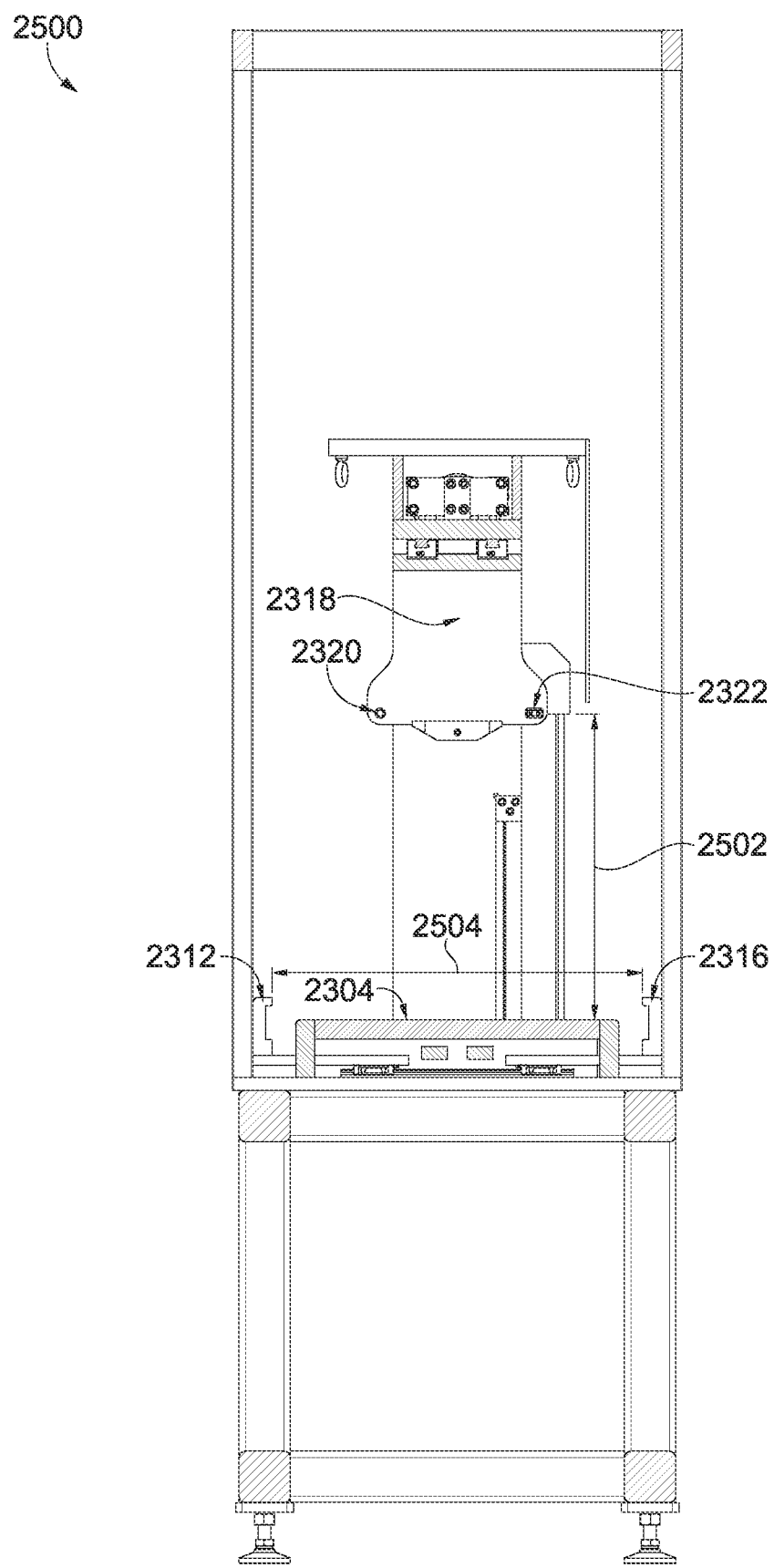
FIG. 25 depicts a cross-section view of the unloader of FIG. 24 in a first configuration, in accordance with aspects hereof.

FIG. 24 depicts a side view 2400 of the unloader 2300 of FIG. 23, in accordance with aspects hereof. FIG. 25 depicts a cross-section view of the unloader 2300 of FIG. 24 in a first configuration 2500, in accordance with aspects hereof.

Figure 26:
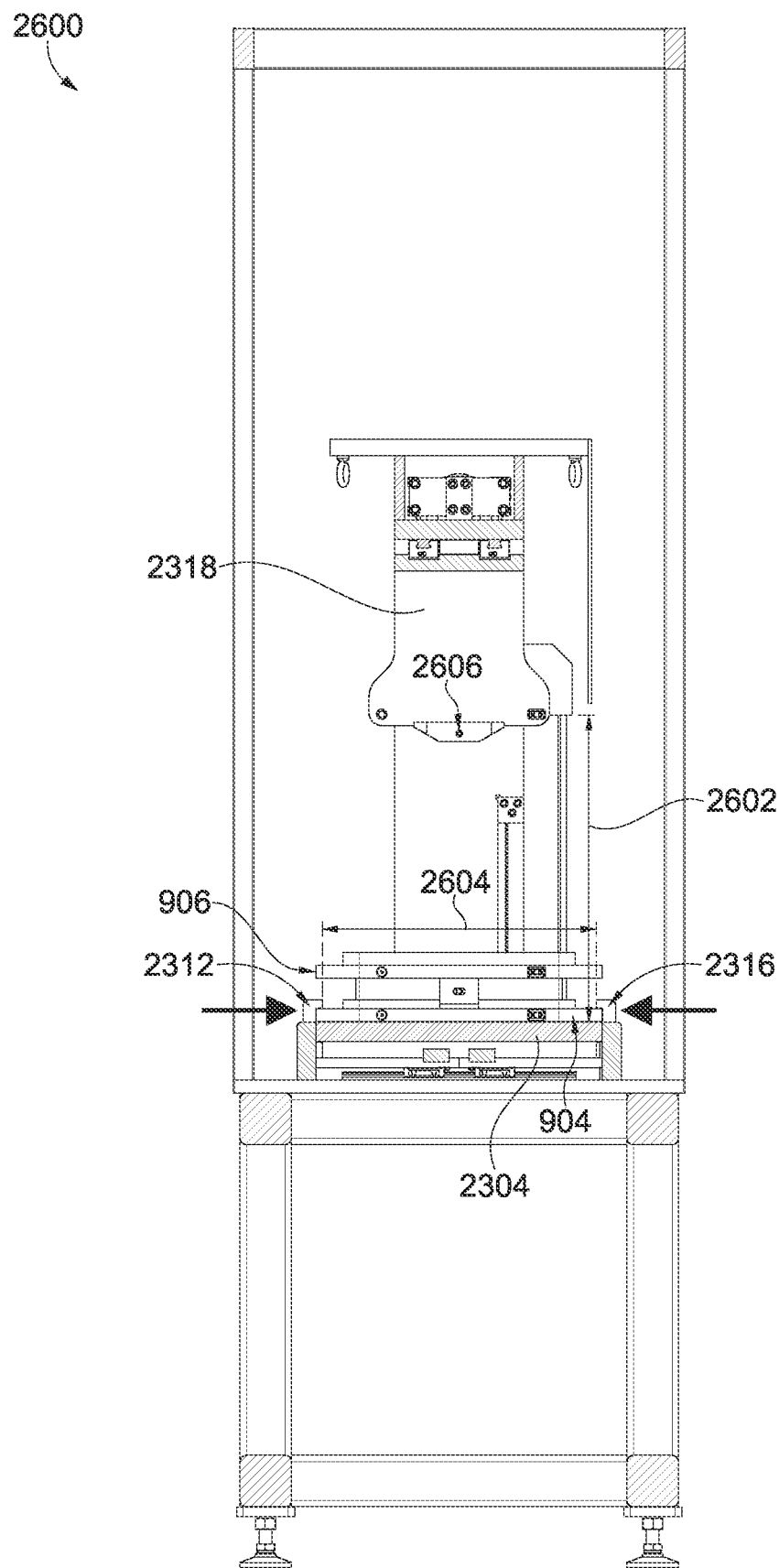
FIG. 26 depicts a cross-section view of the unloader of FIG. 24 in a second configuration with a mold, in accordance with aspects hereof.

Depicted in FIG. 25 is a first vertical distance 2502 between the first unloader arm 2318 and the unloader plate 2304 and a first horizontal distance 2504 between the pair of fingers 2312, 2316. This first configuration 2500 represents a lifted configuration of the unloading arms and an open configuration of the unloader lock. FIG. 26 depicts a cross-section view of the unloader 2300 of FIG. 24 in a second configuration 2600 with the mold 900, in accordance with aspects hereof. Depicted in FIG. 26 is a second vertical distance 2602 between the first unloader arm 2318 and the unloader plate 2304 and a second horizontal distance 2604 between the pair of fingers 2312, 2316. This second configuration 2600 represents a closing configuration of the first unloader arm 2318 and the second unloader arm 2324 and a locked configuration of the unloader lock 2313. In the locked configuration the pair of fingers 2312, 2316 engage with and secure the first carrier plate 908 of the mold 900. The engagement of the pair of fingers 2312, 2316 secures the first carrier plate 908 to the unloader plate 2304, resists an upward force exerted by the first unloader arm 2318 and the second unloader arm 2324 as they engage with the second carrier plate 906, and lift the second carrier plate 906. This lifting action separates the second carrier plate 906 from the first carrier plate 908, which allows access to an internal volume of the mold cavity such that the foamed article may be removed. Therefore, it is contemplated that the first unloader arm 2318 and the second unloader arm 2324 in their agreement direction of motion are configured to move through at least three positions. The first position is when the mold is closed, a second position is with the mold partially opened to remove scrap material from the runner system of the mold, and a third position having the mold opened a greater extent such that the foamed article may be removed from within the mold cavity. It is contemplated that a delay or cessation of movement for a fixed time from 1 second to 120 seconds is provided between the second position and the third position transition. This intentional delay allows for an automated removal, such as by a supplemental robot, of the scrap, in an example.

The first unloader arm 2318 also comprises a key 2606 extending outwardly from the first unloader arm 2318 toward the second unloader arm 2324. The key 2606 is a protrusion that engages with the biased pin 922 of FIG. 10 that is biased into a locked configuration. The second unloader arm 2324 also comprises a key 2607 (as best seen in FIG. 24) extending outwardly from the second unloader arm 2324 toward the first unloader arm 2318. The key 2607 is a protrusion that engages with the biased pin 922 of FIG. 10 that is biased into a locked configuration.

As the first unloader arm 2318 and the second unloader arm 2324 move in disagreement with each other, each of the first unloader arm 2318 and the second unloader arm 2324 comprises a key, such as the key 2606 and the key 2607 respectively, that engage with respective biased pins (e.g., biased pin 922 of FIG. 10) in respective tooling latch assemblies (e.g., tooling latch assembly 918 of FIG. 10). As the first unloader arm 2318 and the second unloader arm 2324 converge, their respective keys (i.e., the key 2606 and the key 2607) engage with the tooling latch assemblies to release the mechanical lock caused by the biases pins. During the unlocking of the tooling latch assemblies (e.g., tooling latch assembly 918 of FIG. 10) by the unloader 2300, it is contemplated that the unloader 2300, such as through the unloading arms 2318, 2324, compresses the tooling to relieve a shear pressure that is exerted on the biased pin (e.g., biased pin 922 of FIG. 10) by the second portion of the tooling latch assembly interacting with the biased pin. The compression of the tooling by the unloader reduces the interaction of the second portion of the tooling latch assembly with the biased pin in the locked configuration to allow the converging force of the unloader arms to compress the biased pin(s) inwardly and out of the second portion of the tooling latch assembly.

While a specific unloader is depicted and described, the unloader 2300 is a non-limiting example. It is contemplated within the scope of the system and methods provided herein that an alternative unloader configuration, arrangement, and/or structure might be implemented while staying within the contemplated scope herein.

Figure 27:
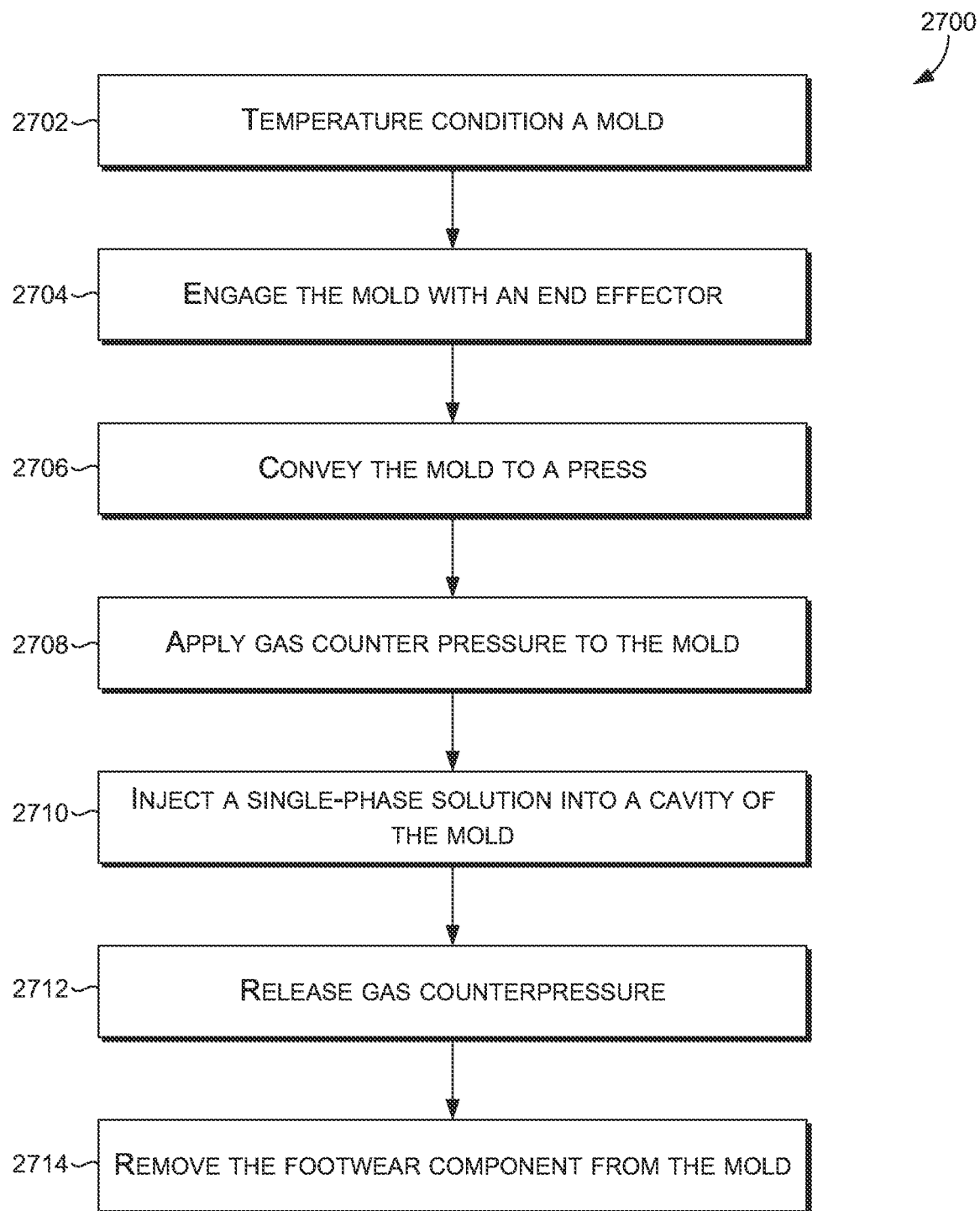
FIG. 27 depicts flow diagram representing a first method of physical foaming a footwear component, in accordance with aspects hereof.

FIG. 27 depicts flow diagram 2700 representing a first method of physical foaming a footwear component, in accordance with aspects hereof. At a block 2702, a step of temperature conditioning a mold is performed. The temperature conditioning may be accomplished at a temperature conditioning rack and the temperature conditioning results in the mold achieving a temperature from 15 degrees Celsius to 90 degrees Celsius. In an alternative range, the mold is temperature conditioned to a temperature from 50 degrees Celsius to 70 degrees Celsius. In an additional alternative range, the mold is temperature conditioned to a temperature from 55 degrees Celsius to 65 degrees Celsius.

At a block 2704, the method continues with an end effector engaging with the mold. The engagement may result from one or more protrusion of the end effector being received in one or more keyways of the mold. The protrusions may be asymmetrical such that an orientation and position of the mold can be determined based on the engagement of the end effector with the mold. The end effector is reversibly engages with the mold such that the end effector engages with mold to convey the mold and disengages with the mold to place and deposit the mold.

At a block 2706, a step of conveying the mold by the end effector is provided. The conveyance is performed by a robot manipulating the end effector's position in macro space. The mold is conveyed, by the end effector, to a press. The conveyance may be in a generally arc-like manner caused by the robot rotating about a primary axis. The conveyance may be in a generally non-arc manner, such as a linear motion patch as provided by a Cartesian or gantry-style robot, in an example.

At a block 2708, the method continues with applying a gas counter pressure to the mold. The gas counter pressure may be supplied through a hot-runner secured to the press and fluidly communicating with the mold. The gas counter pressure may pressurize a cavity of the mold to at least a critical pressure of a physical blowing agent used in the method. The gas provided for the gas counter pressure may be any materials, such as nitrogen, carbon dioxide, or air. In an example, the material of the gas counter pressure is similar to the composition of the physical blowing agent (e.g., the physical blowing agent is supercritical fluid nitrogen; the gas counter pressure is supplied by nitrogen gas).

At a block 2710, the method continues with injecting a single-phase solution comprising a polymeric composition and a physical blowing agent into the cavity of the mold. The single-phase solution is comprised of the polymeric composition and a supercritical fluid in a ratio from X to Y, or from X1 to Y1, or from X2 to Y2. The injected single-phase solution is allowed to remain a single-phase solution without the supercritical fluid coming out of solution for a period of time. The period of time may be 0.5 second to 10 second in an example, This delayed foaming of the polymeric composition provide an opportunity for the injected polymeric composition to disperse in the mold cavity prior to expanding as part of the foaming action, which can produce more consistent foamed article.

At a block 2712, the method continues with releasing the gas counter pressure below a critical pressure of the supercritical fluid acting as a physical foaming agent from the mold cavity. As the pressure reduces below the critical pressure, the super critical fluid experiences a phase change to gas causing the blowing agent to come out of solution and form bubbles that form the cellular structures of the resulting foam article. It is contemplated that a regulator continues to release the gas counter pressure during the injection process, but the release by the regulator is intended to maintain a consistent pressure in the mold cavity. The block 2712 represents a reduction in pressure to a sufficient level that the physical blowing agent is activated.

It is contemplated that the mold may be conveyed to a temperature conditioning rack following the initiation of the foaming action. The mold and the foamed article are allowed to temperature condition at the temperature conditioning rack. The time of conditioning may vary, but in an example, it is from 1 minute to 90 minutes. This conditioning time allows the foamed article in the mold to solidify and gain dimensional stability before being extracted from the mold.

At a block 2714, the method continues by removing the footwear component from the mold. This removal may occur at an unloader to which the mold was conveyed. The removal of the footwear component that was formed in the mold may be manually removed, such as by a human operator, or it may be removed in an automated manner, such as through an end-of-arm tooling for a supplemental robot that is effective secure the foamed article/component from within the mold cavity and remove the article/component.

Figure 28:
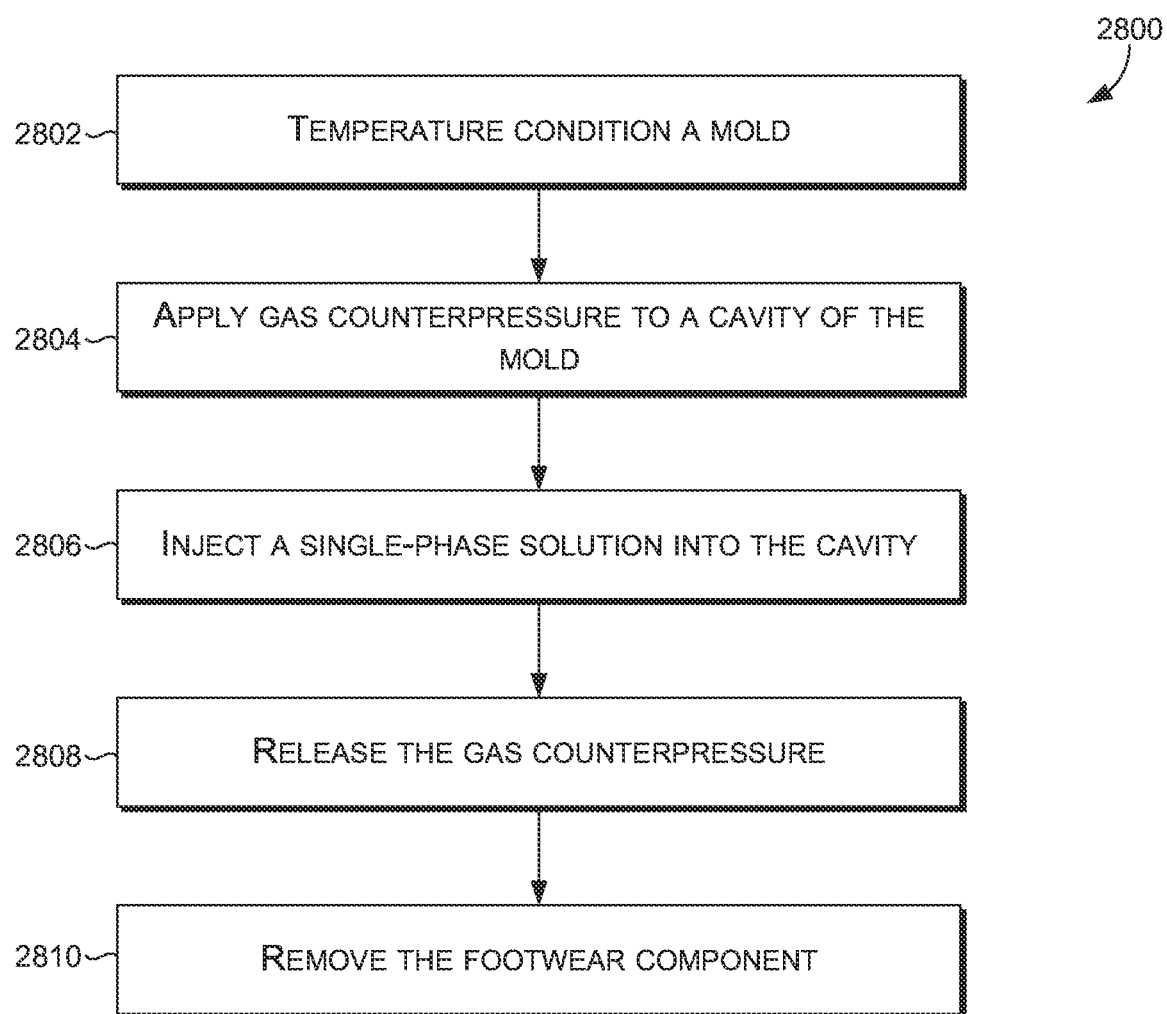
FIG. 28 depicts flow diagram representing a second method of physical foaming a footwear component, in accordance with aspects hereof.

FIG. 28 depicts flow diagram 2800 representing a second method of physical foaming a footwear component, in accordance with aspects hereof. At a block 2802, the method includes temperature conditioning a mold. At a block 2804, the method includes applying a gas counter pressure to a cavity of the mold. At a block 2806, the method includes injecting a single-phase solution in to the cavity of the mold. At a block 2808, the method includes releasing the gas counter pressure to a pressure that causes the physical blowing agent to come out of solution and foam the polymeric composition. At a block 2810, the method include removing the foamed footwear component from the mold.

Figure 29:
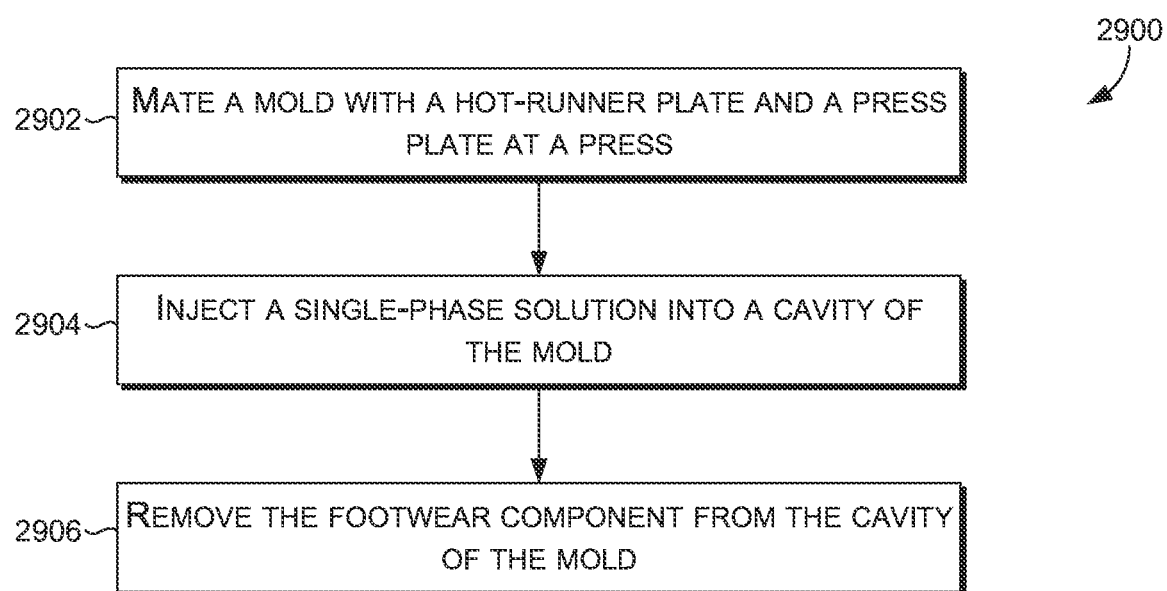
FIG. 29 depicts flow diagram representing a third method of physical foaming a footwear component, in accordance with aspects hereof.

FIG. 29 depicts flow diagram 2900 representing a third method of physical foaming a footwear component, in accordance with aspects hereof. At a block 2902, the method includes mating a mold with a hot-runner plate and a press plate at a press. For example, the press compresses the mold between the press plate and the hot-runner plate to form a fluid coupling between the mold and the hot-runner plate to effectively transfer the single-phase solution while keeping the single-phase solution a single-phase solution. At a block 2904, the method includes injecting a single-phase solution into a cavity of the mold. The single-phase solution, which comprises a physical blowing agent and a polymeric composition, is injected by way of one or more nozzles extending through the hot-runner plate. At a block 2906, the method includes removing the footwear component from the cavity of the mold.

Figure 30:
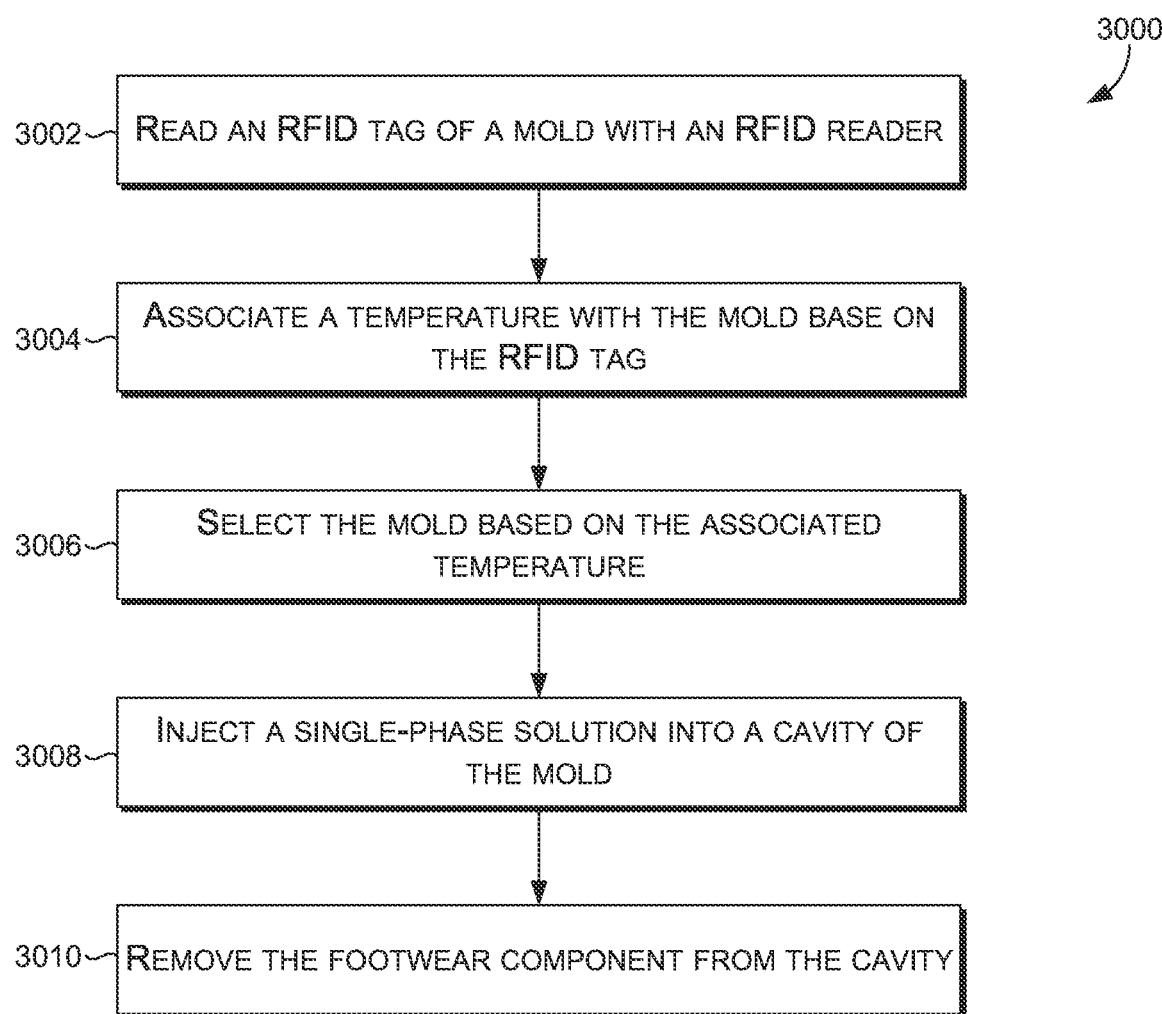
FIG. 30 depicts flow diagram representing a fourth method of physical foaming a footwear component, in accordance with aspects hereof.

FIG. 30 depicts flow diagram 3000 representing a fourth method of physical foaming a footwear component, in accordance with aspects hereof. At a block 3002, the method includes reading an RFID tag associated with a mold by an RFID reader of a temperature conditioning rack. At a block 3004, the method includes associating a temperature with the mold based on the RFID tag. For example, a thermocouple is effective to measure a temperature of a temperature conditioning plate on which the mold may be located an on which the RFID reader is also associated. Therefore, a controller is able to associate a temperature of a temperature conditioning plate with the mold based on the determined location of the mold from the RFID reader interrogation of the RFID tag. At a block 3006, the method continues with a controller selecting the mold from a quantity of molds. The selection of the mold occurs when the associated temperature of the mold indicates the mold is conditioned sufficiently to be used in the system for forming a physically foamed article. At a block 3008, the method includes injecting a single-phase solution into a cavity of the mold. At a block 3010, the method includes removing the footwear component from the cavity.

Materials

Foamed Thermoplastic Elastomer Composition

The present disclosure is directed to an article which includes a foam component comprising a foamed thermoplastic elastomer composition. The foam component includes a foamed thermoplastic elastomer composition having a multicellular foam structure, for example, a multicellular open-cell or closed-cell foam structure. The foam component can include the foamed thermoplastic elastomer composition having a multicellular open-cell structure. The article can be a component, such as a cushioning element, for an article of footwear, an article of apparel, or an article of sporting equipment. In one example, the article is a cushioning element for an article of footwear, such as midsole or a midsole component.

It has been found that thermoplastic elastomer compositions (i.e., polymeric compositions comprising one or more thermoplastic elastomer), including thermoplastic polyester compositions (i.e., polymeric compositions comprising one or more thermoplastic polyester elastomer) can be used to form multicellular foams having advantageous properties for use in consumer articles such as cushioning elements. As used herein, and discussed further below, the term polyester can refer to polyester homopolymers and/or copolyester polymers having at least one polyester monomeric segment. When foamed as described herein, these multicellular foams retain thermoplastic properties, making it possible to readily recycle and reuse the thermoplastic elastomer composition of the foam. For example, once foamed, the thermoplastic elastomer composition can be ground, melted to eliminate its foam structure and foamed again, or can be ground, melted to eliminate its foam structure and molded into an article having a non-foamed structure (i.e., a solid article).

The foam components disclosed herein are formed by foaming the thermoplastic elastomer composition into a multicellular foam having an open-cell or a closed-cell foam structure. The thermoplastic elastomer composition can be a thermoplastic polyester composition comprising one or more thermoplastic polyester elastomer. Examples of thermoplastic polyesters include polymers which have one or more carboxylic acid functional group present in the polymeric backbone, on one or more side chains, or both in the polymeric backbone and on one or more side chains. The one or more carboxylic acid functional group of thermoplastic polyester can include a free carboxylic acid, a salt of a carboxylic acid, or an anhydride of a carboxylic acid. The carboxylic acid functional group of thermoplastic polyester can be an acrylic acid functional group or a methacrylic acid functional group.

The thermoplastic elastomer composition can include at least 90 weight percent, or at least 95 weight percent, or at least 99 weight percent, of a polymeric component comprising all of the polymeric compositions present in the thermoplastic elastomer composition, based on a total weight of the thermoplastic elastomer composition. In some aspects, the thermoplastic polyester composition includes at least 90 weight percent, or at least 95 weight percent, or at least 99 weight percent of a polymeric component comprising all thermoplastic polyesters present in the thermoplastic polyester composition based on the total weight of thermoplastic polyester composition, e.g., one or more thermoplastic polyester elastomers as disclosed herein, based on the total weight of thermoplastic polyester composition. In some such aspects, the thermoplastic elastomer composition (or thermoplastic polyester composition) is substantially free of a non-polymeric component. The non-polymeric component may include all non-polymeric compositions present in the thermoplastic elastomer composition or thermoplastic polyester composition, or may include particular types of non-polymeric compositions present in the thermoplastic elastomer composition or the thermoplastic polyester composition. Examples of non-polymeric components can include one or more of nucleating agents, non-polymeric fillers, chemical foaming agents, coloring agents such as pigments and/or dyes, processing aids, and the like. In some examples, the thermoplastic elastomer composition (or thermoplastic polyester composition) is substantially free of nucleating agents, or is substantially free of non-polymeric fillers, or is substantially free of coloring agents, or is substantially free of both non-polymeric nucleating agents and non-polymeric fillers, or is substantially free of non-polymeric nucleating agents, non-polymeric fillers, and coloring agents. Using thermoplastic polyester compositions with low levels of non-polymeric ingredients such as nucleating agents, fillers and coloring agents increases the potential for re-using and recycling these compositions, as these compositions can be used in uses where the presence of one or more of these ingredients is not desired or would require dilution by adding in virgin polymers. Further, the lack of high levels of fillers or coloring agents in the polymeric compositions can reduce the specific gravity of the foams as compared to compositions with high levels of non-polymeric ingredients, and can allow the formation of foams having open-cell foam structures, which can further reduce the specific gravity of the foams.

The article or foam component comprising the thermoplastic elastomer foam can be formed by injection molding and foaming the thermoplastic elastomer polymeric composition as described herein to form an article or foam component which can be directly incorporated into an article of footwear, apparel, or sporting equipment without any additional processing, i.e., the dimensions and/or external surfaces of the injection molded foam may not require any modification. When physical foaming agents are used, the injection molded foams formed from the thermoplastic elastomer compositions, including thermoplastic polyester compositions, have been found to be very dimensionally stable in that the foam articles or components shrink very little after being released from the mold and do not require any additional processing in order to stabilize the foam, allowing "one-to-one" injection molding processes to be used, in which the resulting molded foam article or component is essentially the same size as the mold used in the injection molding process. Alternatively, the injection molded foam article or component can be further processed such as, for example, by stabilizing the foam using an annealing process, by compression molding the injection molded foam article or component into a finished foam, and/or by applying a coating or decorative element to the injection molded foam article or component.

Characteristics of Thermoplastic Elastomer Foam Components

A disclosed thermoplastic elastomer foam (i.e., a foam formed by expanding a thermoplastic elastomer composition as disclosed herein), including thermoplastic polyester foams, can exhibit various beneficial properties. For example, the thermoplastic elastomer foam can exhibit a beneficial split tear, for example a high split tear value for a sole component in an article of footwear. In some aspects, the thermoplastic elastomer foam can have a split tear value of greater than about 1.5 kilogram/centimeter (kg/cm), or greater than about 2.0 kg/cm, or greater than about 2.5 kg/cm, when determined using the Split Tear Test Method described herein. In some aspects, the thermoplastic elastomer foam can have a split tear value of 1.0 kg/cm to 4.5 kg/cm, or 1.0 kg/cm to 4.0 kg/cm, or 1.5 kg/cm to 4.0 kg/cm, or 2.0 kg/cm to 3.5 kg/cm, or 2.5 kg/cm to 3.5 kg/cm, when determined using the Split Tear Test method described herein. The thermoplastic elastomer foam can have a split tear value of 0.8 kg/cm to 4.0 kg/cm, or 0.9 kg/cm to 3.0 kg/cm, or 1.0 to 3.0 kg/cm, or of 1.0 kg/cm to 2.5 kg/cm, or 1 kg/cm to 2 kg/cm. In some aspects, the thermoplastic elastomer foam is injection molded, and has a split tear value of 0.7 kg/cm to 2.5 kg/cm, or 0.8 kg/cm to 2.0 kg/cm, or 0.9 to 1.5 kg/cm, or 1.0 kg/cm to 2.5 kg/cm, or of 1.0 kg/cm to 2.2 kg/cm. The thermoplastic elastomer foam can have an open-cell foam structure. The thermoplastic elastomer foam can be the product of physically foaming a thermoplastic elastomer composition as disclosed herein, i.e., a foam formed using a physical foaming agent (i.e., a physical blowing agent). As used herein, a thermoplastic elastomer foam is understood to refer to a foamed material which has thermoplastic and elastomeric properties. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition. In some aspects, the thermoplastic elastomer foam is injection molded (i.e., is not exposed to a separate compression molding step after being formed by injection molding and removed from the injection mold). In other aspects, the thermoplastic elastomer foam is injection molded and subsequently compression molded in a separate compression mold having different dimensions than the mold used in the injection molding step.

The density or specific gravity of a disclosed thermoplastic elastomer foam, including a thermoplastic polyester foam, is also an important physical property to consider when using a foam for an article of apparel, footwear or athletic equipment. As discussed above, the thermoplastic elastomer foam of the present disclosure exhibits a low density or specific gravity, which beneficially reduces the weight of midsoles or other components containing the thermoplastic elastomer foam.

The thermoplastic elastomer foams of the present disclosure, including thermoplastic polyester foams, can have a specific gravity of from 0.02 to 0.22, or 0.03 to 0.12, or 0.04 to 0.10, or 0.11 to 0.12, or 0.10 to 0.12, or 0.15 to 0.20, or 0.15 to 0.30, when determined using the Specific Gravity Test Method described herein. In some aspects, the thermoplastic elastomer foams can have a specific gravity of from 0.15 to 0.22, such as from 0.17 to 0.22 or from 0.18 to 0.21, when determined using the Specific Gravity Test Method described herein. Alternatively or in addition, the thermoplastic elastomer foam can have a specific gravity of from 0.01 to 0.10, or 0.02 to 0.08, or 0.03 to 0.06, or 0.08 to 0.15, or 0.10 to 0.12, when determined using the Specific Gravity Test Method described herein. For example, the specific gravity of the thermoplastic elastomer foam can be from 0.15 to 0.2, or 0.10 to 0.12. The thermoplastic elastomer foam can be injection molded, or can be injection molded and subsequently compression molded. In some aspects, the thermoplastic elastomer foam has a specific gravity of about 0.7 or less, or 0.5 or less, or 0.4 or less, or 0.3 or less, when determined using the Specific Gravity Test Method described herein. In some aspects, the thermoplastic elastomer foam, including the thermoplastic elastomer foam present in midsoles and midsole components, can have a specific gravity of 0.05 to 0.25, or 0.05 to 0.2, or 0.05 to 0.15, or 0.08 to 0.15, or 0.08 to 0.20, or 0.08 to 0.25, or 0.1 to 0.15, when determined using the Specific Gravity Test Method described herein. In some aspects the thermoplastic elastomer foam has a specific gravity of about 0.15 to about 0.3, or about 0.2 to about 0.35, or about 0.15 to about 0.25, when determined using the Specific Gravity Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foams of the present disclosure, including thermoplastic polyester foams, can have a density of from 0.02 grams per cubic centimeter (g/cc) to 0.22 g/cc, or 0.03 g/cc to 0.12 g/cc, or 0.04 g/cc to 0.10 g/cc, or 0.11 g/cc to 0.12 g/cc, or 0.10 g/cc to 0.12 g/cc, or 0.15 g/cc to 0.2 g/cc, or 0.15 g/cc to 0.30 g/cc, when determined using the Density Test Method described herein. In some aspects, the thermoplastic elastomer foams can have a density of from 0.15 g/cc to 0.22 g/cc, such as from 0.17 g/cc to 0.22 g/cc, or from 0.18 g/cc to 0.21 g/cc, when determined using the Density Test Method described herein. Alternatively or in addition, the thermoplastic elastomer foam can have a density of from 0.01 g/cc to 0.10 g/cc, or 0.02 g/cc to 0.08 g/cc, or 0.03 g/cc to 0.06 g/cc, or 0.08 g/cc to 0.15 g/cc, or 0.10 g/cc to 0.12 g/cc, when determined using the Density Test Method described herein. For example, the density of the thermoplastic elastomer foam can be from 0.15 g/cc to 0.2 g/cc, or 0.10 g/cc to 0.12 g/cc. The thermoplastic elastomer foam can be injection molded, or can be injection molded and subsequently compression molded. In some aspects, the thermoplastic elastomer foam has a density of about 0.7 g/cc or less, or 0.5 g/cc or less, or 0.4 g/cc or less, or 0.3 g/cc or less, or 0.2 g/cc or less, when determined using the Density Test Method described herein.

In some aspects, the thermoplastic elastomer foam, including the thermoplastic elastomer foam present in midsoles and midsole components, can have a density of 0.05 g/cc to 0.25 g/cc, or 0.05 g/cc to 0.2 g/cc, or 0.05 g/cc to 0.15 g/cc, or 0.08 g/cc to 0.15 g/cc, or 0.08 g/cc to 0.20 g/cc, or 0.08 g/cc to 0.25 g/cc, or 0.10 g/cc to 0.15 g/cc, when determined using the Density Test Method described herein. In some aspects the thermoplastic elastomer foam has a density of about 0.15 g/cc to about 0.30 g/cc, or about 0.20 g/cc to about 0.35 g/cc, or about 0.15 g/cc to about 0.25 g/cc, when determined using the Density Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including thermoplastic polyester foam portion, can have a stiffness of about 200 kPa to about 1000 kPa, or about 300 to about 900 kPa, or about 400 to about 800 kPa, or about 500 to about 700 kPa, when determined using the Cyclic Compression Test for a Sample with a 45 millimeter diameter cylindrical sample. The thermoplastic elastomer foam portion of the article or component of an article can have a stiffness of about 100 N/mm to about 400 N/mm, or about 150 N/mm to about 350 N/mm, or about 200 N/mm to about 300 N/mm, or about 225 N/mm to about 275 N/mm, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including a thermoplastic polyester portion, can have an Asker C durometer hardness of from about 30 to about 50, or from about 35 to about 45, or from about 30 to about 45, or from about 30 to about 40, when determined using the Durometer Hardness Test described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy input of a foam is the integral of the force displacement curve during loading of the foam during the Cyclic Compression test. The energy return of a foam is the integral of the force displacement curve during unloading of the foam during the Cyclic Compression test. The thermoplastic elastomer foam portion of the article or component of an article, including a thermoplastic polyester foam portion, can have an energy return of about 200 millijoules (mJ) to about 1200 mJ, or from about 400 mJ to about 1000 mJ, or from about 600 mJ to about 800 mJ, when determined using the Cyclic Compression Test for a Sample with a 45 millimeter diameter cylindrical sample. The thermoplastic elastomer foam portion of the article or component of an article (e.g., footwear sole for a Men's US Size 10) can have an energy input of about 2000 millijoules (mJ) to about 9000 mJ, or from about 3000 mJ to about 8000 mJ, or from about 4500 mJ to about 6500 mJ, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy efficiency (EE), a measure of the percentage of energy of the thermoplastic elastomer foam portion of the article or component, including a thermoplastic polyester foam portion, returns when it is released after being compressed under load, which can provide improved performance for athletic footwear, e.g., for reducing energy loss or dissipation when running. This is especially true for running and other athletic footwear. In some aspects, the thermoplastic elastomer foam portion of the articles and components provided herein have an energy efficiency of at least 50 percent, or at least 60 percent, or at least 70 percent, or at least about 75 percent, or at least about 80 percent, or at least about 85 percent, when determined using the Cyclic Compression Test for a Sample with a 45 millimeter diameter cylindrical sample. The thermoplastic elastomer foam portion of the articles and components provided herein can have an energy efficiency of at about 50 percent to about 97 percent, or about 60 percent to about 95 percent, or about 60 percent to about 90 percent, or about 60 percent to about 85 percent, or about 65 percent to about 85 percent, or about 70 percent to about 85 percent, or about 70 percent to about 90 percent, or about 70 percent to about 95 percent, when determined using the Cyclic Compression Test for a Sample with a 45 millimeter diameter cylindrical sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The resulting foams can have a multicellular closed-cell or open-cell foam structure. Cells are the hollow structures formed during the foaming process, in which bubbles are formed in the thermoplastic elastomeric composition by the foaming agents. The cell walls are generally defined by the thermoplastic elastomeric composition. "Closed cells" form an individual volume that is fully enclosed and that is not in fluid communication with an adjoining individual volume. "Closed-cell structures" refer to foam structures in which at least 50 percent or more of the cells are closed cells, or at least 60 percent or more of the cells are closed cells, or at least 80 percent of the cells are closed cells, or at least 90 percent of the cells are closed cells, or at least 95 percent of the cells are closed cells. "Open-cell structures" refer to foam structures in which less than 50 percent, or less than 40 percent, or less than 20 percent, or less than 10 percent, or less than 5 percent or less than 4 percent, or less than 3 percent or less than 1 percent of the cells are closed cells.

The disclosed open-cell and closed-cell thermoplastic elastomer foams may have an average cell size (e.g., maximum width or length) linearly measured from one side of the cell to an opposing side of the cell. For example, in some aspects of this disclosure, open-cell and closed-cell thermoplastic elastomer foams may have an average cell size of from about 50 micrometers to about 1000 micrometers, or from about 80 micrometers to about 800 micrometers, or from about 100 micrometers to about 500 micrometers. These are example cell sizes of one aspect of this disclosure in which foams form portions of a footwear article, and in other aspects the cell sizes may be larger or smaller when foams form other footwear articles. In addition, open-cell and closed-cell thermoplastic elastomer foams may form all or a portion of a non-footwear article, and in those instances, the foams may have a cell diameter including these example cell sizes, smaller than these example cell sizes, larger than these example cell sizes, or any combination thereof.

For both open-cell and closed-cell structures, the proportion of cells in the thermoplastic elastomer foam having a cell diameter of about 50 micrometers to about 1000 micrometers is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera or digital microscope, determining the number of cells, number of open cells and/or number of closed cells, and determining an area of a cell, and converting it to the equivalent circle diameter.

Methods of Manufacturing Disclosed Foams

In some examples, the disclosed foamed thermoplastic elastomer compositions can be prepared by various methods as disclosed herein and as known in the art. That is, disclosed articles or components of articles such as midsoles, midsole components, inserts and insert components can be prepared by injection molding a melt composition comprising a polymeric composition, such as a thermoplastic elastomer composition as described herein using a physical foaming agent, using a combination of a physical foaming agent and a chemical foaming agent, or using only a chemical foaming agent. A disclosed foam component, e.g., a disclosed foam article or component, can be prepared by the methods disclosed herein below.

Disclosed herein are methods for making a foam article or component, the method comprising: forming a mixture of a molten thermoplastic elastomer composition (e.g., a polymeric composition) and a foaming agent; injecting the mixture into a mold cavity; foaming the thermoplastic elastomer composition, thereby forming a foamed thermoplastic elastomer composition; solidifying the foamed thermoplastic elastomer composition, thereby forming a foam article having a multicellular foam structure; and removing the foam article from the mold cavity. In some aspects, forming the mixture of the thermoplastic elastomer composition and the foaming agent comprises forming a single-phase solution of a liquid, gas or supercritical fluid foaming agent and the molten thermoplastic elastomer composition. In some aspects, the mixture is a single-phase solution of supercritical nitrogen or supercritical carbon dioxide and the polymeric composition. In a particular example, the mixture is a single-phase solution of supercritical nitrogen in a thermoplastic polyester composition. In some aspects, the thermoplastic elastomer composition comprises less than 10 weight percent, or less than 5 weight percent, or less than 1 weight percent of non-polymeric ingredients based on a total weight of the thermoplastic elastomer composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the molten polymer, forming gas bubbles in the molten polymer and foaming the molten polymer. In some aspects, the foaming forms a foam having an open-cell foam structure.

Also disclosed are methods for making a foam article or component, the method comprising: forming a mixture of a molten thermoplastic elastomer composition and a foaming agent; injecting the mixture into a mold cavity; foaming the molten thermoplastic elastomer composition in the mold cavity, thereby forming a thermoplastic elastomer foam; solidifying the thermoplastic elastomer foam in the mold cavity, thereby forming a molded foam article comprising a thermoplastic elastomer composition having a multicellular foam structure; and removing the molded foam article from the mold cavity. In some aspects, the temperature of the mixture at the point that it is foamed in the mold cavity is from about the melting temperature of the thermoplastic elastomer composition to about 50 degrees C. above the tail temperature of the thermoplastic elastomer composition. In some aspects, the melting temperature of the thermoplastic elastomer composition is the melting temperature of a polymeric component of the thermoplastic elastomer composition. In other aspects, the melting temperature of the thermoplastic elastomer composition is the melting temperature of a thermoplastic elastomer present in the thermoplastic elastomer composition. In yet other aspects, the melting temperature of the thermoplastic elastomer present in the thermoplastic elastomer composition is the melting temperature of the thermoplastic elastomer having the highest melting temperature of all polymers present in the polymeric component of the thermoplastic elastomer composition. In yet other aspects, the melting temperature is the melting temperature of a thermoplastic polyester, such as a polyester elastomer, present in the thermoplastic elastomer composition. The foaming can occur when the mixture is at a foaming temperature, wherein the foaming temperature is a temperature from about the melting temperature of the thermoplastic elastomer to about 50 degrees C. above the tail temperature of the thermoplastic elastomer. In some aspects, forming the mixture of the thermoplastic elastomer composition and a foaming agent comprises forming a single-phase solution of a supercritical fluid and the molten thermoplastic elastomer composition. The thermoplastic elastomer composition can comprise less than 10 weight percent, or less than 5 weight percent, or less than 1 weight percent of non-polymeric ingredients based on a total weight of the thermoplastic elastomer composition. If more than one thermoplastic elastomer is present in the thermoplastic elastomer composition, the melting temperature can be the highest melting temperature of the thermoplastic elastomers present in the composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the thermoplastic elastomer composition, forming gas bubbles in the thermoplastic elastomer composition and foaming the thermoplastic elastomer. The foaming can form a foam having an open-cell foam structure.

Dynamic scanning calorimetry (DSC) is used to determine the melting temperature and the tail temperature of the thermoplastic elastomer composition, or of the polymeric component of the thermoplastic elastomer composition, or of an individual thermoplastic elastomer present in the thermoplastic elastomer composition, and an exemplary method is described herein below. Briefly, 10-30 mg pieces of undried resin pellets are cycled from −90 degrees C. to 225 degrees C. at 20 degrees C./min and cooled to −90 degrees C. at 10 degrees C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The melting temperature and glass transition temperature values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline.

The disclosed foamed thermoplastic elastomer compositions can be prepared using a suitable injector. The injector can have a motor to turn a screw inside the injector. The injector may include a single screw or twin screws, and may include individual elements of various sizes and pitches appropriate for mixing or kneading the specific materials used.

The various components included in the foamed thermoplastic elastomer compositions described herein can be added into the injector through one or more ports. The various components can be added as a melt or as appropriately-sized solid particles, for example chips or pellets, which may be melted as they are mixed in the barrel of the injector. The contents of the injector can be heated to melt the composition. A physical foaming agent such as, for example, a supercritical fluid can be added into the melt while it is present in the barrel of the injector. In one example, thermoplastic polyester foam is prepared by using a physical foaming agent which foams the composition in the mold cavity, and the resulting thermoplastic elastomer foam is thus substantially free of unreacted chemical blowing agents or a decomposition or degradation product of a chemical blowing agent. The thermoplastic elastomer composition can be added to the injector as a melt at a temperature close to the melting temperature of the polymeric component of the composition.

If a chemical foaming agent is used, the processing (melting) temperature used can be sufficiently below the temperature that would trigger the chemical foaming agent. In order to foam the composition, the temperature near the exit of the injector or within the mold cavity can be increased to a temperature close to or at the triggering temperature of the chemical foaming agent, thereby producing a chemically foamed thermoplastic polyester foam as the composition exits the injector (e.g., as the composition is injected into a mold cavity), or within the mold cavity. Additionally or alternatively, the temperature of the runners leading to the mold cavity or the mold cavity or both can be a temperature at or above the triggering temperature of the chemical foaming agent, thereby producing a chemically foamed thermoplastic elastomer foam within the runners and/or the mold cavity.

Alternatively or in addition, a physical foaming agent can be used to foam the thermoplastic elastomer composition to form a physically foamed thermoplastic elastomer foam, or a physically and chemically foamed thermoplastic elastomer foam. For example, a supercritical fluid such as supercritical carbon dioxide or supercritical nitrogen can be mixed with the molten thermoplastic elastomer composition in the barrel of the injector to form a single-phase solution. A pressure drop can be used to cause the supercritical fluid to transition to the gas phase and foam the thermoplastic elastomer composition. In one aspect, a gas counter-pressure can be applied to the mold cavity and to the runners leading to the mold cavity. The counter pressure can be a pressure sufficiently high to keep the supercritical fluid in solution within the runners and the mold cavity. Once a dose of the single-phase solution is in the mold cavity, the counter-pressure within the mold cavity can be decreased to a level at which the supercritical fluid phase transitions to a gas and drops out of solution in the molten thermoplastic elastomer composition, forming gas bubbles in the thermoplastic elastomer composition and foaming the thermoplastic elastomer composition in the mold cavity. In one aspect the thermoplastic elastomer composition comprises less than 10 weight percent, or less than 5 weight percent, or less than 1 weight percent of non-polymeric ingredients based on a total weight of the thermoplastic elastomer composition, and the multi-cellular foam has an open-cell structure.

The articles, cushioning elements, or components of articles such as midsoles, midsole components, inserts and insert components can be prepared by injection molding a thermoplastic elastomer composition described herein using a physical foaming agent. The injection molding process can use a screw-type injector that allows for maintaining and controlling the pressure in the injector barrel. The injection molding machine can allow metering and delivering a supercritical fluid such as carbon dioxide or nitrogen into the thermoplastic elastomer composition prior to injection. The supercritical fluid can be mixed into the thermoplastic elastomer composition within the injection barrel and then injected into the mold cavity. When the temperature and/or pressure is altered to the point that the solubility of the supercritical fluid in the molten thermoplastic elastomer composition is altered and the supercritical fluid transitions to the gas phase, these physical processes will cause expansion (foaming) of the molten thermoplastic elastomer composition. The injection molding process can include physical foaming of the compositions described herein using an injection molding process which forms a multicellular foam structure, such as, for example the "MUCELL" process (Trexel Inc., Wilmington, Massachusetts, USA).

The thermoplastic elastomer foams described herein can be made using a process that involves impregnating a thermoplastic elastomer composition (e.g., at or above a softening temperature of the composition) with a physical foaming agent at a first concentration or first pressure. As used herein, the term "impregnating" generally means dissolving or suspending a physical foaming agent in a composition. The impregnated composition can then be foamed, or can be cooled (when applicable) and re-softened (when applicable) for foaming at a later time. In some aspects, the impregnated molten thermoplastic elastomer composition forms a single-phase solution comprising a supercritical fluid (e.g., carbon dioxide or nitrogen) dissolved in the molten thermoplastic elastomer composition. In one aspect, the thermoplastic elastomer composition comprises less than 10 weight percent, or less than 5 weight percent, or less than 1 weight percent of non-polymeric ingredients based on a total weight of the thermoplastic elastomer composition.

The impregnated thermoplastic elastomer composition (e.g., the single-phase solution) is foamed by reducing the solubility of the physical foaming agent in the thermoplastic elastomer composition through pressure and/or temperature changes. The pressure and/or temperature change can occur immediately after the impregnated composition exits the injector or the injection barrel, or can occur in the runners leading to the mold cavity, or can occur in the mold cavity. For example, the system can include hot runners or gas counter-pressure or both, which control the temperature and pressure under which the impregnated composition is held, up to and including the point at which the composition enters the mold cavity. In some aspects, the temperature and pressure under which the impregnated composition is held are controlled such that the impregnated composition remains a single-phase solution up to and including the point it enters the mold cavity. Once the single-phase solution has flowed into the mold cavity, the temperature or the pressure or both can be altered to reduce the solubility of the supercritical fluid in the molten thermoplastic elastomer composition, causing the molten thermoplastic elastomer composition to expand into a foam, including a foam having an open-cell foam structure. The reduction in solubility of the physical foaming agent can release additional amounts of gas (e.g., to create a secondary expansion of a partially-foamed thermoplastic elastomer composition), to further expand the composition, forming a foam structure (e.g., a foam having a multicellular structure). Alternatively or additionally, a chemical blowing agent can be activated in the thermoplastic elastomer composition in the mold cavity to create a secondary expansion of a partially-foamed thermoplastic elastomer composition.

Chemical foaming agents may be endothermic or exothermic, which refers to a type of decomposition or degradation they undergo to produce the gas used to produce the foam. The decomposition or degradation may be triggered by thermal energy present in the molding system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the thermoplastic elastomer composition being foamed and thermal variables of the foaming agent to be decomposed or degraded are coupled together such that process parameters are selected so that the thermoplastic elastomer composition can be foamed and molded and the foaming agent can decompose or degrade at an appropriate phase of the foaming and molding process.

Thermoplastic Elastomer Composition

Thermoplastic elastomer compositions disclosed herein include one or more thermoplastic elastomers. The one or more thermoplastic elastomers can be one or more thermoplastic polyester elastomers. In some aspects, the thermoplastic elastomer composition includes at least 90 percent, or at least 95 weight percent, or at least 99 weight percent of a thermoplastic resin component, based on the total weight of the thermoplastic elastomer composition, where thermoplastic resin component includes all the polymers present in the composition. Thermoplastic resin component comprises one or more thermoplastic elastomers. Thermoplastic resin component can comprise at least one thermoplastic polyester elastomer. Thermoplastic resin component can comprise more than one thermoplastic polyester elastomer. Thermoplastic resin component can comprise one or more thermoplastic polyester elastomer, and one or more thermoplastic polyester which is not an elastomer. In some aspects, thermoplastic resin component comprises the one or more thermoplastic polyester, and further comprises one or more thermoplastic polymers each of which is not a polyester. The one or more thermoplastic polymers each of which is not a polyester can each be a thermoplastic elastomer. Alternatively, in other aspects, thermoplastic resin component consists essentially of the one or more thermoplastic elastomer. Optionally, thermoplastic resin component can consist essentially of one or more thermoplastic polyester elastomer. In some aspects, the thermoplastic elastomer composition comprises less than 10 weight percent, or less than 5 weight percent, or less than 1 weight percent of non-polymeric ingredients based on the total weight of the thermoplastic elastomer composition. In some aspects, the thermoplastic elastomer composition is substantially free of non-polymeric nucleating agents, or is substantially free of non-polymeric fillers, or is substantially free of coloring agents, or is substantially free of non-polymeric processing aids, or is substantially free of both non-polymeric nucleating agents and non-polymeric fillers, or is substantially free of non-polymeric nucleating agents, non-polymeric fillers, coloring agents, and non-polymeric processing aids. In some such aspects, the thermoplastic elastomer composition comprises less than 10 weight percent, or less than 5 weight percent, or less than 1 weight percent of solid coloring agents, based on the total weight of the thermoplastic elastomer composition. In one aspect, the thermoplastic elastomer composition consists essentially of one or more thermoplastic elastomers. In another aspect, the thermoplastic elastomer composition consists essentially of one or more thermoplastic polyester elastomers. It should be understood that a thermoplastic polyester elastomer can refer to a thermoplastic polyester homopolymer elastomer, a thermoplastic copolyester elastomer, or both. In aspects, the thermoplastic copolyester elastomer can include copolyesters having two or more types of polyester monomeric segments, or copolyesters comprising polyester monomeric segments and one or more non-polyester monomeric segments.

In some aspects, the resin component of the thermoplastic elastomer composition, which is comprised of all the polymeric compositions present in thermoplastic polyester composition, consists essentially of the one or more thermoplastic elastomers, or consists essentially of the one or more thermoplastic polyesters. Thermoplastic polyesters can include chain units derived from one or more olefins and chain units derived from one or more ethylenically-unsaturated acid groups, in aspects.

The thermoplastic elastomer compositions can have a melt flow index of from about 5 to about 40, or about 10 to about 20, or about 20 to about 30 as determined at 210 degrees C. using a 2.16 kilogram weight. Alternatively or additionally, the thermoplastic elastomer compositions can have a melt flow index of from about 5 to about 40, or about 10 about 20, or about 20 to about 30 as determined at 220 degrees C. using a 2.16 kilogram weight. Alternatively or additionally, the thermoplastic elastomer compositions can have a melt flow index of from about 5 to about 40, or about 10 to about 20, or about 20 to about 30 as determined at 230 degrees C. using a 2.16 kilogram weight.

The thermoplastic elastomer, including thermoplastic polyester, can have a weight average molecular weight of about 50,000 Daltons to about 1,000,000 Daltons; or about 50,000 Daltons to about 500,000 Daltons; or about 75,000 Daltons to about 300,000 Daltons; or about 100,000 Daltons to about 250,000 Daltons; or about 100,000 Daltons to about 500,000 Daltons.

The thermoplastic elastomers, including thermoplastic copolyesters, can be terpolymers. In some aspects, thermoplastic copolyesters can be terpolymers of moieties derived from ethylene, acrylic acid, and methyl acrylate or butyl acrylate. In some aspects, a ratio of a total parts by weight of the acrylic acid in thermoplastic copolyesters to a total weight of thermoplastic copolyesters is about 0.05 to about 0.6, or about 0.1 to about 0.6, or about 0.1 to about 0.5, or about 0.15 to about 0.5, or about 0.2 to about 0.5.

The thermoplastic elastomers can be terpolymers comprising a plurality of first segments, a plurality of second segments, and a plurality of third segments. In some aspects, the thermoplastic elastomer is a thermoplastic copolyester comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, thermoplastic copolyester is a block copolymer. In some aspects, thermoplastic copolyester is a segmented copolymer. In further aspects, thermoplastic copolyester is a random copolymer. In still further aspects, thermoplastic copolyester is a condensation copolymer.

The thermoplastic elastomer, including thermoplastic copolyester, can have a ratio of first segments to third segments from about 1:1 to about 1:5 based on the weight of each of the first segments and the third segments; or about 1:1 to about 1:4 based on the weight of each of the first segments and the third segments; or about 1:1 to about 1:2 based on the weight of each of the first segments and the third segments; or about 1:1 to about 1:3 based on the weight of each of the first segments and the third segments.

The thermoplastic elastomer, including thermoplastic copolyester, can have a ratio of second segments to third segments from about 1:1 to about 1:2 based on the weight of each of the first segments and the third segments; or about 1:1 to about 1:1.52 based on the weight of each of the first segments and the third segment.

The thermoplastic elastomer, including thermoplastic copolyester, can have first segments derived from a poly (alkylene oxide)diol having a number-average molecular weight of about 250 Daltons to about 6000 Daltons; or about 400 Daltons to about 6,000 Daltons; or about 350 Daltons to about 5,000 Daltons; or about 500 Daltons to about 3,000 Daltons; or about 2,000 Daltons to about 3,000 Daltons.

The thermoplastic elastomer, including thermoplastic copolyester, can have first segments derived from a poly (alkylene oxide)diol such as poly(ethylene ether)diol; poly (propylene ether)diol; poly(tetramethylene ether)diol; poly (pentamethylene ether)diol; poly(hexamethylene ether)diol; poly(heptamethylene ether)diol; poly(octamethylene ether) diol; poly(nonamethylene ether)diol; poly(decamethylene ether)diol; or mixtures thereof. In a still further aspect, thermoplastic copolyester can have first segments derived from a poly(alkylene oxide)diol such as poly(ethylene ether) diol; poly(propylene ether)diol; poly(tetramethylene ether) diol; poly(pentamethylene ether)diol; poly(hexamethylene ether)diol. In a yet further aspect, thermoplastic copolyester can have first segments derived from a poly(tetramethylene ether)diol.

The thermoplastic elastomer, including thermoplastic copolyester, can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

The thermoplastic elastomer, including the copolyester, can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

Thermoplastic copolyester can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

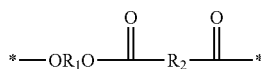

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a Formula 2:

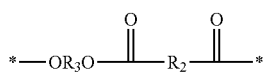

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Thermoplastic copolyester can comprise a plurality of first copolyester units having a structure represented by a Formula 3:

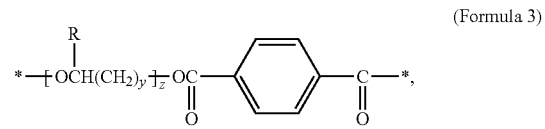

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

Thermoplastic copolyester can comprise a plurality of first copolyester units having a structure represented by a Formula 4:

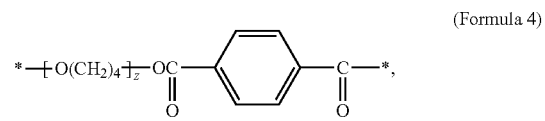

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons.

Thermoplastic copolyester can comprise a plurality of second copolyester units, each second copolyester unit of the plurality having a structure represented by a Formula 5:

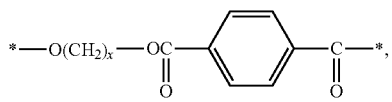

(Formula 5)

wherein x is an integer having a value from 1 to 20; wherein the foam article has a multicellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range of the foregoing integer value ranges. In a further aspect, x is an integer having a value of 2, 3, or 4.

Thermoplastic copolyester can comprise a plurality of second copolyester units, each second copolyester unit of the plurality having a structure represented by a Formula 6:

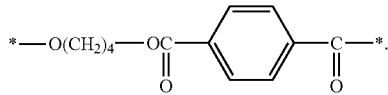

(Formula 6)

Thermoplastic copolyester can comprise a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In some aspects, the thermoplastic elastomer, including thermoplastic copolyester, can comprise phase-separated domains. For example, a plurality of first segments derived from a dihydroxy-terminated polydiol can phase-separate into domains comprising primarily the first segments. Moreover, a plurality of second segments derived from a diol can phase-separate into domains comprising primarily the second segments. In other aspects, thermoplastic copolyester can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

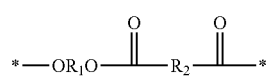

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein the second copolyester unit has a structure represented by a Formula 2:

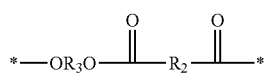

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In other aspects, thermoplastic copolyester can comprise phase-separated domains comprising primarily of a plurality of first copolyester units, each first copolyester unit of the plurality having a structure represented by a Formula 3:

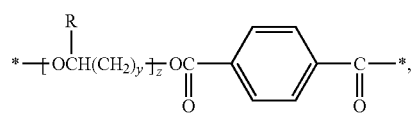

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20;

an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In other aspects, thermoplastic copolyester can comprise phase-separated domains comprising primarily of a plurality of first copolyester units, each first copolyester unit of the plurality having a structure represented by a Formula 4:

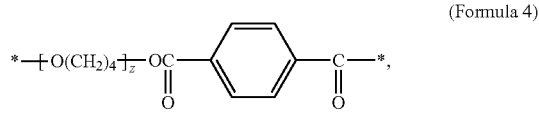

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise phase-separated domains comprising primarily of a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons In other aspects, thermoplastic copolyester can comprise phase-separated domains comprising a plurality of second copolyester units, each second copolyester unit of the plurality having a structure represented by a Formula 5:

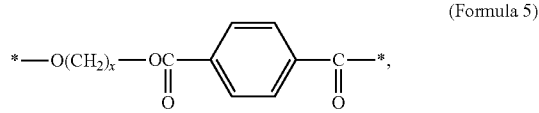

(Formula 5)

wherein x is an integer having a value from 1 to 20; wherein the foam article has a multicellular closed-cell or open-cell foam structure. In some aspects, in the foregoing formula, x is an integer having a value from 2 to 18; or 2 to 17; or 2 to 16; or 2 to 15; or 2 to 14; or 2 to 13; or 2 to 12; or 2 to 11; or 2 to 10; or 2 to 9; or 2 to 8; or 2 to 7; or 2 to 6; or 2 to 5; or 2 to 4.

In other aspects, thermoplastic copolyester can comprise phase-separated domains comprising a plurality of second copolyester units, each second copolyester unit of the plurality having a structure represented by a Formula 6:

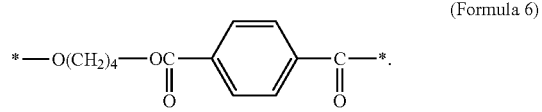

(Formula 6)

Thermoplastic copolyester can comprise phase-separated domains comprising a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight percent; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In various aspects, the thermoplastic elastomer composition can include one or more thermoplastic polyester homopolymer, where the thermoplastic polyester homopolymer comprises any of the polyester monomeric segments or units disclosed herein or modifications thereof. In the same or alternative aspects, the thermoplastic elastomer composition can include one or more thermoplastic polyester homopolymer, where the thermoplastic polyester homopolymer comprises any polyester homopolymer exhibiting any or all of the properties and parameters discussed herein with respect to thermoplastic elastomers and/or the thermoplastic elastomer composition.

The disclosed thermoplastic elastomer composition, the polymeric component of the composition or an individual thermoplastic elastomer in neat form can be characterized by one or more properties. In some aspects, the thermoplastic elastomer composition or the polymeric component, or the polymer has a maximum load of about 10 newtons to about 100 newtons, or from about 15 newtons to about 50 newtons, or from about 20 newtons to about 40 newtons, when determined using the Cyclic Tensile Test method described herein.

The tensile strength of the thermoplastic elastomer composition or of the polymeric component of the thermoplastic elastomer composition or of a thermoplastic elastomer in neat form is another important physical characteristic. The thermoplastic elastomer composition or polymeric component or elastomer can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter, when determined using the Cyclic Tensile Test method described herein.

The thermoplastic elastomer composition or polymeric component of the thermoplastic elastomer composition or a thermoplastic elastomer in neat form can have a tensile modulus of about 2 megapascals to about 20 megapascals or from about 5 megapascals to about 15 megapascals when determined using the Cyclic Tensile Test method described herein.

Exemplary, but non-limiting, thermoplastic elastomers, including thermoplastic polyesters, that can be used in the disclosed methods, foams, and articles include "HYTREL" 3078, "HYTREL" 4068, and "HYTREL" 4556 (DuPont, Wilmington, Delaware, USA); "PELPRENE" P30B, P40B, and P40H (Toyobo U.S.A. Inc., New York, New York, USA); "TRIEL" 5300, "TRIEL" 5400, and blends thereof (Samyang Corporation, Korea); "KEYFLEX" BT1028D, BT1033D, BT1035D, BT1040D, BT1045D, and BT1047D (LG Chem, Korea); and "KOPEL" KP3340, KP3346, KP3347 (Kolon Plastics, Inc., Korea).

The disclosed thermoplastic elastomer compositions can further include one or more ionomers, such as any of the "SURLYN" polymers (DuPont, Wilmington, Delaware, USA). Foams as described herein can be made by a process/method including receiving a composition described herein, and physically foaming the composition to form a thermoplastic elastomer foam having a density of about 0.7 gram per cubic centimeter or less, or 0.5 gram per cubic centimeter or less, or 0.4 gram per cubic centimeter or less, or 0.3 gram per cubic centimeter or less.

The disclosed thermoplastic elastomer compositions can further include one or more thermoplastic polyurethanes, such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA).

The disclosed thermoplastic elastomer compositions can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of thermoplastic polyesters in the composition is about 0.0 to about 0.6, or about 0.0 to about 0.4, or about 0.01 to about 0.4, or about 0.01 to about 0.6, or about 0.1 to about 0.4.

The disclosed thermoplastic elastomer compositions can further include an ethylene-vinyl acetate (EVA) copolymer. The ethylene-vinyl acetate (EVA) copolymer can have a range of vinyl acetate contents, for example about 50 percent to about 90 percent, or about 50 percent to about 80 percent, or about 5 percent to about 50 percent, or about 10 percent to about 45 percent, or about 10 percent to about 30 percent, or about 30 percent to about 45 percent, or about 20 percent to about 35 percent, based on the weight of the copolymer.

Thermoplastic Elastomer Composition Characterization

Component Sampling Procedure

This procedure can be used to obtain a sample of a foam composition or material when the composition or material is incorporated into a component such as a sole structure or midsole or outsole of an article of footwear. A sample of the component which includes the composition or material is obtained as formed into the component, or cut from the article of footwear using a blade. This process is performed by separating the component from an associated footwear upper, if present, and removing any materials from the article's top surface (e.g., corresponding to the top surface). For example, the article's top surface can be skinned, abraded, scraped, or otherwise cleaned to remove any upper adhesives, yarns, fibers, foams, and the like that could potentially interfere with the test results.

The resulting component sample includes the composition or material. As such, any test using a Component Sampling Procedure can simulate how the composition or material will perform as part of an article of footwear. As specified by the test method, the component may be tested as a full component (e.g., full midsole component), or it can be extracted as a sample having a certain geometry. A sample of a component is taken at a location along the component that provides a substantially constant thickness for the component (within plus or minus 10 percent of the average thickness), such as in a forefoot region, mid-foot region, or a heel region of the article. Unless otherwise specified, the desired harvested geometry is a cylindrical puck with a 45-millimeter diameter and a cylinder height of at least about 10 millimeters, preferably from about 20 to 25 millimeters.

Density Test

The density is measured for samples taken using the Component Sampling Procedure, using a digital balance or a Densicom Tester (Qualitest, Plantation, Florida, USA). For each sample a sample volume is determined in cubic centimeters, and then each sample is weighed (g). The density of the sample is the mass divided by the sample volume, given in grams/cubic centimeters.

Specific Gravity Test

This test is appropriate for testing closed-cell foams, and samples of open-cell foams having a substantially uniform closed skin. The specific gravity (SG) is measured for samples taken using the Component Sampling Procedure, using a digital balance or a Densicom Tester (Qualitest, Plantation, Florida, USA). Each sample is weighed (g) and then is submerged in a distilled water bath (at 22 degrees C. plus or minus 2 degrees C.). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air (g)}}{\text{Weight of sample in air (g)} - \text{Weight of sample in water (g)}}$$

Force/Displacement Test (Cyclic Compression Test for a Foot Form)

Force/displacement behavior for the foams and the foamed articles may be measured using a full midsole sample, a full outsole sample, a split midsole and/or a split midsole, tested using a foot form for impact to accurately simulate full gate loading. For these tests, a US men's size 10 midsole is tested, and a men's size 9 foot form used for impact, with a load of 2000N being applied to the midsole with the foot form at a loading rate of 5 Hz with a cyclic compression testing device such an Instron Electropuls E10000 (Instron, Norwood, Massachusetts, USA). Each sample is compressed to the peak load at 5 Hz for 100 cycles. Energy input (J), energy return(J), energy efficiency (energy return/energy input), energy efficiency percentage (100*(energy return/energy input)) and maximum displacement (mm) are measured from the force vs. displacement curves generated. Stiffness of a particular foam sample is the maximum load divided by the displacement at the maximum load, giving a value in N/mm. The reported value for each metric is the average of the metrics from the $60^{th}$, $70^{th}$, $80^{th}$, and $90^{th}$ cycles.

Cyclic Compression Test for a Sample

Force/displacement behavior for the foams and the foamed articles may also, or alternatively, be measured using samples harvested from a larger component (e.g., cylindrical pucks harvested from a footwear midsole), and a method for obtaining a sample is described in the "Component Sampling Procedure" portion of this disclosure. In one testing methodology, when testing a sample (e.g., a cylindrical puck harvested from a larger component), the sample is tested along the length axis of the part using compression platens that are at least 2×the diameter (e.g., of the cylindrical puck). Furthermore, the sample is compressed to the peak load (e.g., 50% strain) at 5 Hz for 500 cycles. Stiffness, efficiency, and energy return are measured from the force vs. displacement curves for cycles 200, 300, 400, and 500, and the reported value for each metric is the average of each metric between cycles 200, 300, 400, and 500. Stiffness, efficiency, and energy return are defined in the following ways, with example property ranges (possibly dependent on sample geometries) provided in parentheses. Stiffness is the stress at the maximum strain divided by the maximum strain (e.g., 200-1000 kPa). Efficiency is the integral of the unloading force-displacement curve divided by the integral of the loading force-displacement curve (e.g., 0.50-0.97). Energy return is the integral of the unloading curve (e.g., 200-1200 mJ).

Cyclic Tensile Test

The cyclic tensile testing is carried out on solid samples prepared using the Component Sampling Procedure, having a dog-bone shape as described in ASTM D638 with a 2 mm thickness. In the test, the specimen is placed under a pre-load of 5 N. Strain is controlled to extend the sample to an extension 6 percent at a strain rate of 5 Hz. The stiffness is the load at 6 percent strain divided by the extension at 6 percent strain, giving a value in N/mm. The maximum load (N) observed over the test cycle of 500 cycles is also recorded.

Durometer Hardness Test—Shore A

The test used to obtain the hardness values for the foam articles is as follows. A flat foam sample is prepared using the Component Sampling Procedure, where the sample has a minimum of 6 mm thick for Shore A durometer testing. If necessary, samples are stacked to make up the minimum thickness. Samples are large enough to allow all measurements to be performed at a minimum of 12 mm from the edge of the sample and at least 12 mm from any other measurement. Regions tested are flat and parallel with an area at least 6 mm in diameter. A minimum of five hardness measurements are taken and tested using a 1 kilogram head weight.

Split Tear Test

The split tear test can determine the internal tear strength for a foam material. A sample may be provided using the Component Sampling Procedure. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are placed in the clamps of a tensile tester. Each section of the sample is held in a clamp in such a manner that the original adjacent cut edges form a straight line joining the centers of the clamps. The crosshead speed is set to 50 millimeters per minute. The tear strength is measured throughout the separation of the crossheads. If necessary, a sharp knife may be used to keep separating the foam in the center of the sample, discarding the readings caused by cutting of the knife. The lowest split tear strength values are recorded for each of the five marked segments of the sample (between each of the 2-centimeter markings). An average split tear strength value is recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Energy Intensity

Energy intensity is a measure of the energy used in forming a particular foam article in kilowatt hours (kW-h). To obtain the energy intensity, the energy required (in kW-H) to produce a run, or batch, of articles, such as cushioning elements (such as pairs of the midsole 122) is first calculated, determined or measured (from pellet to finished component). For example, for a physical foaming process the measured energy may include the energy required for all energy consuming steps, such as: preheating the molds and hot runners (if utilized), melting the pellets, generating gas counter-pressure, injecting the molten plastic, introducing the supercritical fluid, cooling the molds and/or work-pieces and ejecting the work-pieces from the mold. The overall energy required to produce the run of cushioning element pairs is then divided by the number of cushioning element pairs produced in the run.

Zero Shear Viscosity

The zero shear viscosity is determined using a flow curve obtained on a rotational rheometer. Zero shear viscosity is determined as the apparent viscosity of the polymer melt measured at a shear rate of $1\times10^{-2}$ 1/s when the polymer is heated to 10° C. above its melting temperature. Apparent viscosity is measured under continuous flow using a cone and plate rotational fixture. The temperature of the rotational fixture is maintained at the polymer melt temperature. The gap and geometry of the cone are selected such that the measured torque is well within the measuring limits of a rheometer.

Melt Flow Index Test

The melt flow index is determined using a sample prepared using Component Sampling Procedure, according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the sample is loaded into the barrel of the melt flow apparatus, which has been heated to a specified temperature of 210 degrees C., 220 degrees C., or 230 degrees C. A weight of 2.16 kilograms is applied to a plunger and the molten sample is forced through the die. A timed extrudate is collected and weighed. Melt flow rate values are calculated in g/10 min, and are reported with the specified temperature (i.e., 210, 220 or 230 degrees C.) and the weight applied to the plunger (i.e., 2.15 kilograms).

Recyclate

With reference next to the flowchart of FIG. 20, an improved method or control strategy for manufacturing a foamed polymer article, such as the midsole 122 of FIG. 1, is generally described at 2000 in accordance with aspects of the present disclosure. Some or all of the operations illustrated in FIG. 20 and described in further detail below may be representative of an algorithm that corresponds to processor-executable instructions that may be stored, for example, in main or auxiliary or remote memory, and executed, for example, by a local or remote controller, processing unit, control logic circuit, or other module or device or network of devices, to perform any or all of the above or below described functions associated with the disclosed concepts. One or more of the illustrated operations may be performed manually or assisted manually by an onsite technician. It should be recognized that the order of execution of the illustrated operation blocks may be changed, additional blocks may be added, and some of the blocks described may be modified, combined, or eliminated.

Figure 31:
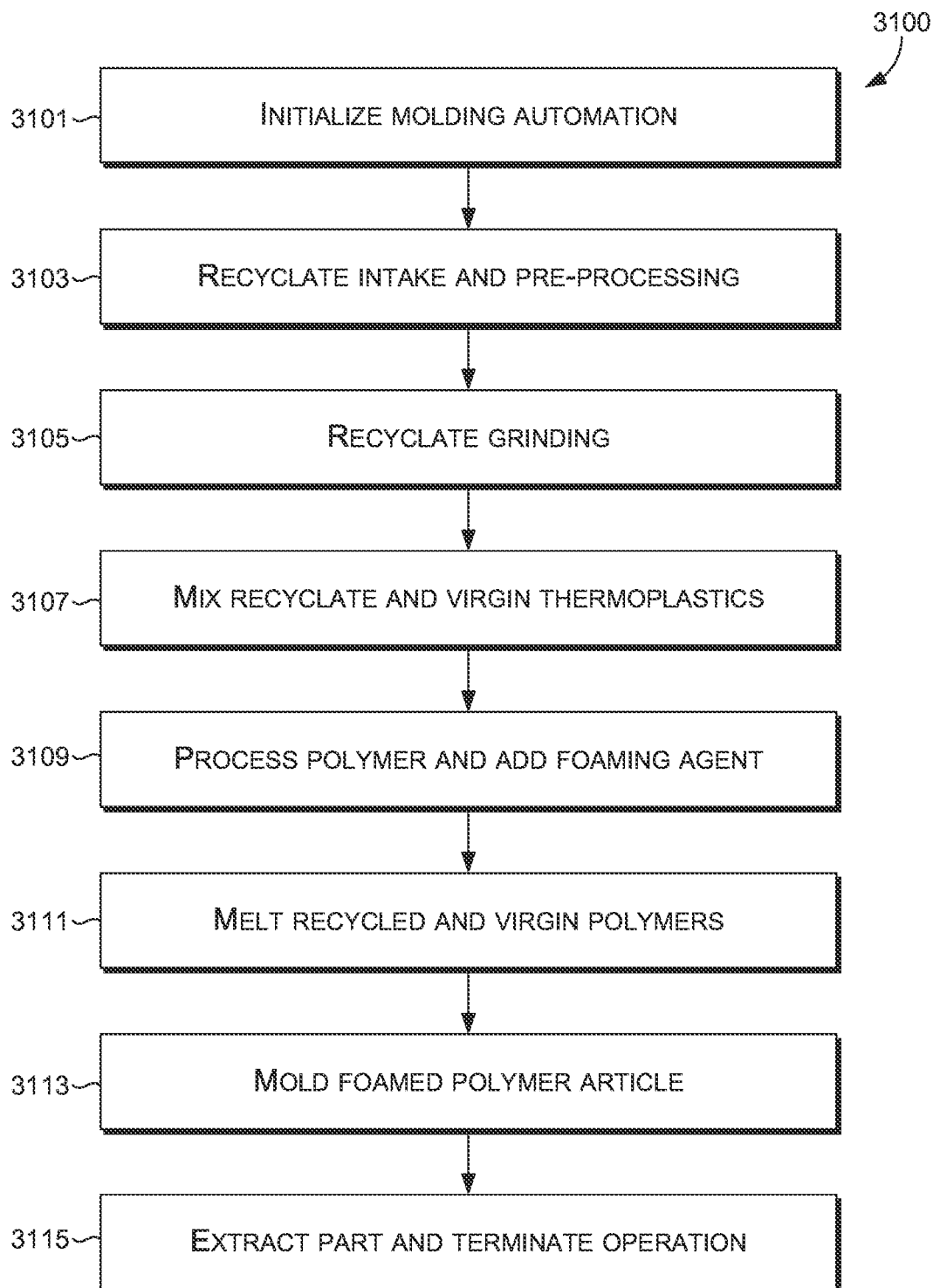
FIG. 31 depicts a flow diagram representing a workflow process for manufacturing a foamed polymer article, such as a segment of an article of footwear, from virgin and recycled thermoplastic polymeric elastomer compositions.

Method 3100 of FIG. 31 is initialized at block 3101, e.g., responsive to input of an activation command signal received from a human machine interface (HMI) of a central control terminal. Initial stages of the manufacturing process may comprise supplying, accessing, and/or utilizing (collectively "receiving") the various materials, tools, and machines needed to manufacture foamed polymer articles. At process block 2003, for example, a batch of recycled plastic material is accessed from an available store of polymer recyclate. As used herein, the term "recycled plastic" may encompass used or excess or scrapped plastic that is put into a recycling stream, including wholesale recycling of entire products, disassembly of products and recycling only selected parts thereof, recycling of manufacturing byproduct, all of which may require sorting and cleaning of any collected materials. For at least some embodiments, scrap and waste thermoplastic polyester elastomer (TPE-E) composition may be recovered (e.g., reclaimed from foamed or unfoamed virgin TPE-E material and/or virgin TPE-E compositions), and then incorporated into foamed articles produced with at least some virgin TPE-E and/or virgin TPE-E compositions. The recycled TPE-E composition may be derived from one or more reactants, such as a poly(alkylene oxide)diol material and/or an aromatic dicarboxylic acid material. The recycled thermoplastic polyester elastomer composition may have a weight average molecular weight ranging from about 50,000 Daltons to about 200,000 Daltons.

Once the batch of recycled plastic is received and any attendant sorting, cleaning, and other pre-processing is complete at process block 3103, the method 3100 shreds, chops, cuts, and/or grinds (collectively "grind") the batch of recycled plastic at process block 3105. By way of non-limiting example, a dedicated recycling station may be responsible for grinding recycled TPE-E into granular or pelletized form; ground recycled material may be produced in real-time or stored in inventory and reused when desired. Alternatively, "grinding" may comprise feeding a hot compound of recyclate into an extruder fitted with a perforated die; a cutter immediately in front of the die slices extruded strings of compound into granulized pellets. Cut pellets are then cooled as they are transported to a sieve grader to separate out irregularly sized pellets. A "regrind" thermoplastic polymer composition may originate from re-extruded material, such as unfoamed, mold-runner derived TPE-E composition waste that is put through an extruder, pelletized, and turned back into resin. Regrind may also originate from injected foam material, such as virgin TPE-E composition resin that is injected and foamed during normal processing, scrapped, then shredded and re-introduced as regrind. The ground recyclate material may have an irregular shape with a major length size of about 1-10 mm, and the virgin polymer material has a pellet size of about 1-10 mm.

At process block 3107, the ground recycled material is mixed with a composition of virgin polymer material. As used herein, the terms "mixing" and "blending" may be used interchangeably and synonymously to mean to combine or intermingle, where the resultant mixed batch may or may not be homogenous throughout the mixture. A recycled material may be contrasted with a virgin material in that a raw "virgin" material has neither been injected into a mold assembly nor expanded through activation of an intermixed foaming agent and formed into an end product. The virgin polymer composition may be the same or similar general polymer composition as the recyclate or, alternatively, may be a distinguishable polymer composition from the recyclate. To properly calibrate the operating parameters of the injection molding system and control the functional properties of the resultant foamed polymer article, a metered amount of the ground recyclate material is mixed with a predetermined amount of virgin polymer material to form a mixed batch of virgin and recycled material. In at least some implementations, the metered amount is limited to about 20% by mass or less of a total mass of the mixed batch. It may be desirable, depending on an intended application, that about 10 to about 50 parts of recycled TPE-E composition per about 80 to about 100 parts virgin TPE-E composition be incorporated into newly foamed TPE-E articles by the methods described herein.

With continuing reference to FIG. 31, method 3100 continues to process block 3109 with instructions to treat the recycled material, either before, during, or after admixture with the virgin material. Processing the recyclate may include the addition of blowing/foaming agents, fillers, pigments, and/or processing aids. In at least some implementations, a foaming agent is incorporated as a separate ingredient into the mixture of recycled and virgin polymer material for invoking the expansion of the mixture during molding. The foaming agent may comprise a suitable stimulant that, alone or in combination with other substances, is capable of producing a cellular structure in a plastic. Foaming agents may include fluids that expand when pressure is released.

It may be desirable, for at least some applications, to add a physical foaming agent to the mixture of recycled and virgin material during the melting of the mixture or after the mixture has melted. When injection molding a midsole, it may be desirable to inject a physical foaming agent into the polymer melt composition. The physical foaming agent may be composed of one or more supercritical fluids (SCF), such as supercritical nitrogen or carbon dioxide, which is/are dissolved into the polymer melt composition under pressure to form a single-phase solution (SPS). As a further option, the method 3100 may be characterized by a lack of a chemical foaming agent for the forming of the foamed polymer article. SCF concentration may be dictated by, among other things, a desired solubility and a desired density. For some embodiments, a chemical blowing agent may be utilized in addition to, or as a substitute for, the physical foaming agent.

Numerous other additives may be incorporated into the recyclate batch prior to introduction into the final mold for forming the foamed polymer article, including fillers, activators, homogenizing agents, pigments, fire retardants, lubricants, and other suitable additives. Non-limiting examples of filler materials include talcum powder, mica silicate, bearing sulfate, magnesium hydroxide, magnesium carbonate, magnesium silicate, calcium carbonate, and other commercially available fillers. The polymer compositions can also contain rubber fillers, such as ethylene propylene rubber (EPR), styrene isoprene styrene (SIS) copolymer rubber, styrene butadiene rubber, as well as other polyolefin resins, in addition to ethylene-vinyl acetate (EVA) or TPE-based materials. In other examples, polyethylene wax may be used as a processing agent, stearic acid may be used as a lubricant, dicumyl peroxide may be used as a polymerization initiator, zinc oxide may be used as an activator for the foaming agent, while titanium dioxide may be used as a white pigment or carbon black may be used as a black pigment.

Process block 3111 of FIG. 31 includes memory-stored, processor-executable instructions to melt the ground recyclate material and the virgin polymer material into a polymer melt composition. It should be appreciated that the ground recyclate and virgin polymer materials may be separately melted and then flowed into a mixed polymer melt composition. Otherwise, the mixed batch of recyclate and virgin polymer materials produced at process block 3107 may be heated into the polymer melt composition. For at least some embodiments, the mixture of ground recyclate and virgin polymer materials has a set point temperature ranging from about 190° C. to about 215° C. Moreover, the mixed batch of the ground recyclate material and the virgin polymer material may have an average peak crystallization temperature ranging from about 135° C. to about 165° C.

Once the polymer composition is complete and ready for molding, the processed recycled and virgin material is pressurized and injected—colloquially "shot"—into the internal cavity or cavities of a mold assembly to form the foamed polymer article, as indicated at process block 3113. After the SCF is injected into the polymer melt composition, where the SCF dissolves in the melt to form a molten SPS, the molten SPS is flowed into the internal mold cavities. The SCF is employed as a physical blowing agent to expand the melted TPE-E composition and thereby fill the mold cavities. The pressure within the mold cavities is reduced or eliminated to release the SCF from the SPS, and the expanded melt is allowed to cool and solidify. To provide a "closed loop" molding system with circular sustainability that eliminates most if not all manufacturing scrap and waste, the mass of recycled thermoplastic resin within the internal mold cavities may be greater than or equal to a mass of the mixed thermoplastic resin within any filling portions fluidly coupled to the cavities.

To ensure the integrity and desired performance characteristics of the resultant foamed polymer article, one or more operating parameters of the injection molding system may be modulated to accommodate the percent mass of recyclate being incorporated into the polymer mixes. For instance, the injection molding system may be set to a molding melt temperature of between about 210° C. and about 215° C. with a batch melt temperature of approximately 190° C. and a crystallization temperature of approximately 147° C. In addition to the selective control of mold temperatures, gas counter-pressure release rates and hold times may be recalibrated to a TPE-E polymer melt composition with approximately 20% by mass recycled TPE-E composition, e.g., to regulate cooling rates within the mold cavities (e.g., higher pressure drop provides faster cooling rate with less cooling time). System operating parameters may be selectively modified to ensure that the polymer melt composition stays within a pre-calculated melt temp-crystallization temp sweet spot for a selected timeframe within the processing cycle.

The foamed polymer article is ejected from the internal mold cavity at process block 3115. For at least some embodiments, the formed foamed polymer article has a cell size average, e.g., by volume of a longest cell dimension, of less than about 0.68 mm or, in some embodiments, about 0.18 mm to about 0.58 mm. For at least some implementations, the foamed polymer article may exhibit some and/or all of the following characteristics: (1) an energy efficiency of about 55% to about 95% or, in some preferred configurations, a target efficiency of 70% to 85%; (2) an energy return of about 1000 millijoules (mJ) to about 7000 mJ or, in some preferred configurations, a target return of 4500 mJ to 5500 mJ (e.g., assuming a standard midsole geometry); and/or (3) a density of about 0.15 grams/cubic centimeter (g/cc) to about 0.25 g/cc or, in some preferred configurations, a target density of 0.18 g/cc to 0.20 g/cc.

As yet a further option, a formed foamed polymer article may exhibit a ratio of energy efficiency to energy intensity (EE/EI) that is greater than about 1.125 or, for some embodiments, greater than about 1.35 or, for some desired embodiments, greater than about 1.5 or, optionally, between about 1.6 and 2.1. Likewise, a formed foamed polymer article may exhibit a ratio of energy efficiency to the product of energy intensity and density (EE/(EI*$\rho$)) that is greater than about 5.25 or, for some embodiments, greater than about 6.3 or, for some desired embodiments, greater than about 7.0 or, optionally, between about 8.8 and 11.2. Moreover, a formed foamed polymer article may exhibit a ratio of energy return to energy intensity (ER/EI) that is greater than about 6,375 or, for some embodiments, greater than about 7,650 or, for some desired embodiments, greater than about 8,500 or, optionally, between about 9,900 and 11,300. A formed foamed polymer article may exhibit a ratio of energy return to the product of energy intensity and density (ER/(EI*$\rho$)) that is greater than about 33,750 or, for some embodiments, greater than about 40,500 or, for some desired embodiments, greater than about 45,000 or, optionally, between about 55,400 and 62,500.

For at least some embodiments, a foamed polymer sole component fabricated from both recyclate and virgin thermoplastic materials may have an energy return measurement that is within a predefined tolerance of an energy return measurement of a comparable shoe sole component formed solely from virgin thermoplastic materials. This predefined tolerance may be about 75% to about 99% of the energy return measurement of the comparable shoe sole component. The foamed sole component and the comparable shoe sole component may share a comparable shape, size, and/or method of molding. At this juncture, the method 3100 may terminate or may loop back to block 3101 and run in a repeatable or continuous loop.

It is envisioned that disclosed manufacturing systems and processes may utilize any logically relevant source of recycled plastic material in order to conserve natural resources, minimize use of raw materials, and divert waste from landfills with the aspiration of reaching a "circular economy". In this regard, aspects of this disclosure are directed to "closed-loop" manufacturing processes that limit usable recyclate sources to manufacturing byproducts (e.g., gate or runner trimmings) and reground defective articles (e.g., visually or mechanically flawed foamed polymer footwear sole elements). Implementing such "closed-loop" manufacturing processes may desirably optimize material use efficiencies by achieving, for example, a zero-waste or near-zero-waste of polymer materials in the manufacture of foamed polymer articles.

As an extension of, a modification to, or a standalone process from the method 3100 of FIG. 31, a method of producing foamed polymer articles may be composed of a series of controlled manufacturing steps, including executing one or more production runs to form one or more types of foamed polymer articles. A "production run" may be typified by a predefined number of articles (e.g., 220-260 articles/hr) of a designated design/model having a preset shape, size and material composition (e.g., single-piece TPE-E midsole for women's size 7 running shoe) produced substantially contiguously by a particular production line. Individual runs may exhibit different quantifiable production variables, including: an average article mass $m_{AA}$ of the foamed polymer articles (e.g., average total mass of all articles per run or average individual article mass or all articles per run), and an average article defect rate $\dot{D}_A$ (e.g., ratio of total defective articles to total articles produced per run). Because the process may produce multiple envelopes of products, e.g., distinguishable from each other in quantity and geometry, the tooling for each geometry may consume a distinct volume of raw materials and generate a distinct volume of manufacturing byproduct.

As will be explained in further detail below, a production line may generate a baseline average byproduct value (e.g., unfoamed byproduct generated upstream of tooling and/or foamed byproduct generated downstream of tooling). For a particular production run, an average byproduct mass amount may be calculated as the sum of: (1) an amount of byproduct generated for each geometry produced in a run divided by the quantity of each geometry in the run; and (2) a remnant upstream byproduct mass per run. By way of non-limiting example, a run size for a production run may include 100 total articles, including twenty of a first geometry, twenty of a second geometry, and sixty of a third geometry. In this instance, byproduct mass may be calculated as: (total byproduct mass for first geometry)/20+(total byproduct mass fir second geometry)/20+(total byproduct mass for third geometry)/60+ upstream and/or downstream byproduct mass.

For at least some implementations, a production run may be limited to a single run for fabricating a preset number of a singular article design having a predefined shape and size. Alternatively, a mass production run may include multiple batch runs of different types of polymer articles, with each type having a respective shape and size. These batch production runs may be performed simultaneously or sequentially, with each run producing the same number of articles or a distinct number of articles. When carrying out multiple batch runs as part of a larger mass production run, the average article mass $m_{AA}$ for the mass run may be calculated as the arithmetic sum of the individual average article masses for all of the discrete runs, namely: $m_{AA-1} + m_{AA-2} + \ldots m_{AA-n}$. Likewise, the average article defect rate DA for the mass run may be calculated as the arithmetic mean of the individual average article defect rates for all of the discrete batch runs, namely: $(\dot{D}_{A-1} + \dot{D}_{A-2} + \ldots + \dot{D}_{A-n})/n$.

After completing a single production run or a group of discretized batch runs of foamed polymer articles, the method may include reclaiming and recycling one or more batches of manufacturing byproduct incidental to the run or runs. Recyclate byproduct material may be recovered from sections of the molding system upstream from the mold tool (e.g., from hot-runner or cold runner plates), downstream from the mold tool (e.g., mold flash and trimmings), and/or from within the mold tool itself (e.g., inlet and outlet gates to the mold-ring cavities). In this example, the manufacturing byproduct may have an average byproduct mass $m_{AB}$ (e.g., average total byproduct mass per run or average byproduct mass per article per run). When carrying out multiple batch runs, the average byproduct mass for the entire mass production run may be calculated as the arithmetic sum of the individual average byproduct masses, namely: $m_{AB-1} + m_{AB-2} + \ldots + m_{AB-n}$. Alternatively, the average byproduct mass may be calculated as the arithmetic sum of: (1) a first byproduct mass incidental to a first batch run divided by a first number of first polymer articles in that run; (2) a second byproduct mass incidental to a second batch run divided by a second number of second polymer articles in that run; . . . and (n) an $n^{th}$ byproduct mass incidental to an $n^{th}$ batch run divided by an $n^{th}$ number of polymer articles in that run.

Prior to, contemporaneous with, or after retrieving the batch of manufacturing byproducts, the method may also include reclaiming and recycling one or more lots of defective articles incidental to the production run(s). In accord with the abovementioned footwear example, recycled defect material may be recovered from pre-consumer footwear and, if desired, from post-consumer footwear. For pre-consumer products, a defective foamed article may be identified through any commercially available technique for identifying manufacturing defects. For instance, the injection molding system may incorporate a system-automated visual inspection station and a system-automated mechanical testing station downstream from the tooling assembly of FIG. 9 or 14A. The visual inspection station may utilize a high-definition digital camera and a machine-learning algorithm to search for and flag any of a multitude of predefined visual defects (e.g., dimensional flaws, superficial blemishes, contour defects, etc.). Moreover, the mechanical testing station may be in the nature of an impact-testing machine with a linear force transducer operatively coupled to a motor-driven, last-shaped plunger. The plunger and transducer collectively measure each foam article's stiffness, energy efficiency, energy return, etc., and flag the article as defective if any of these measurements fall outside of corresponding manufacturing tolerance ranges.

Continuing the discussion of pre-consumer defective products, there will be an associated average defect mass $m_{AD}$ (per run) in the manufacturing system. This average defect mass $m_{AD}$ may be calculated as the arithmetic product of the article defect rate $\dot{D}_A$ and the average article mass $m_{AA}$, or $m_{AD} = \dot{D}_A * m_{AA}$. For implementations that execute multiple batch runs as part of a larger mass production run, the average defect mass $m_{AD}$ may be the arithmetic mean of the individual average defect masses incidental to the various production runs, namely: $(m_{AD-1} + m_{AD-2} + \ldots + m_{AD-n})/n$. To achieve a "closed-loop" manufacturing process, the system may be restricted as follows:

$$(m_{AB} + m_{AD})/m_{AA} \leq 0.2$$

During a closed-loop manufacturing process, foam polymer waste—the manufacturing byproducts and defective articles—may be added directly into the injection barrel for subsequent injection into the mold tool cavity. The foam polymer waste may be crushed or shredded, mixed with virgin pellets, and fed together into the same injection barrel. In this instance, a power-screw type "crammer" feeder may be used to force the waste material back into the tooling assembly. Prior to re-feeding the material, the foam polymer waste may be shredded at least once or, in at least some applications, two or more times to ensure that the discretized waste elements are generally uniform in shape and size. If it determined that the foam polymer waste cannot be added directly to the injection barrel, the foam waste may need to be processed, melted down, and re-pelletized. In this case, the waste material would be shredded a single time or multiple times, fed into a separate extrusion line where it is melted and extruded, and thereafter pelletized to form pellets akin in geometry and density to virgin pellets. These "new" waste material pellets may then be combined with virgin pellets in the injection barrel.

An injection molding system's operating parameters will potentially change depending on the type and volume of recyclate being used to form the foamed polymer articles. For instance, the melt temperatures will likely be modified to successfully process recycled material: when foamed, the recyclate material's crystallization temperature may increase (i.e., crystallization temperature gets closer to the melt temperature). As such, the melt composition may need to be processed at higher temperatures compared to processing temperatures that would typically be used for pure virgin material. For at least some footwear midsole embodiments, the production variables per run may be based on the following parameters: about 0.2 kg/pair, about two pair (four midsoles)/minute, eight hour shift, about 10% to about 15% runner waste relative to midsole weight per pair.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, the term "and/or" includes any and all combinations of one or more of the associated listed items.

As used herein, in substance or substantially means at least 80 percent, 85 percent, 90 percent, 95 percent, or more, as determined based on weight, volume, or unit.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

The terms "at least one" and "one or more of" an element are used interchangeably, and have the same meaning that includes a single element and a plurality of the elements, and can also be represented by the suffix "(s)" at the end of the element. For example, "at least one polyimide", "one or more polyamides", and "polyamide(s)" can be used interchangeably and have the same meaning.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z' Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The terms "about" and "substantially" are used herein with respect to measurable values and ranges due to expected variations known to those skilled in the art (e.g., limitations and variabilities in measurements).

As used herein, the terms "optional" or "optionally" means that the subsequently described component, event or circumstance can or cannot occur, and that the description includes instances where said component, event or circumstance occurs and instances where it does not.

Unless otherwise specified, temperatures referred to herein are based on atmospheric pressure (i.e. one atmosphere).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method of physical foaming a footwear component, the method comprising:
    temperature conditioning a mold to a temperature from 15 degrees Celsius to 90 degrees Celsius;
    reading an RFID tag of the mold with an RFID reader;
    engaging the mold with a robotically conveyed end effector adapted to reversible engage with the mold;
    conveying, with the end effector, the mold to a press;
    applying a gas counter pressure to a cavity of the mold;
    injecting a single-phase solution of a polymeric composition and a supercritical fluid into the cavity of the mold;
    releasing the gas counter pressure from the cavity of the mold; and
    removing the footwear component from the cavity of the mold.

2. The method of claim 1, wherein engaging the mold comprises:
    positioning the end effector at the mold with a first side of the end effector on a first side of the mold and a second side of the end effector on a second side of the mold; and
    positioning the first side of the end effector to the mold first side causing a first protrusion of the first side of the end effector to insert into a first plate-manipulator keyway of the first side.

3. The method of claim 2, further comprising temperature conditioning the mold at a temperature conditioning rack after injecting the single-phase solution and prior to removing the footwear component from the cavity of the mold.

4. The method of claim 1, further comprising selecting the mold with the end effector based, at least in part, on the mold achieving a defined temperature within a temperature conditioning temperature range.

5. The method of claim 1, wherein the polymeric composition is a thermoplastic polyester composition.

6. The method of claim 1, wherein the footwear component has a relative density from 0.1 to 0.6.

7. The method of claim 1, further comprising reducing a temperature of the single-phase solution in the mold cavity after the injecting of the single-phase solution and prior to reducing the gas counter pressure below a pressure effective to maintain the supercritical fluid in a supercritical fluid state.

8. A method of physical foaming a footwear component, the method comprising:
    temperature conditioning a mold to a temperature from 15 degrees Celsius to 90 degrees Celsius;
    selecting the mold based, at least in part, on the mold achieving a defined temperature within a temperature conditioning temperature range;
    engaging the mold with a robotically conveyed end effector adapted to reversible engage with the mold;
    conveying, with the end effector, the mold to a press;
    positioning, with the end effector, the mold on a press plate of the press;
    elevating the press plate supporting the mold within the press;
    engaging the mold with a universal runner plate;
    aligning a runner outlet of the universal runner plate with a runner of the mold;
    aligning a gas port of the universal runner plate with a gas port of the mold;
    applying a gas counter pressure to a cavity of the mold;
    injecting a single-phase solution of a polymeric composition and a supercritical fluid into the cavity of the mold;
    releasing the gas counter pressure from the cavity of the mold; and
    removing the footwear component from the cavity of the mold.

9. The method of claim 8, wherein the universal runner plate is a hot-runner plate and the method further comprises circulating a temperature conditioning fluid through a channel of the universal runner plate.

10. The method of claim 9, wherein the temperature conditioning fluid circulating through the channel of the universal runner plate is in a range from about 20 degrees Celsius to about 250 degrees Celsius.

11. The method of claim 8, further comprising positioning the mold with the footwear component in the cavity of the mold at a location other than the press for about 1 minute to about 90 minutes prior to removing the footwear component from the cavity of the mold.

12. The method of claim 11, wherein the location other than the press is a temperature conditioning rack configured to hold a plurality of molds.

13. The method of claim 12, wherein the temperature conditioning rack comprises at least one temperature conditioning plate.

14. A method of physical foaming a footwear component, the method comprising:
    temperature conditioning a mold to a temperature from 15 degrees Celsius to 90 degrees Celsius;
    engaging the mold with a robotically conveyed end effector adapted to reversible engage with the mold;
    conveying, with the end effector, the mold to a press;
    applying a gas counter pressure to a cavity of the mold;
    injecting a single-phase solution of a polymeric composition and a supercritical fluid into the cavity of the mold;
    releasing the gas counter pressure from the cavity of the mold; and
    removing the footwear component from the cavity of the mold,
    wherein the gas counter pressure is maintained in the mold cavity following the injecting of the single-phase solution at a pressure effective to maintain the single-phase solution as a single-phase solution in the cavity of the mold for about 0.5 seconds to about 10.0 seconds.

15. The method of claim 14, further comprising:
engaging the mold with the end effector at the press; and
conveying, with the end effector, the mold to a temperature conditioning rack.

16. The method of claim 14 further comprising:
reading an RFID tag of the mold with an RFID reader of the end effector; and
reading the RFID tag of the mold with an RFID reader of a temperature conditioning rack.

17. The method of claim 14, wherein the polymeric composition is a thermoplastic polyester composition.

18. The method of claim 14, wherein the footwear component has a relative density from 0.1 to 0.6.

19. The method of claim 15, further comprising temperature conditioning the mold at the temperature conditioning rack after injecting the single-phase solution and prior to removing the footwear component from the cavity of the mold.

20. The method of claim 14, further comprising reducing a temperature of the single-phase solution in the mold cavity after the injecting of the single-phase solution and prior to reducing the gas counter pressure below a pressure effective to maintain the supercritical fluid in a supercritical fluid state.

* * * * *

UNITED STATES PATENT AND TRADEMARK OFFICE
CERTIFICATE OF CORRECTION

| | | |
|---|---|---|
| PATENT NO. | : 12,084,556 B2 | Page 1 of 1 |
| APPLICATION NO. | : 18/203309 | |
| DATED | : September 10, 2024 | |
| INVENTOR(S) | : Paul Irving Archer et al. | |

It is certified that error appears in the above-identified patent and that said Letters Patent is hereby corrected as shown below:

In the Specification

Column 59, Line 16:
In the line reading "platens that are at least 2xthe diameter (e.g., of the cylin" should read --platens that are at least 2x the diameter (e.g., of the cylin--.

Column 65, Line 56:
In the line reading "$m_{AA-2}+ ... m_{AA-n}$. Likewise, the average article defect rate" should read --$m_{AA-2} + ... + m_{AA-n}$. Likewise, the average article defect rate--.

Column 65, Line 57:
In the line reading "DA for the mass run may be calculated as the arithmetic" should read --$\dot{D}_A$ for the mass run may be calculated as the arithmetic--.

Signed and Sealed this
Thirteenth Day of May, 2025

Coke Morgan Stewart
*Acting Director of the United States Patent and Trademark Office*